(12) United States Patent
Koriyama et al.

(10) Patent No.: US 8,599,899 B2
(45) Date of Patent: Dec. 3, 2013

(54) AGITATION DEVICE, MELTING APPARATUS AND MELTING METHOD

(75) Inventors: Shinichi Koriyama, Toyota (JP); Takashi Hirai, Toyota (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 238 days.

(21) Appl. No.: 13/126,309

(22) PCT Filed: Oct. 27, 2009

(86) PCT No.: PCT/JP2009/005655
§ 371 (c)(1), (2), (4) Date: Apr. 27, 2011

(87) PCT Pub. No.: WO2010/050182
PCT Pub. Date: May 6, 2010

(65) Prior Publication Data
US 2011/0197709 A1    Aug. 18, 2011

(30) Foreign Application Priority Data

| Oct. 29, 2008 | (JP) | 2008-278106 |
| Jun. 12, 2009 | (JP) | 2009-141517 |
| Sep. 4, 2009 | (JP) | 2009-205091 |

(51) Int. Cl.
*F27D 27/00* (2010.01)
*F27D 3/00* (2006.01)
*G21C 7/00* (2006.01)

(52) U.S. Cl.
USPC ............. 373/146; 373/85; 373/116; 266/233; 266/234

(58) Field of Classification Search
USPC ........... 373/67, 70, 85, 107, 116, 146; 75/10.16, 10.67, 583, 708; 266/233, 266/234, 237, 94, 99, 235; 65/135.2, 135.3; 164/514, 504, 441, 443, 515, 444, 468, 164/447; 432/239, 161, 97; 110/258
See application file for complete search history.

(56) References Cited

U.S. PATENT DOCUMENTS

| 2,686,823 A | * | 8/1954 | Jones | 373/85 |
| 6,221,232 B1 | * | 4/2001 | Tayama et al. | 205/367 |

(Continued)

FOREIGN PATENT DOCUMENTS

| JP | 51-28530 A | 3/1976 |
| JP | 02-179834 A | 7/1990 |

(Continued)

OTHER PUBLICATIONS

International Search Report dated Dec. 22, 2009.

(Continued)

*Primary Examiner* — Henry Yuen
*Assistant Examiner* — Hung D Nguyen
(74) *Attorney, Agent, or Firm* — Kenyon & Kenyon LLP

(57) ABSTRACT

An agitation device, a melting apparatus, and a melting method for improving melting efficiency of molten metal without contaminating the same. The agitation device is provided with a traveling magnetic field generating unit which is disposed outside a charging tank for storing molten metal and generates, inside the charging tank, a magnetic field that travels downward along the rear sidewall of the charging tank. A flow of the molten metal that rotates longitudinally about an axis approximately parallel to the surface of the molten metal is produced in the molten metal. By charging aluminum cutting chips into the molten metal in which the flow is produced, the aluminum cutting chips move with a downward flow of the molten metal, and are immersed in the molten metal. As a result, melting of the aluminum cutting chips can be accelerated.

10 Claims, 34 Drawing Sheets

(56) References Cited

U.S. PATENT DOCUMENTS

2002/0162419 A1\* 11/2002 Yamamura et al. .............. 75/688
2006/0001200 A1\* 1/2006 Takahashi ..................... 266/234

FOREIGN PATENT DOCUMENTS

| JP | 02-219978 A | 9/1990 |
| JP | 02-232323 A | 9/1990 |
| JP | 06-017164 A | 1/1994 |
| JP | 06-176916 A | 6/1994 |
| JP | 07-028957 U | 5/1995 |
| JP | 07-126766 A | 5/1995 |
| JP | 10-146650 A | 6/1998 |
| JP | 2006-10214 A | 1/2006 |
| JP | 2006-24453 A | 1/2006 |
| JP | 2008-163417 A | 7/2008 |
| JP | 2008-241197 A | 10/2008 |

OTHER PUBLICATIONS

Office Action issued in JP 2009-205091 on Jul. 10, 2012 and English translation thereof.

\* cited by examiner (a)

(b)

(c)

(a)

(b)

(a)

(d)

(b)

(e)

(c)

(a)

(b)

(c)

(d)

(e)

(f)

(a)

(b)

(a)

(b)

AGITATION DEVICE, MELTING APPARATUS AND MELTING METHOD

This is a 371 national phase application of PCT/JP2009/005655 filed 27 Oct. 2009, claiming priority to Japanese Patent Applications No. 2008-278106 filed 29 Oct. 2008, No. 2009-141517 filed 12 Jun. 2009, and No. 2009-205091 filed 04 Sep. 2009, respectively, the contents of which are incorporated herein by reference.

TECHNICAL FIELD

The present invention relates to an agitation device in which a melted matter (for example, cutting chips of nonferrous metal such as aluminum or magnesium) is introduced to molten metal and the molten metal is agitated, a melting apparatus having such agitation device, and a melting method in which a melted matter is introduced to molten metal and the molten metal is agitated so as to melt the melted matter.

BACKGROUND ART

There are conventional arts as methods for melting cutting chips of nonferrous metal such as aluminum or magnesium by introducing them to molten metal and agitating the molten metal: (1) a method in which the cutting chips floating on the liquid surface of the molten metal are pushed with an implement such as a stick so as to soak them compulsorily to the molten metal; and (2) a method in which a propeller agitator is inserted into the molten metal through the liquid surface of the molten metal so as to agitate the molten metal.

However, in the methods (1) and (2), the implement and a propeller touch the molten metal with high temperature, whereby the implement and the propeller are worn. Therefore, it is necessary to exchange the implement and the propeller frequently, whereby the maintenance is troublesome.

In the methods (1) and (2), components of the broken implement or propeller may be mixed with the molten metal, thereby reducing the quality of the molten metal (the components may pollute the molten metal).

In addition to the above-mentioned methods, as a method in which cutting chips of aluminum are introduced to molten metal and the molten metal is agitated so as to melt the cutting chips, methods described in the Patent Literatures 1, 2 and 3 are known.

In the methods described in the Patent Literatures 1, 2 and 3, an inner space of a reverberatory furnace is partitioned into four chambers, a melting chamber, an open well part, a vortex generating chamber and a molten metal passage and these parts are communicated with each other so as to form a circulating passage of molten metal. An electromagnetic agitator constructed by an induction coil is arranged at the bottom of the molten metal passage and electromagnetic force is made act on the molten metal in the molten metal passage so as to circulate the molten metal in the molten metal passage, the melting chamber, the open well part, the vortex generating chamber, the molten metal passage, . . . in this order.

An opening (orifice) is formed at the bottom of the vortex generating chamber and the vortex generating chamber is communicated with the molten metal passage through this opening. When molten metal moving from the vortex generating chamber to the molten metal passage passes through the opening, a vortex is generated in the liquid surface of the molten metal in the vortex generating chamber. The aluminium metal cutting chips are rolled up by the vortex so as to melt the aluminium metal cutting chips.

However, in the methods described in the Patent Literatures 1, 2 and 3, the electromagnetic agitator generates electromagnetic force enough large for circulating the whole molten metal in the reverberatory furnace, whereby it is necessary to supply large electric power to the electromagnetic agitator.

Generally, when the aluminium metal cutting chips are introduced to the vortex generated in the liquid surface, the aluminium metal cutting chips float on the liquid surface of the molten metal and are not rolled up by the molten metal successfully, whereby the cutting chips are hardly melted.

Especially, the aluminium metal cutting chip has large surface area and the surface thereof is formed therein with an oxide layer having high melting point by temperature rise, whereby the aluminium metal cutting chip can hardly be melted. When the aluminium metal cutting chips float and retain in the liquid surface of the molten metal, the oxidization (combustion) of the aluminium metal cutting chips is advanced, in its turn yield of recycling by melting the aluminium metal cutting chips is reduced.

In the methods described in the Patent Literatures 1, 2 and 3, the molten metal moves to the molten metal passage passes through the opening formed in the bottom of the vortex generating chamber, whereby the aluminium metal cutting chips can finally be rolled up by the molten metal compulsorily. However, for generating strong vortex, it is necessary to make the sectional area of the opening of the bottom of the vortex generating chamber small to some degree. When a large quantity of the aluminium metal cutting chips are introduced to the molten metal at once, the unmelted aluminium metal cutting chips rush in the opening and clog the opening. Therefore, the processing speed (melting amount per unit time) of the aluminium metal cutting chips cannot be made very large.

Citation List

Patent Literature
[PTL 1] JP 2-179834 A
[PTL 2] JP 2-219978 A
[PTL 3] JP 2-232323 A

SUMMARY OF INVENTION

Technical Problem

The present invention is provided in consideration of the above-mentioned conditions so as to provide an agitation device, a melting apparatus and z melting method each of which does not pollute molten metal and has high melting efficiency.

Solution to Problem

The above-mentioned problems are solved by the following solutions according to the present invention.

An agitation device according to the first aspect of the present invention, which agitates molten metal to which a melted matter is introduced so as to promote melting of the melted matter, comprises a traveling magnetic field generating unit which is arranged outside a melting tank in which the molten metal is stored and generates a first magnetic field traveling downward along a sidewall of the melting tank.

In the embodiment of the present invention, preferably, the traveling magnetic field generating unit generates a second magnetic field traveling upward along the sidewall of the melting tank in the melting tank at a position spaced at a predetermined distance away from the first magnetic field.

In the preferable embodiment of the present invention, the traveling magnetic field generating unit comprises a permanent magnet facing the sidewall of the melting tank, a support member supporting the permanent magnet, and a motor rotatively driving the support member.

Furthermore, preferably, the motor comprises a rotational shaft arranged at a predetermined distance below a liquid surface of the molten metal.

In another embodiment of the present invention, preferably, the traveling magnetic field generating unit comprises a liquid surface position detection device detecting the position of the liquid surface of the molten metal, a vertical moving device vertically movably supporting the motor, and a controller transmitting a signal to the vertical moving device for moving vertically the motor on the basis of the position of the liquid surface of the molten metal detected by the liquid surface position detection device so as to control the relative position of the motor about the liquid surface of the molten metal in the vertical direction.

Furthermore, preferably, the controller transmits a signal to the vertical moving device for moving vertically the motor so as to hold the position of the rotational shaft of the motor lower than the liquid surface of the molten metal for a predetermined distance.

In another embodiment of the present invention, preferably, the traveling magnetic field generating unit comprises a plurality of electromagnetic coils arranged along the sidewall of the melting tank, and an electric power supply device supplying electric power to the electromagnetic coils in order.

Preferably, the embodiment of the present invention comprises a first molten metal straightening member is provided which is arranged in the melting tank at a corresponding position to the first magnetic field traveling downward along the sidewall of the melting tank, and has a first molten metal straightening surface perpendicular to the sidewall of the melting tank and the horizontal plane.

Especially, preferably, the first molten metal straightening surface comprises a recess at the center thereof.

The preferable embodiment of the present invention comprises a second molten metal straightening member which is arranged in the melting tank positioned at the opposite side to the traveling magnetic field generating unit through the sidewall of the melting tank, and has a second molten metal straightening surface in parallel to the sidewall of the melting tank.

A melting apparatus according to the second aspect of the present invention for melting a melted matter by introducing the melted matter to molten metal stored in a melting tank comprises the agitation device according to the first aspect of the present invention.

A melting method according to the third aspect of the present invention comprises an introducing process in which a melted matter is introduced to molten metal stored in a melting tank, and an agitating process in which a first magnetic field traveling downward along the sidewall of the melting tank is generated in the melting tank so as to agitate the molten metal.

In the embodiment of the present invention, preferably, in the agitating process, a second magnetic field is generated which travels upward along the sidewall of the melting tank in the melting tank spaced at a position away from the first magnetic field.

In the preferable embodiment of the present invention, the agitating process further comprises, a process of preparing a traveling magnetic field generating unit arranged outside the melting tank which comprises a permanent magnet facing the sidewall of the melting tank, a support member supporting the permanent magnet, and a motor rotatively driving the support member, and a process of generating the first magnetic field traveling downward along the sidewall of the melting tank.

In another embodiment of the present invention, preferably, the agitating process further comprises a process of preparing a traveling magnetic field generating unit arranged outside the melting tank which comprises a plurality of electromagnetic coils arranged along the sidewall of the melting tank, and an electric power supply device supplying electric power to the electromagnetic coils in order, and a process of generating the first magnetic field traveling downward along the sidewall of the melting tank.

In the embodiment of the present invention, preferably, the agitating process further comprises a process of arranging a first molten metal straightening member in the melting tank at a corresponding position to the first magnetic field traveling downward along the sidewall of the melting tank, the first molten metal straightening member including a first molten metal straightening surface perpendicular to the sidewall of the melting tank and the horizontal plane.

Furthermore, preferably, the first molten metal straightening surface comprises a recess at the center thereof.

In the embodiment of the present invention, preferably, the agitating process further comprises a process of arranging a second molten metal straightening member in the melting tank, positioned at the opposite side to the traveling magnetic field generating unit through the sidewall of the melting tank, the second molten metal straightening member including a second molten metal straightening surface in parallel to the sidewall of the melting tank.

An agitation device according to the fourth aspect of the present invention for melting a melted matter by introducing the melted matter to molten metal stored in a melting tank, comprises a traveling magnetic field generating unit which is arranged outside a melting tank in which the molten metal is stored and generates a magnetic field traveling downward along a sidewall of the melting tank, and an introduced/suspended matter partition member arranged inside the melting tank and dividing a space inside the melting tank into two spaces communicated with each other at lower portions thereof, wherein one of the two spaces divided by the introduced/suspended matter partition member closer to the traveling magnetic field generating unit is employed as a charging/melting chamber which is a space for introducing the melted matter to the molten metal in the melting tank, and the other one of the two spaces divided by the introduced/suspended matter partition member further from the traveling magnetic field generating unit is employed as a suspended matter recovery chamber which is a space for recovering a suspended matter generated by melting of the melted matter.

Preferably, the embodiment of the present invention further comprises a suspended matter/molten metal partition member arranged inside the melting tank and dividing a part further from the traveling magnetic field generating unit than the introduced/suspended matter partition member in the space inside the melting tank into two spaces communicated with each other at lower portions thereof, wherein one of the two spaces divided by the suspended matter/molten metal partition member closer to the traveling magnetic field generating unit is employed as the suspended matter recovery chamber, and the other one of the two spaces divided by the suspended matter/molten metal partition member further from the traveling magnetic field generating unit is employed as a molten metal recovery chamber which is a space for recovering the molten metal from the melting chamber.

A melting apparatus according to the fifth aspect of the present invention for melting a melted matter by introducing the melted matter to molten metal stored in a melting chamber comprises the agitation device according to the fourth aspect of the present invention.

A melting apparatus according to the sixth aspect of the present invention comprises a melting tank having an outside plate constructed by metal material and a fireproof member covering the outside plate, and a traveling magnetic field generating unit which is arranged outside the outside plate of the melting tank and generates a magnetic field traveling along the outside plate in the melting tank so as to agitate the molten metal stored in the melting tank, wherein the melted matter is introduced to the molten metal stored in the melting chamber so as to melt the melted matter, wherein the traveling magnetic field generating unit comprises a permanent magnet facing the sidewall of the melting tank, a support member supporting the permanent magnet, and a motor rotatively driving the support member centering on a rotational shaft perpendicular to an outer plate surface of the outside plate, wherein a resistance band which has larger electric resistance than the metal material constructing the outside plate is formed at a part of the outside plate of the melting tank facing the permanent magnet, wherein the middle part of the resistance band is arranged at a position in the outside plate of the melting tank facing the rotational shaft, and wherein an end of the resistance band is arranged at a position far from the position in the outside plate of the melting tank facing the rotational shaft.

In the embodiment of the present invention, preferably, a north pole and a south pole of the permanent magnet are arranged at positions whose phases are shifted mutually for 180° centering on the rotational shaft when viewed from the axial direction of the rotational shaft.

In the preferable embodiment of the present invention, the resistance band is a slot formed in the outside plate of the melting tank.

In the embodiment of the present invention, preferably, an auxiliary resistance band which has larger electric resistance than the metal material constructing the outside plate of the melting tank and is arranged separately from the resistance band is formed at a part of the outside plate of the melting tank facing the permanent magnet.

In the embodiment of the present invention, preferably, the auxiliary resistance band is a slot formed in the outside plate of the melting tank.

In a melting method according to the seventh aspect of the present invention using a melting apparatus which introduces a melted matter to a molten metal stored in a melting chamber for melting the melted matter, in which the melting apparatus comprises a melting tank, which has an outside plate constructed by metal material and a fireproof member covering the outside plate, and a traveling magnetic field generating unit which is arranged outside the outside plate of the melting tank and generates a magnetic field traveling along the outside plate in the melting tank so as to agitate the molten metal stored in the melting tank and introducing the melted matter to the molten metal stored in the melting chamber so as to melt the melted matter, wherein the traveling magnetic field generating unit comprises a permanent magnet facing the sidewall of the melting tank, a support member supporting the permanent magnet, and a motor rotatively driving the support member centering on a rotational shaft perpendicular to an outer plate surface of the outside plate, wherein a resistance band which has larger electric resistance than the metal material constructing the outside plate is formed at a part of the outside plate of the melting tank facing the permanent magnet, wherein the middle part of the resistance band is arranged at a position in the outside plate of the melting tank facing the rotational shaft, and wherein an end of the resistance band is arranged at a position far from the position in the outside plate of the melting tank facing the rotational shaft.

In the embodiment of the present invention, preferably, a north pole and a south pole of the permanent magnet are arranged at positions whose phases are shifted mutually for 180° centering on the rotational shaft when viewed from the axial direction of the rotational shaft.

In the embodiment of the present invention, preferably, the resistance band is a slot formed in the outside plate of the melting tank.

In another embodiment of the present invention, preferably, an auxiliary resistance band which has larger electric resistance than the metal material constructing the outside plate of the melting tank and is arranged separately from the resistance band is formed at a part of the outside plate of the melting tank facing the permanent magnet.

Especially, preferably, the auxiliary resistance band is a slot formed in the outside plate of the melting tank.

Advantageous Effects of Invention

The present invention does not pollute molten metal and brings high melting efficiency.

DESCRIPTION OF EMBODIMENTS

Explanation will be given on a melting furnace 100 which is a first embodiment of a melting apparatus according to the present invention referring to FIGS. 1 to 6.

For convenience, hereinafter, "vertical direction" is defined on the basis of the direction of gravity (the direction of gravity is defined as the downward), "longitudinal direction" is defined as the direction perpendicular to the vertical direction, "lateral direction" is defined as the direction perpendicular to the vertical direction and the longitudinal direction, and these directions are employed in the explanation.

Figure 1:
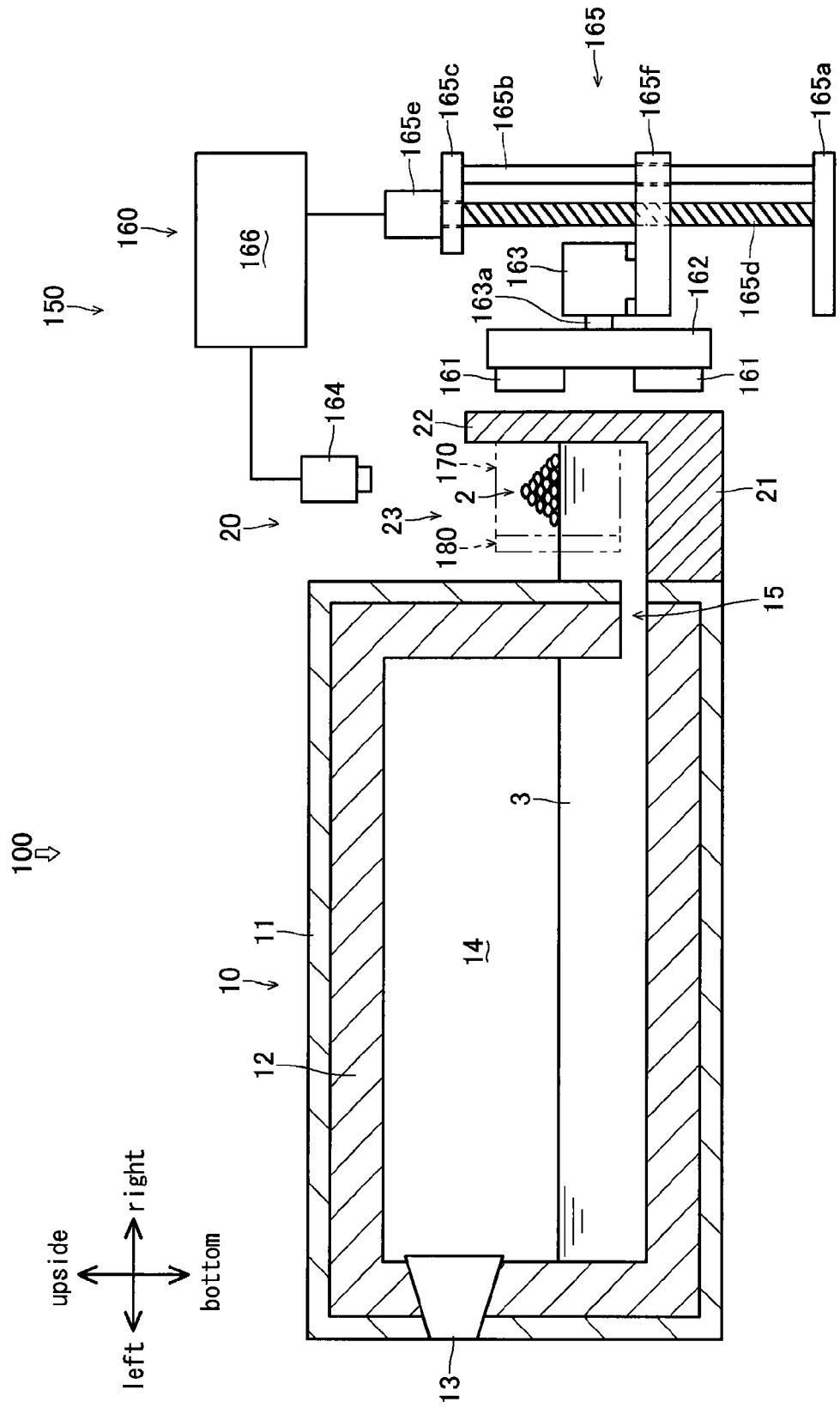
FIG. 1 is a sectional side view of a first embodiment of a melting apparatus and an agitation device according to the present invention.

As shown in FIG. 1, the melting furnace 100 generates molten metal 3 by melting aluminum cutting chips 2 and has a main body 10, a charging tank 20 and an agitation device 150.

The aluminum cutting chips 2 are an embodiment of melted matter according to the present invention and is an object melted by the melting furnace 100. The aluminum cutting chips 2 include aluminum alloy. The aluminum cutting chips 2 are hair-like shaped (long and narrow shaped) and the length of each of the aluminum cutting chips 2 is about 1 mm to 10 cm.

The aluminum cutting chips 2 are generated by cuttingly processing members of aluminum (for example, an engine block).

The material constituting the melted matter according to the present invention is not limited to aluminum alloy constituting the aluminum cutting chips 2.

As the material constituting the melted matter according to the present invention, various metal materials can be employed such as native aluminum, aluminum alloy, native magnesium, magnesium alloy, native titanium and titanium alloy.

Among the above materials, each of native aluminum, aluminum alloy, native magnesium and magnesium alloy is non-magnetic at solid state, has comparatively lower melting point than the other metal materials, has comparatively smaller specific gravity and is floaty on the surface of the molten metal, and tends to be formed thereon with an oxide layer having high melting point. Accordingly, the agitation device, the melting apparatus and the melting method are preferably adopted to these materials.

The shape of the melted matter according to the present invention is not limited to that of the aluminum cutting chips 2. For example, the melted matter according to the present invention may alternatively be the other shape, such as spherical or massive.

The size of the melted matter according to the present invention is not limited to that of the aluminum cutting chips 2. For example, the melted matter according to the present invention includes a matter whose size is less than 1 mm such as impalpable powder of aluminum alloy and a matter whose size is more than 10 cm such as cut pieces of parts of aluminum alloy.

The molten metal 3 is liquid obtained by melting the aluminum cutting chips 2.

The molten metal according to the present invention only should be liquid of substantially the same material (in the case of alloy, substantially the same components) as the melted matter. Namely, molten metal charged with the melted matter at the time of starting the melting (initial molten metal) may alternatively be generated by a method different from the method melting the melted matter (for example, the method of melting an ingot including substantially the same material as the melted matter).

The main body 10 holds the temperature of the molten metal 3 higher than solidifying temperature.

The main body 10 has a structure 11, a fireproof thermal insulating member 12 and a burner 13.

The structure 11 is a substantially rectangular box-like member.

The fireproof thermal insulating member 12 is constructed by ceramics or the like and is fixed to the inner peripheral surface of the structure 11 so as to cover the inner peripheral surface of the structure 11.

A holding chamber 14 is formed I side the structure 11 as a space surrounded by the fireproof thermal insulating member 12, and a communication passage 15 is formed in the lower portion of the rear surface of the structure 11. The molten metal 3 is stored in the lower half of the holding chamber 14.

The burner 13 is provided in the upper portion of the inner peripheral surface of the structure 11 and heats air in the holding chamber 14, in its turn the molten metal 3 stored in the lower half of the holding chamber 14 (the molten metal 3 touching the air).

In this embodiment, the molten metal 3 is heated by the burner 13. However, the present invention is not limited thereto and the molten metal 3 may alternatively be heated by the other heat source (for example, an electric heater).

The charging tank 20 is a part of the melting furnace 100 through which the aluminum cutting chips 2 is introduced.

The charging tank 20 is fixed to the rear end of the main body 10. The charging tank 20 has a bottom floor 21 and a sidewall 22.

The bottom floor 21 is a part of the charging tank 20 which is a plate-like part substantially rectangular when viewed in plan and is extended rearward from the rear end of the structure 11.

The sidewall 22 is a part of the charging tank 20 which is a plate-like part and is standingly provided along the left end, rear end and right end of the bottom floor 21. The left and right front ends of the sidewall 22 are respectively extended to the left and right ends of the rear surface of the structure 11.

A charging chamber 23 is formed in the charging tank 20 as a space surrounded by the bottom floor 21, the sidewall 22 and the rear surface of the structure 11. The molten metal 3 is stored in the lower half of the charging chamber 23.

The holding chamber 14 is communicated with the charging chamber 23 through the communication passage 15, and the molten metal 3 can moves between the holding chamber 14 and the charging chamber 23 through the communication passage 15.

The upper surface of the charging tank 20 is opened and the aluminum cutting chips 2 is introduced through the opening into the charging chamber 23 (in more detail, introduced through a part surrounded by a first molten metal straightening member 170 and a second molten metal straightening member 180 discussed later and the sidewall 22 when viewed in plan). The aluminum cutting chips 2 is introduced into the charging chamber 23 touch the molten metal 3 stored in the lower half of the charging chamber 23 and heated, and then melted when the temperature thereof becomes higher than the melting point.

In this embodiment, the molten metal 3 is stored in the part constructed by combining the rear surface of the structure 11, whose inner peripheral surface is covered by the fireproof thermal insulating member 12, with the charging tank 20. Therefore, each of "the rear surface of the structure 11 whose inner peripheral surface is covered by the fireproof thermal insulating member 12" and "the charging tank 20" is an embodiment of the melting tank according to the present invention.

The agitation device 150 is an embodiment of the agitation device according to the present invention and agitates the molten metal 3 to which the aluminum cutting chips 2 are introduced (the molten metal 3 stored in the lower half of the charging chamber 23) so as to promote melting of the aluminum cutting chips 2.

Figure 2:
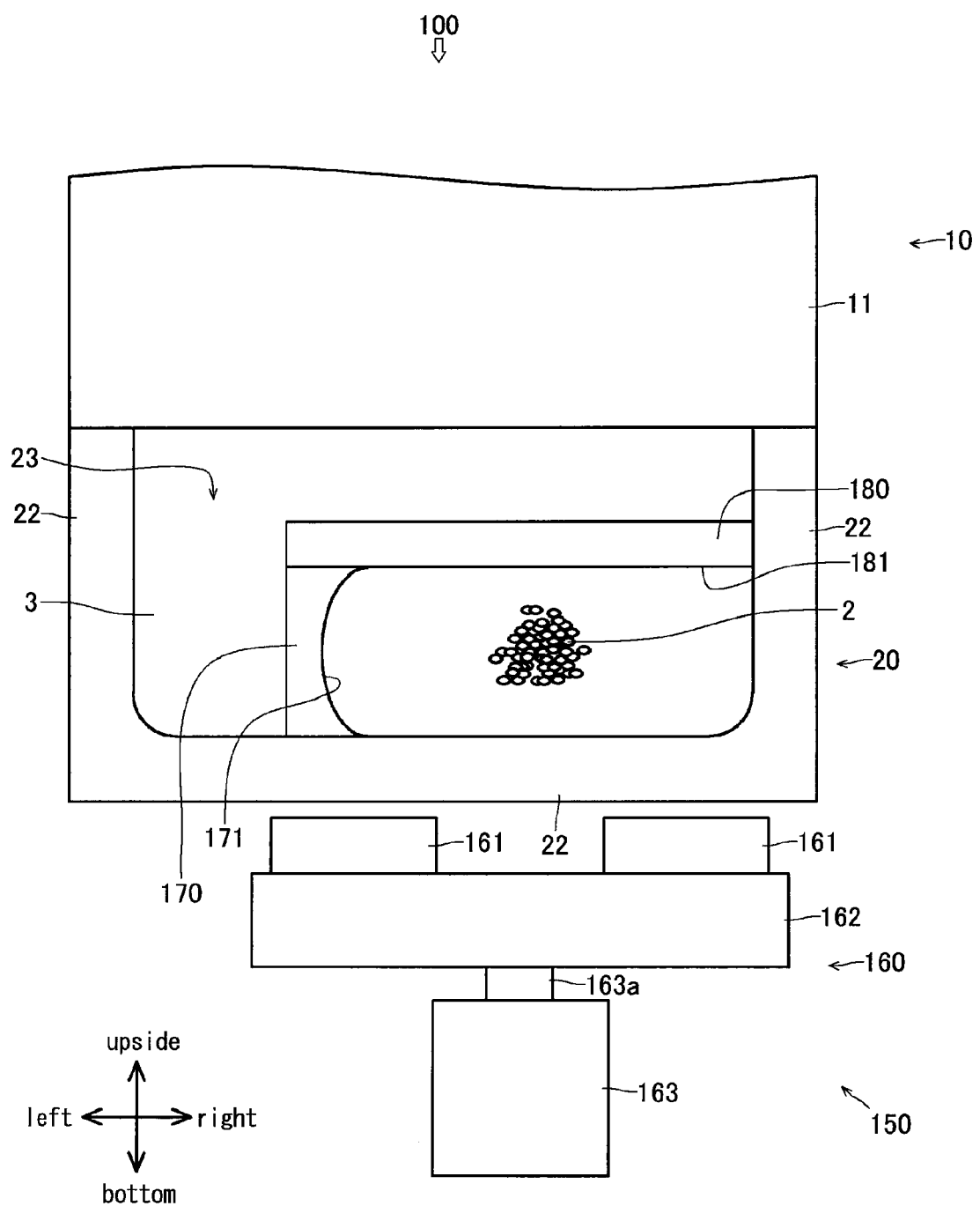
FIG. 2 is a plan view of the first embodiment of the melting apparatus and the agitation device according to the present invention.
Figure 3:
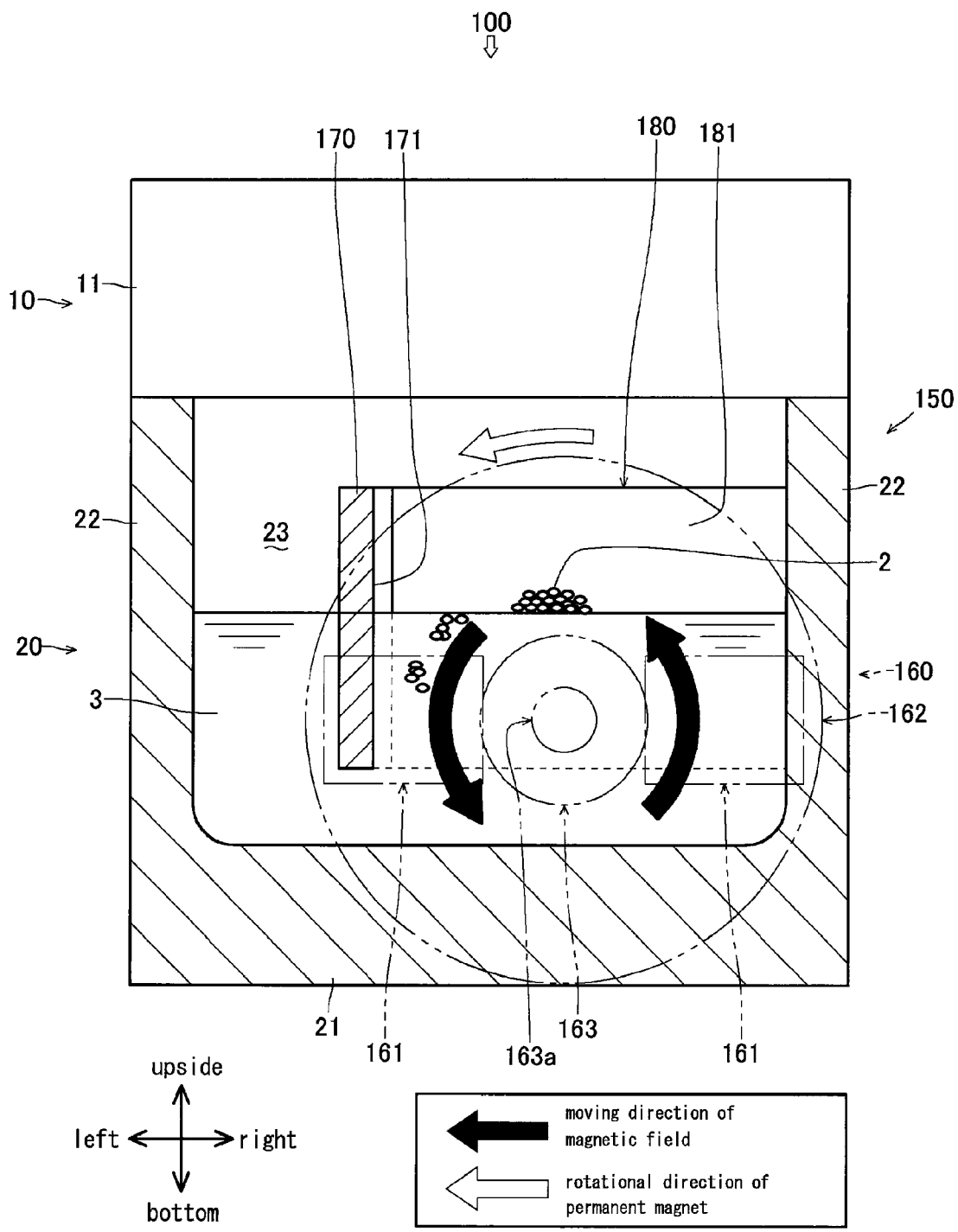
FIG. 3 is a rear view of the first embodiment of the melting apparatus and the agitation device according to the present invention.

As shown in FIGS. 1, 2 and 3, the agitation device 150 has a traveling magnetic field generating unit 160, the first molten metal straightening member 170 and the second molten metal straightening member 180.

The traveling magnetic field generating unit 160 is an embodiment of the traveling magnetic field generating unit according to the present invention and generates ($\alpha$) a magnetic field traveling downward along the sidewall 22 of the rear side and ($\beta$) a magnetic field traveling upward along the sidewall 22 of the rear side in the charging tank 20.

As shown in FIG. 1, the traveling magnetic field generating unit 160 is arranged outside the charging tank 20 (in this embodiment, behind the charging tank 20).

The traveling magnetic field generating unit 160 has two permanent magnets 161, a support member 162, a motor 163, a liquid surface position detection device 164, a vertical moving device 165 and a controller 166.

The permanent magnets 161 are an embodiment of the permanent magnets according to the present invention and face the sidewall 22 of the rear side as shown in FIGS. 1 and 2.

"Permanent magnet" means an object which maintains its magnetism for a comparative long period without supply of magnetic field or current from the outside.

As the permanent magnets according to the present invention, concretely, alnico magnet, KS-steel, MK-steel, ferrite magnet, samarium-cobalt magnet, or neodymium magnet may be employed.

In this embodiment, for generating strong magnetic power, the permanent magnets 161 are constructed by the neodymium magnet.

In this embodiment, the traveling magnetic field generating unit 160 has the two permanent magnets 161. However, the present invention is not limited thereto and the number of the permanent magnets provided in the traveling magnetic field generating unit according to the present invention may be one or the plural.

The support member 162 is an embodiment of the support member according to the present invention and supports the permanent magnets 161.

In this embodiment, the support member 162 is substantially discoid and is arranged so that the surface thereof is in parallel to the sidewall 22 of the rear side. On the surface of the support member 162 facing the sidewall 22 of the rear side, the permanent magnets 161 are fixed to positions symmetrical about the center of the surface.

The motor 163 is an embodiment of the motor according to the present invention and rotatively drives the support member 162, in its turn the permanent magnets 161 fixed to the support member 162.

A rotational shaft 163a of the motor 163 is fixed to the support member 162. The axis of the rotational shaft 163a is coaxial to the center line of the support member 162 (the line passing through the centers of the pair of surfaces of the support member 162).

In this embodiment, the motor 163 is an electric motor. However, motor according to the present invention is not limited thereto and may alternatively be a motor rotatively driven by fluid pressure (for example, hydraulic motor or pneumatical motor).

By supplying electric power to the motor 163, the rotational shaft 163a, the support member 162 fixed to the rotational shaft 163a and the permanent magnets 161 fixed to the support member 162 are integrally rotated (in this embodiment, the permanent magnets 161 are rotated counterclockwise when viewed in rear).

As a result, as shown in FIG. 3, on the sidewall 22 of the rear side, the magnetic field traveling substantially downward along the sidewall 22 of the rear side is generated in the part facing the left half of the support member 162, and the magnetic field traveling substantially upward along the sidewall 22 of the rear side is generated in the part of the inside of the charging tank 20 corresponding to the part facing the right half of the support member 162 (that is, the position away from the magnetic field traveling downward for a predetermined distance).

When the magnetic field traveling substantially downward along the sidewall 22 is generated inside the charging tank 20, in the molten metal 3 stored in the charging tank 20, the substantially downward flowing of the molten metal 3 (molten metal flowing) is generated at the part on which the magnetic field acts.

When the magnetic field traveling substantially upward along the sidewall 22 is generated inside the charging tank 20, in the molten metal 3 stored in the charging tank 20, the substantially upward flowing of the molten metal 3 (molten metal flowing) is generated at the part on which the magnetic field acts.

As a result, in the molten metal 3, flowing of the molten metal 3 (molten metal flowing) is generated which circulates centering on the axis substantially in parallel to the liquid surface of the molten metal 3 (in this embodiment, the rotational shaft 163a of the motor 163).

When the aluminum cutting chips 2 are introduced to the molten metal 3 in which the flowing is generated, the aluminum cutting chips 2 are moved on the flowing of the molten metal 3 (molten metal flowing) and dive into the inside of the molten metal 3 (soaked in the molten metal 3) at the position as which the substantially downward flowing of the molten metal 3 (molten metal flowing) is generated, and then melted by the heat of the molten metal 3.

When the aluminum cutting chips 2 are melted, the temperature of the molten metal 3 in the vicinity of the molten aluminum cutting chips 2 is reduced. However, the molten metal 3 is agitated by the flowing of the molten metal 3 (molten metal flowing) so that the temperature of the molten metal 3 is held substantially equally.

Furthermore, by generating the substantially upward flowing of the molten metal 3 (molten metal flowing), the molten metal 3 with comparative high temperature is moved to the vicinity of the liquid surface of the molten metal 3 to which the aluminum cutting chips 2 are introduced. Accordingly, when a large quantity of the aluminum cutting chips 2 are introduced continuously to the molten metal 3, the aluminum cutting chips 2 can be melted efficiently.

The liquid surface position detection device 164 is an embodiment of the liquid surface position detection device according to the present invention and detects the position of liquid surface of the molten metal 3.

As shown in FIG. 1, the liquid surface position detection device 164 is arranged above the charging tank 20, in its turn above the liquid surface of the molten metal 3 stored in the charging chamber 23, transmits (irradiates) a supersonic wave to the liquid surface of the molten metal 3, receives the supersonic wave reflected on the liquid surface of the molten metal 3, and calculates the distance between the liquid surface position detection device 164 and the liquid surface of the molten metal 3 on the basis of the speed of the supersonic wave and the time from the transmission of the supersonic wave toward the liquid surface of the molten metal 3 to the receipt thereof, thereby detecting the position (height) of the liquid surface of the molten metal 3.

The liquid surface position detection device according to the present invention is not limited to the construction such as the liquid surface position detection device 164 in this embodiment in which the position of the liquid surface of the molten metal is detected by employing the supersonic wave, and the position of the liquid surface of the molten metal may alternatively be detected by another method.

The vertical moving device 165 is an embodiment of the vertical moving device according to the present invention and supports the motor 163 movably vertically.

As shown in FIG. 1, the vertical moving device 165 has a base member 165a, a stay member 165b, a top member 165c, a ball screw 165d, a servomotor 165e and a slide member 165f.

The base member 165a is a plate-like member forming the lower portion of the vertical moving device 165. The base member 165a is fixed to a floor surface, a ground surface or another structure.

The stay member 165b is a substantially cylindrical member. One of ends (lower end) of the stay member 165b is fixed to the base member 165a. The lengthwise direction of the stay member 165b is in agreement with the vertical direction.

The top member 165c is a plate-like member forming the upper portion of the vertical moving device 165. The top member 165c is fixed to the other end (upper end) of the stay member 165b.

The ball screw 165d is a substantially cylindrical member whose outer peripheral surface is formed therein with a male screw. The upper and lower ends of the ball screw 165d are rotatably pivotally supported respectively by the top member 165c and the base member 165a.

The servomotor 165e is an electric motor that the rotational direction and the rotational amount (rotational angle) of the rotational shaft thereof can be regulated. The servomotor 165e is fixed to the top member 165c. The rotational shaft of the servomotor 165e is fixed to the upper end of the ball screw 165d.

The slide member 165f is a plate-like member. A through hole is formed in the slide member 165f and penetrates the upper and lower surfaces thereof. The stay member 165b is slidably inserted into the through hole. A tapped hole is formed in the slide member 165f and penetrates the upper and lower surfaces thereof. The ball screw 165d is screwed into the tapped hole.

The motor 163 is fixed to the upper surface of the slide member 165f.

When electric power is supplied to the servomotor 165e, the rotational shaft of the servomotor 165e and the ball screw 165d are rotated integrally, and the slide member 165f to which the ball screw 165d is screwed is moved (slid) vertically along the stay member 165b.

By regulating the rotational direction and the rotational amount (rotational angle) of the rotational shaft of the servomotor 165e, the vertical movement amount of the combination of the slide member 165f, the motor 163, the support member 162 and the permanent magnets 161 can be regulated.

The controller 166 is an embodiment of the controller according to the present invention and transmits a signal so as to make the motor 163 move vertically (hereinafter, referred to as "control signal") to the vertical moving device 165 on the basis of the position of the liquid surface of the molten metal 3 detected by the liquid surface position detection device 164, thereby controlling the relational position of the motor 163 about the liquid surface of the molten metal 3 in the vertical direction.

The controller 166 can store various programs and the like therein, expand the programs, perform predetermined operations on the basis of the programs, store the results of the operations, and output the results of the operations.

Substantially, the controller 166 may be constructed by connecting CPU (Central Processing Unit), ROM (Read-Only Memory), RAM (Random Access Memory) and HDD (Hard Disk Drive) to each other through a bus, or may alternatively be constructed by a one-chip LSI (Large Scale Integration).

In this embodiment, the controller 166 is for exclusive use. However, the controller 166 may alternatively be constructed by a personal computer or work station on the market in which programs are suitably stored.

The controller 166 is connected to the liquid surface position detection device 164 so as to obtain the information (signal) about the position of the liquid surface of the molten metal 3 detected by the liquid surface position detection device 164.

The controller 166 is connected to the vertical moving device 165, in more detail the servomotor 165e so as to obtain the information (signal) about the rotational amount (rotational angle) of the servomotor 165e, in its turn the position (height) of the rotational shaft 163a of the motor 163 from the servomotor 165e.

The controller 166 can transmits the signal which commands the rotational direction, the rotational speed and the rotational amount (rotational angle) of the rotational shaft of the servomotor 165e (corresponding to the control signal) to the servomotor 165e.

On the basis of "the information about the position of the liquid surface of the molten metal 3" detected by the liquid surface position detection device 164 and "the information about the position of the rotational shaft 163a of the motor 163" obtained from the servomotor 165e, the controller 166 calculates the relative position of the rotational shaft 163a of the motor 163 about the liquid surface of the molten metal 3.

The controller 166 previously stores therein "tolerance of the relative position of the rotational shaft 163a of the motor 163 about the liquid surface of the molten metal 3" and compares "the tolerance of the relative position of the rotational shaft 163a of the motor 163 about the liquid surface of the molten metal 3" with "the calculated result of the relative position of the rotational shaft 163a of the motor 163 about the liquid surface of the molten metal 3".

As the result of the comparison, when "the calculated result of the relative position of the rotational shaft 163a of the motor 163 about the liquid surface of the molten metal 3" is included in "the tolerance of the relative position of the rotational shaft 163a of the motor 163 about the liquid surface of the molten metal 3" ("the calculated result of the relative position of the rotational shaft 163a of the motor 163 about the liquid surface of the molten metal 3" is not less than the lower limit and not more than the upper limit of "the tolerance of the relative position of the rotational shaft 163a of the motor 163 about the liquid surface of the molten metal 3"), the controller 166 does not transmit the control signal to the servomotor 165e so as to hold the position (height) of the rotational shaft 163a of the motor 163.

As the result of the comparison, when "the calculated result of the relative position of the rotational shaft 163a of the motor 163 about the liquid surface of the molten metal 3" is not included in "the tolerance of the relative position of the rotational shaft 163a of the motor 163 about the liquid surface of the molten metal 3" ("the calculated result of the relative position of the rotational shaft 163a of the motor 163 about the liquid surface of the molten metal 3" is less than the lower limit or more than the upper limit of "the tolerance of the relative position of the rotational shaft 163a of the motor 163 about the liquid surface of the molten metal 3"), the controller 166 transmits the control signal to the servomotor 165e so as to regulate the position (height) of the rotational shaft 163a of the motor 163.

More concretely, when "the calculated result of the relative position of the rotational shaft 163a of the motor 163 about the liquid surface of the molten metal 3" is less than the lower limit of "the tolerance of the relative position of the rotational shaft 163a of the motor 163 about the liquid surface of the molten metal 3", the controller 166 transmits the control signal to the servomotor 165e so as to raise the position (height) of the rotational shaft 163a of the motor 163.

The servomotor 165e receiving the control signal rotatively drives so as to raise the position (height) of the rotational shaft 163a of the motor 163.

When "the calculated result of the relative position of the rotational shaft 163a of the motor 163 about the liquid surface of the molten metal 3" is more than the upper limit of "the tolerance of the relative position of the rotational shaft 163a of the motor 163 about the liquid surface of the molten metal 3", the controller 166 transmits the control signal to the servomotor 165e so as to fall the position (height) of the rotational shaft 163a of the motor 163.

The servomotor 165e receiving the control signal rotatively drives so as to fall the position (height) of the rotational shaft 163a of the motor 163.

In this embodiment, the tolerance of the relative position of the rotational shaft 163a of the motor 163 about the liquid surface of the molten metal 3" is determined so that the position of the rotational shaft 163a of the motor 163 is lower than the liquid surface of the molten metal 3 for a predetermined distance. In other words, the controller 166 transmits the control signal to the servomotor 165e so as to hold the position of the rotational shaft 163a of the motor 163 lower than the liquid surface of the molten metal 3 detected by the liquid surface position detection device 164 for a predetermined distance.

According to the construction, in the case that the position (height) of the liquid surface of the molten metal 3 is changed by changing the amount (volume) of the molten metal 3 stored in the melting furnace 100 (for example, in the case that the molten metal 3 of a predetermined amount is taken out from the melting furnace 100), in the locus of the traveling magnetic field, most of "the part in which the traveling direction of the magnetic field is substantially downward" and the part in which the traveling direction of the magnetic field is substantially upward" faces the side surface of the molten metal 3 stored in the charging tank 20, whereby the traveling magnetic field can act on the molten metal 3 more efficiently.

The concrete value of "the tolerance of the relative position of the rotational shaft 163a of the motor 163 about the liquid surface of the molten metal 3" is set in consideration of various elements such as the components (material) of the molten metal 3 (the aluminum cutting chips 2), the temperature of the molten metal 3, the amount (volume) of the molten metal 3, the shape of the charging tank 20 (the shape of the charging chamber 23), the magnetic power of the permanent magnets 161 and the rotational speed of the motor 163 (the rotational speed of the permanent magnets 161) synthetically.

The first molten metal straightening member 170 is an embodiment of the first molten metal straightening member according to the present invention and straightens the flowing of the molten metal 3 so as to promote the melting of the aluminum cutting chips 2.

In this embodiment, the first molten metal straightening member 170 is a plate-like member at least the surface thereof is constructed by refractory material such as ceramic and has a first molten metal straightening surface 171. The inside of the first molten metal straightening member 170 may be constructed by heat-resistant material such as metal.

The first molten metal straightening member 170 is arranged inside the charging tank 20 (inside the charging chamber 23) and at the position corresponding to "the magnetic field traveling substantially downward along the sidewall 22 of the charging tank 20" generated by the traveling magnetic field generating unit 160 (in this embodiment, the position inside the charging tank 20 slightly left from the magnetic field traveling substantially downward), and the rear end of the first molten metal straightening member 170 is fixed to the sidewall 22 of the rear side of the charging tank 20.

The upper end of the first molten metal straightening member 170 fixed to the sidewall 22 of the rear side of the charging tank 20 is arranged above the liquid surface of the molten metal 3, and a gap of predetermined size is formed between the lower end of the first molten metal straightening member 170 and the bottom floor 21 of the charging tank 20. Therefore, the molten metal 3 positioned at the left of the first molten metal straightening member 170 and the molten metal 3 positioned at the right of the first molten metal straightening member 170 when viewed in plan are communicated with each other through the gap formed between the lower end of the first molten metal straightening member 170 and the bottom floor 21 of the charging tank 20 (the molten metal can move mutually).

The first molten metal straightening surface 171 of the first molten metal straightening member 170 arranged in the charging tank 20 is directed rightward and is substantially perpendicular to the sidewall 22 of the charging tank 20 and the horizontal plane.

Figure 4:
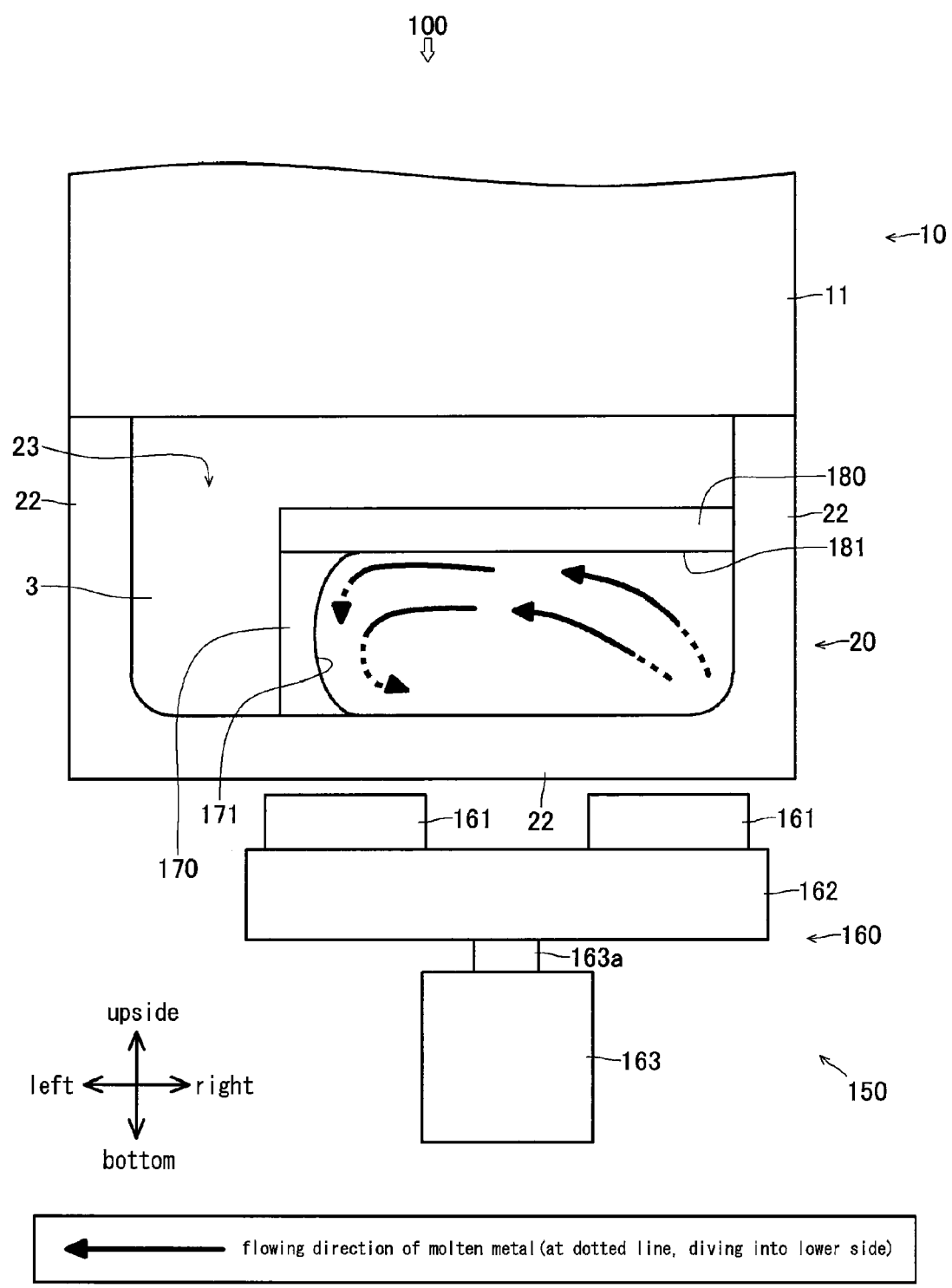
FIG. 4 is a plan view of flowing of molten metal in the first embodiment of the melting apparatus according to the present invention.
Figure 5:
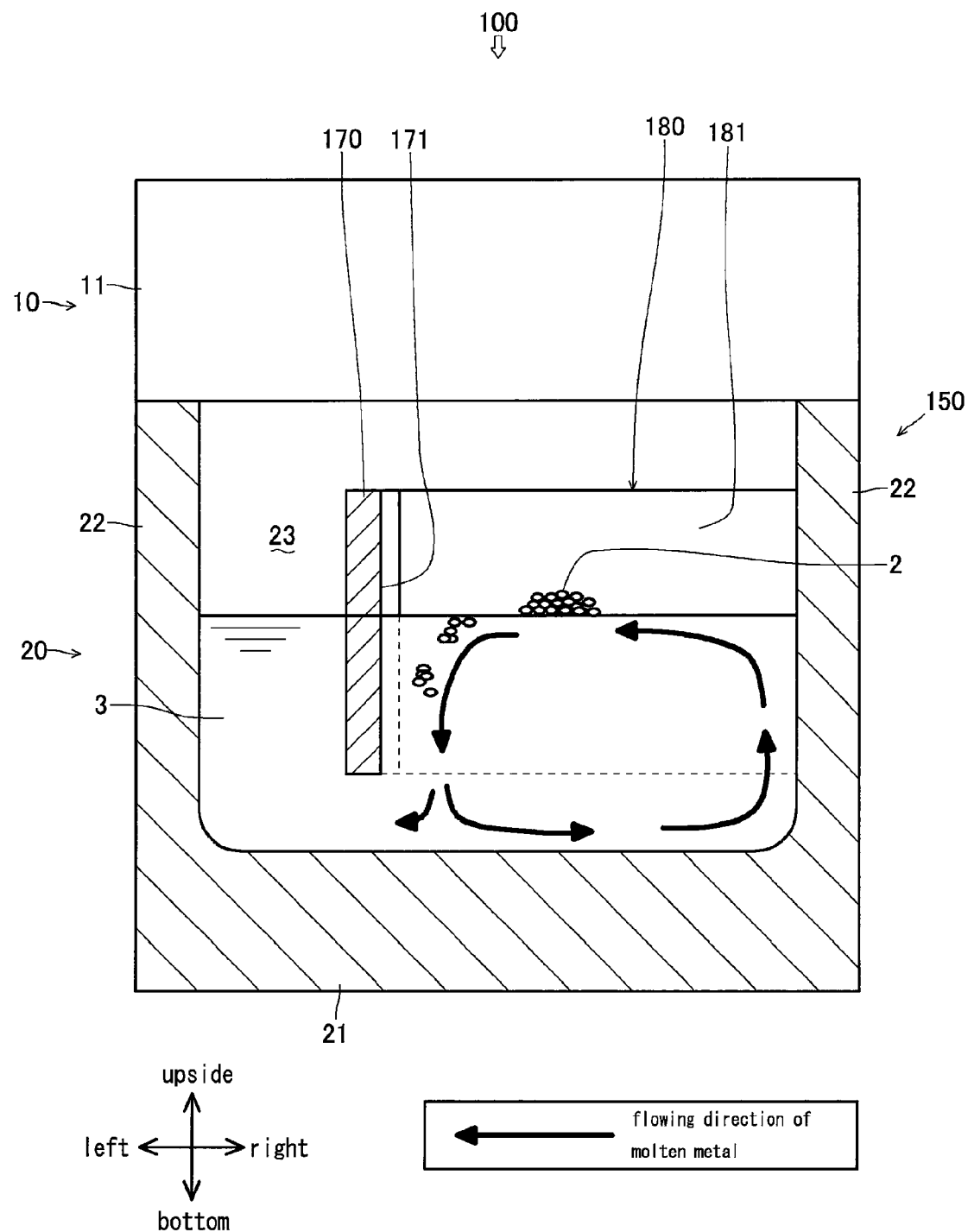
FIG. 5 is a rear view of flowing of molten metal in the first embodiment of the melting apparatus according to the present invention.

As shown in FIGS. 4 and 5, the flowing of the molten metal 3 generated by the traveling magnetic fields (the magnetic field traveling substantially downward along the sidewall 22 of the rear side of the charging tank 20 and the magnetic field traveling substantially upward along the sidewall 22 of the rear side of the charging tank 20) is substantially leftward (strictly, leftward and forward) in the vicinity of the liquid surface of the molten metal 3, and when the flowing reaches the first molten metal straightening surface 171 of the first molten metal straightening member 170, the direction is revised downward along the first molten metal straightening surface 171.

Namely, by arranging the first molten metal straightening member 170, the flowing in the vicinity of the liquid surface of the molten metal 3 can be changed from substantially leftward to substantially downward.

Therefore, in comparison of the case that the first molten metal straightening member 170 is not arranged, the downward flowing of the molten metal 3 can be generated more strongly.

The center of the first molten metal straightening surface 171 is hollow when viewed in plan. This shape of the first molten metal straightening surface 171 brings below merits.

Namely, strictly, the flowing of the molten metal 3 in the vicinity of the liquid surface of the molten metal 3 is not leftward completely, that is, not in parallel to the sidewall 22 of the rear side when viewed in plan and is along the direction going away gradually from the sidewall 22 of the rear side (in this embodiment, leftward and forward).

By forming the first molten metal straightening surface 171 so that the center thereof is hollow when viewed in plan, the flowing of the molten metal 3 in the vicinity of the liquid surface of the molten metal 3 can be changed downward while revising the flowing close to the sidewall 22 of the rear side of the charging tank 20 when viewed in plan, whereby the downward flowing of the molten metal 3 can be generated more strongly.

The second molten metal straightening member 180 is an embodiment of the second molten metal straightening member according to the present invention, and straightens the flowing of the molten metal 3 so as to promote the melting of the aluminum cutting chips 2.

In this embodiment, the second molten metal straightening member 180 is a plate-like member at least the surface thereof is constructed by refractory material such as ceramic and has a second molten metal straightening surface 181. The inside of the second molten metal straightening member 180 may be constructed by heat-resistant material such as metal.

The second molten metal straightening member 180 is arranged inside the charging tank 20 (inside the charging chamber 23) and at the position opposite to the traveling magnetic field generating unit 160 about the sidewall 22 of the rear side of the charging tank 20. The left end of the second molten metal straightening member 180 is fixed to the front end of the first molten metal straightening member 170, and the right end of the second molten metal straightening member 180 is fixed to the sidewall 22 of the right side of the charging tank 20.

The upper end of the second molten metal straightening member 180 fixed to the sidewall 22 of the right side of the charging tank 20 is arranged above the liquid surface of the molten metal 3, and a gap of predetermined size is formed between the lower end of the second molten metal straightening member 180 and the bottom floor 21 of the charging tank 20. Therefore, the molten metal 3 positioned at the front of the second molten metal straightening member 180 and the molten metal 3 positioned at the rear of the second molten metal straightening member 180 when viewed in plan are communicated with each other through the gap formed between the lower end of the second molten metal straightening member 180 and the bottom floor 21 of the charging tank 20 (the molten metal can move mutually).

The second molten metal straightening surface 181 of the second molten metal straightening member 180 arranged in the charging tank 20 is directed rearward (faces the sidewall 22 of the rear side of the charging tank 20) and is substantially in parallel to the sidewall 22 of the rear side of the charging tank 20.

As shown in FIGS. 4 and 5, the flowing of the molten metal 3 generated by the traveling magnetic fields (the magnetic field traveling substantially downward along the sidewall 22 of the rear side of the charging tank 20 and the magnetic field traveling substantially upward along the sidewall 22 of the rear side of the charging tank 20) is substantially leftward and forward in the vicinity of the liquid surface of the molten metal 3, and when the flowing reaches the second molten metal straightening surface 181 of the second molten metal straightening member 180, the direction is revised leftward along the second molten metal straightening surface 181 (in parallel to the sidewall 22 of the rear side when viewed in plan).

Therefore, in comparison of the case that the second molten metal straightening member 180 is not arranged, the leftward flowing of the molten metal 3 can be generated more strongly, in its turn the downward flowing of the molten metal 3 can be generated more strongly.

As mentioned above, the agitation device 150 agitates the molten metal 3 to which the aluminum cutting chips 2 is introduced so as to promote the melting of the aluminum cutting chips 2 and has the traveling magnetic field generating unit 160 which is arranged outside the charging tank 20 and generates the magnetic field traveling downward along the sidewall 22 of the rear side of the charging tank 20.

According to the construction, the aluminum cutting chips 2 introduced to the molten metal 3 ride on the downward flowing of the molten metal 3 (molten metal flowing) generated by the magnetic field traveling downward along the sidewall 22 of the rear side and are soaked in the molten metal 3, whereby the melting of the aluminum cutting chips 2 can be promoted (the aluminum cutting chips 2 can be melted efficiently).

The agitation device 150 can be added to an existing melting device without large-scale remodeling, thereby being adoptable easily to the existing melting device.

In this embodiment, the traveling magnetic field generating unit 160 is arranged to face the sidewall 22 of the rear side of the charging tank 20. However, the agitation device according to the present invention is not limited thereto.

Figure 10:
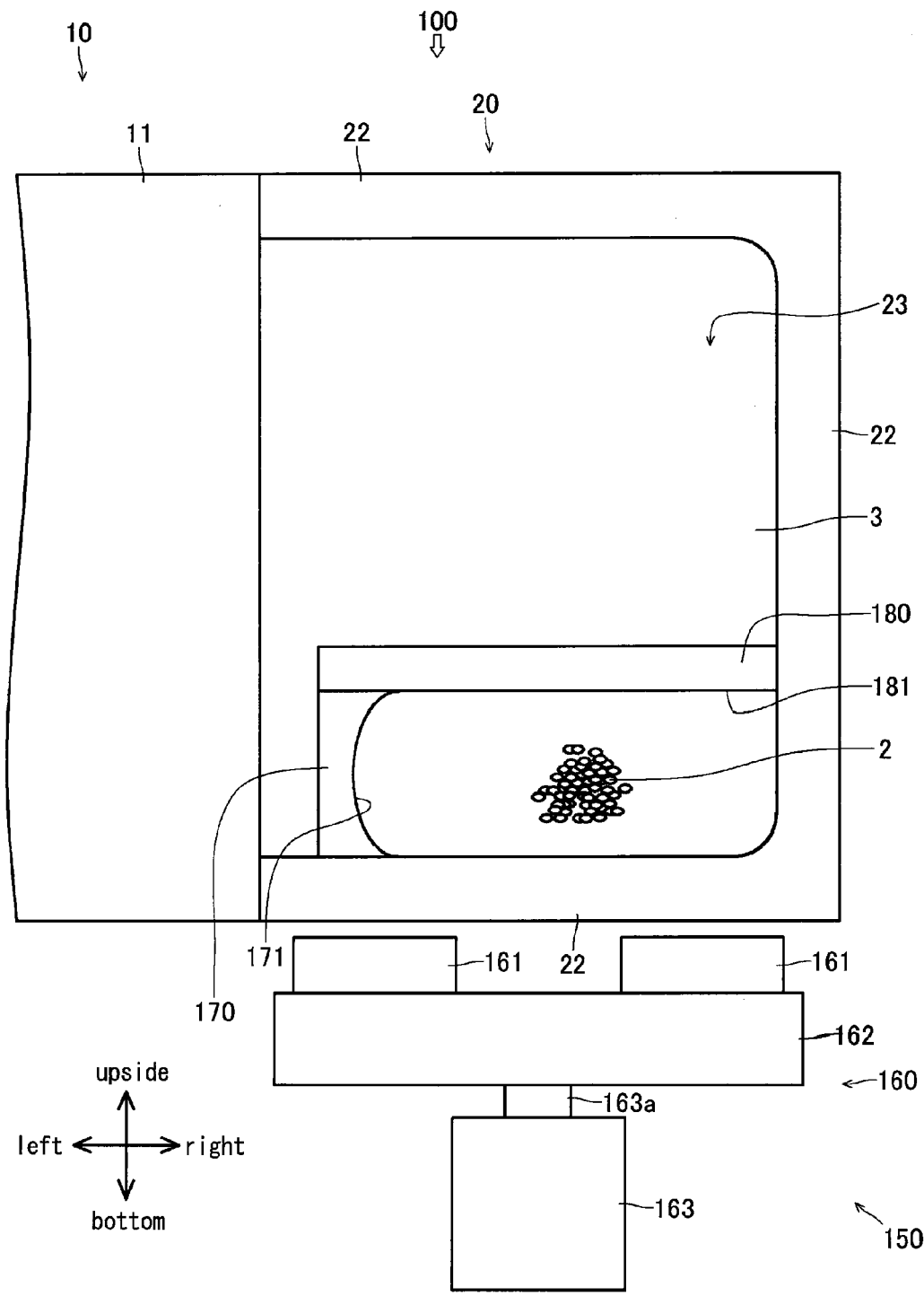
FIG. 10 is a drawing of an embodiment of change of arrangement of a traveling magnetic field generating unit in the first embodiment of the melting apparatus and the agitation device according to the present invention.

For example, as shown in FIG. 10, the traveling magnetic field generating unit 160 may alternatively be arranged to face the sidewall 22 of the left side of the charging tank 20, or may alternatively be arranged to face the sidewall 22 of the right side of the charging tank 20 (not shown).

In addition to the magnetic field traveling downward along the sidewall 22 of the rear side of the charging tank 20, the traveling magnetic field generating unit 160 of the agitation device 150 generates the magnetic field traveling upward along the sidewall 22 of the rear side of the charging tank 20 at the position far from the magnetic field traveling downward for the predetermined distance in the charging tank 20.

According to the construction, the molten metal 3 of comparative high temperature can be supplied to the vicinity of the liquid surface of the molten metal 3 to which the aluminum cutting chips 2 is introduced, whereby the melting of the aluminum cutting chips 2 can be promoted (the aluminum cutting chips 2 can be melted efficiently).

The traveling magnetic field generating unit 160 of the agitation device 150 has the permanent magnets 161 facing the sidewall 22 of the rear side of the charging tank 20, the support member 162 supporting the permanent magnets 161, and the motor 163 rotatively driving the support member 162.

According to the construction, the magnetic field traveling downward along the sidewall 22 of the rear side of the charging tank 20 can be generated by the construction which is easy and has small power consumption.

The traveling magnetic field generating unit 160 of the agitation device 150 has the liquid surface position detection device 164 detecting the position of the liquid surface of the molten metal 3, the vertical moving device 165 vertically movably supporting the motor 163, and the controller 166 transmitting the signal to the vertical moving device 165 for moving vertically the motor 163 on the basis of the position of the liquid surface of the molten metal 3 detected by the liquid surface position detection device 164 so as to control the relative position of the motor 163 about the liquid surface of the molten metal 3 in the vertical direction.

According to the construction, the magnetic field traveling corresponding to the position of the liquid surface of the molten metal 3 can act on the molten metal 3 more efficiently.

The controller 166 of the traveling magnetic field generating unit 160 of the agitation device 150 transmits the signal to the vertical moving device 165 for moving vertically the motor 163 so as to hold the position of the rotational shaft 163a of the motor 163 lower than the liquid surface of the molten metal 3 for the predetermined distance.

According to the construction, in the case that the position (height) of the liquid surface of the molten metal 3 is changed, most of "the part in which the traveling direction of the magnetic field is substantially downward" and the part in which the traveling direction of the magnetic field is substantially upward" faces the side surface of the molten metal 3 stored in the charging tank 20, whereby the traveling magnetic field can act on the molten metal 3 more efficiently.

In this embodiment, the traveling magnetic field generating unit 160 has the liquid surface position detection device 164, the vertical moving device 165 and the controller 166. However, in the case that the position (height) of the liquid surface of the molten metal 3 is not changed substantially (there is no change or the change amount is negligibly small) in the construction of the melting furnace 100 or in the application of the melting furnace 100, the liquid surface position detection device 164, the vertical moving device 165 and the controller 166 may be omitted.

In the case that the liquid surface position detection device 164, the vertical moving device 165 and the controller 166 are omitted, for making the traveling magnetic field act on the molten metal 3 more efficiently, the motor 163 is preferably fixed so as to arrange the rotational shaft 163a of the motor 163 at the position lower than the liquid surface of the molten metal 3 for the predetermined distance.

The agitation device 150 has the first molten metal straightening member 170 which is arranged at the position inside the charging tank 20 and corresponding to the magnetic field traveling downward along the sidewall 22 of the rear side of the charging tank 20 generated by the traveling magnetic field generating unit 160 and has the first molten metal straightening surface 171 perpendicular to the sidewall 22 of the rear side of the charging tank 20 and the horizontal plane.

According to the construction, the downward flowing of the molten metal 3 can be generated more strongly, in its turn the melting of the aluminum cutting chips 2 can be promoted (the aluminum cutting chips 2 can be melted efficiently).

The center of the first molten metal straightening surface 171 of the first molten metal straightening member 170 of the agitation device 150 is hollow when viewed in plan.

According to the construction, the flowing of the molten metal 3 in the vicinity of the liquid surface of the molten metal 3 can be changed downward while revising the flowing close to the sidewall 22 of the rear side of the charging tank 20 when viewed in plan, whereby the downward flowing of the molten metal 3 can be generated more strongly.

In this embodiment, the first molten metal straightening surface 171 is constructed as a curved surface. However, the shape of the first molten metal straightening surface according to the present invention is not limited thereto.

Figure 6:
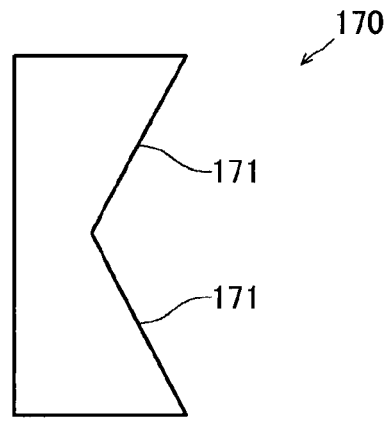
FIG. 6 is a plan view of another embodiment of a first molten metal straightening member according to the present invention.
Figure 6:
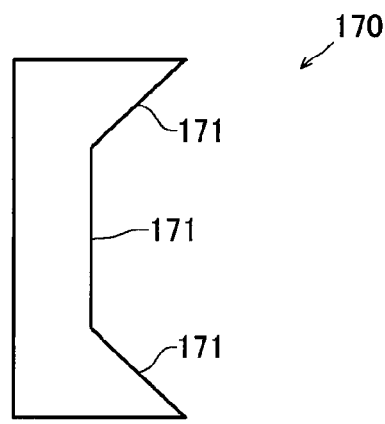
Figure 6:
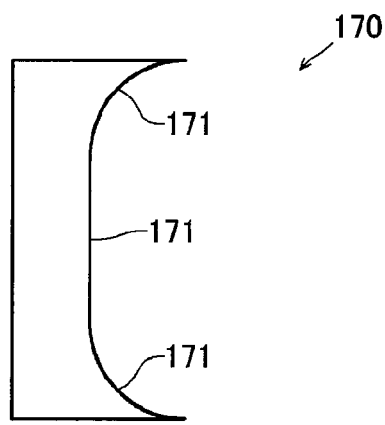

For example, as the first molten metal straightening surface 171 shown in FIGS. 6(*a*) and (*b*), the first molten metal straightening surface may alternatively be "the combination of a plurality of flat surfaces". Otherwise, as the first molten metal straightening surface 171 shown in FIG. 6(*c*), the first molten metal straightening surface may alternatively be "the combination of a plurality of flat surfaces and curved surfaces".

The agitation device 150 has the second molten metal straightening member 180 which is arranged at the position inside the charging tank 20 and is opposite to the traveling magnetic field generating unit 160 about the sidewall 22 of the rear side of the charging tank 20 and has the second molten metal straightening surface 181 in parallel to the sidewall 22 of the rear side of the charging tank 20.

According to the construction, the leftward flow (the flow in parallel to the sidewall 22 of the rear side of the charging tank 20 when viewed in plan) of the molten metal 3 can be generated more strongly, in its turn the downward flowing of the molten metal 3 can be generated more strongly.

In this embodiment, the agitation device 150 has the first molten metal straightening member 170 and the second molten metal straightening member 180. However, for example according to the shape of the charging tank 20, one or both of the first molten metal straightening member 170 and the second molten metal straightening member 180 may alternatively be omitted.

In this embodiment, when the charging tank 20 is small in the lateral direction, the sidewall 22 of the right and left sides of the charging tank 20 can function similarly to the first molten metal straightening member 170, whereby the first molten metal straightening member 170 can be omitted.

In this embodiment, when the charging tank 20 is small in the longitudinal direction, the rear surface of the structure 11 of the main body 10 can function similarly to the second molten metal straightening member 180, whereby the second molten metal straightening member 180 can be omitted.

As shown in FIG. 3, by shaping the corners of the bottom floor 21 and the sidewall 22 round, the upward flow of the molten metal 3 can be promoted.

In this embodiment, the first molten metal straightening member 170 and the second molten metal straightening member 180 are fixed to the charging tank 20. However, the members may alternatively be moved vertically corresponding to the position (height) of the liquid surface of the molten metal 3.

The melting furnace 100 is the melting apparatus for melting the aluminum cutting chips 2 by introducing the aluminum cutting chips 2 to the molten metal 3 stored in the charging tank 20 and has the agitation device 150.

According to the construction, the aluminum cutting chips 2 introduced to the molten metal 3 ride on the downward flowing of the molten metal 3 (molten metal flowing) generated by the magnetic field traveling downward along the sidewall 22 of the rear side and are soaked in the molten metal 3, whereby the aluminum cutting chips 2 can be melted efficiently.

In this embodiment, the agitation device 150 is arranged behind the charging tank 20. However, the agitation device 150 may alternatively be arranged at the left or right of the charging tank 20.

Explanation will be given on a melting furnace 200 which is a second embodiment of the melting apparatus according to the present invention referring to FIGS. 7 and 8.

In below explanation, for convenience, the construction of the melting furnace 200 which is the same as the construction of the melting furnace 100 shown in FIG. 1 is designated by the same reference numeral and description thereof is omitted.

Figure 7:
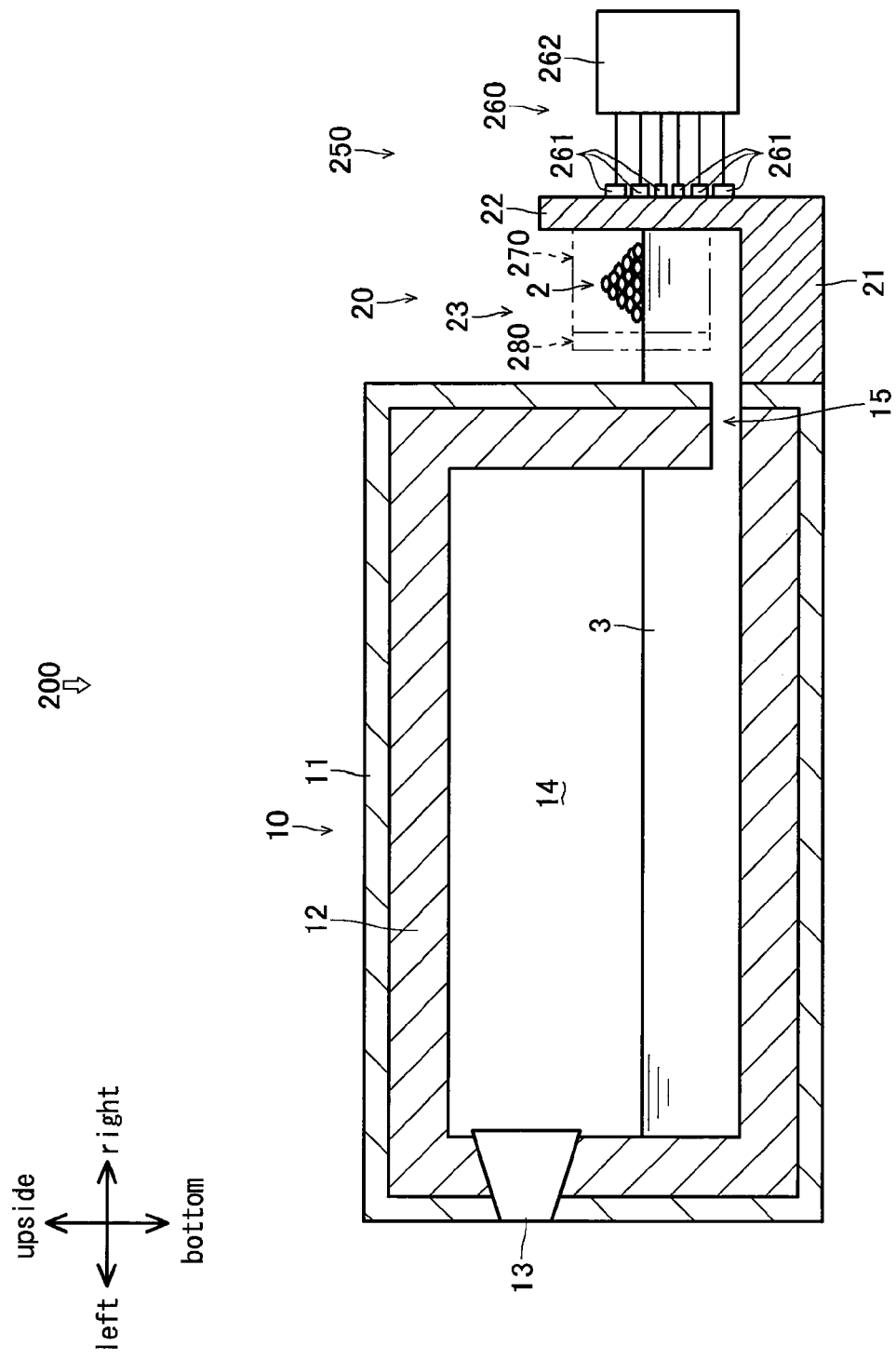
FIG. 7 is a sectional side view of a second embodiment of the melting apparatus and the agitation device according to the present invention.

As shown in FIG. 7, the melting furnace 200 has the main body 10, the charging tank 20 and an agitation device 250.

The agitation device 250 is a second embodiment of the agitation device according to the present invention and agitates the molten metal 3 to which the aluminum cutting chips 2 are introduced (the molten metal 3 stored in the lower half of the charging chamber 23) so as to promote melting of the aluminum cutting chips 2.

Figure 8:
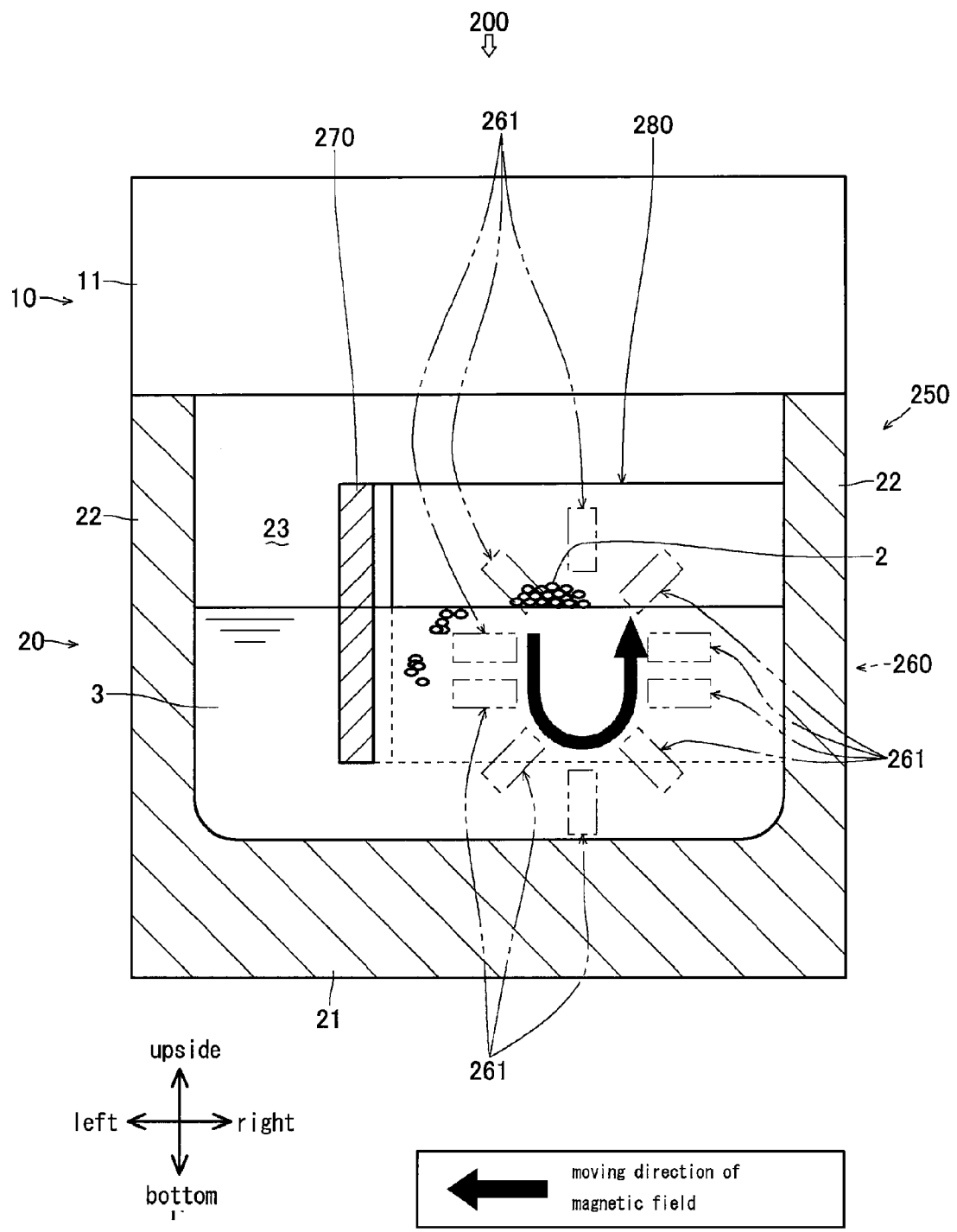
FIG. 8 is a rear view of the second embodiment of the melting apparatus and the agitation device according to the present invention.

As shown in FIGS. 7 and 8, the agitation device 250 has a traveling magnetic field generating unit 260, a first molten metal straightening member 270 and a second molten metal straightening member 280.

The traveling magnetic field generating unit 260 is an embodiment of the traveling magnetic field generating unit according to the present invention and generates (α) a magnetic field traveling downward along the sidewall 22 of the rear side and (β) a magnetic field traveling upward along the sidewall 22 of the rear side in the charging tank 20.

The traveling magnetic field generating unit 260 has electromagnetic coils 261 and an electric power supply device 262.

The electromagnetic coils 261 are an embodiment of the plurality of coils according to the present invention and generate magnetic fields therearound by electric power supply.

The electromagnetic coils 261 are arranged substantially ring-like along the sidewall 22 of the rear side of the charging tank 20.

The electric power supply device 262 is an embodiment of the electric power supply device according to the present invention and supplies electric power to the electromagnetic coils 261 in order (in this embodiment, in counterclockwise order when viewed in rear).

When the electric power supply device 262 supplies the electric power to the electromagnetic coils 261 in counterclockwise order when viewed in rear, the electromagnetic coils 261 to which the electric power is supplied are excited in order.

As a result, the magnetic field traveling substantially ring-like along the sidewall 22 of the rear side of the charging tank 20 (similarly to the arrangement of the electromagnetic coils 261) is generated inside the charging tank 20. The left half of the magnetic field when viewed in rear forms a magnetic field traveling substantially downward along the sidewall 22 of the rear side of the charging tank 20, and the right half thereof when viewed in rear forms a magnetic field traveling substantially upward along the sidewall 22 of the rear side of the charging tank 20.

The construction of the first molten metal straightening member 270 and the second molten metal straightening member 280 is substantially the same as the construction of the first molten metal straightening member 170 and the second molten metal straightening member 180 shown in FIG. 1, and then explanation thereof is omitted.

As mentioned above, the agitation device 250 of the melting furnace 200 has the electromagnetic coils 261 arranged along the sidewall 22 of the rear side of the charging tank 20 and the electric power supply device 262 supplying electric power to the electromagnetic coils 261 in order.

According to the construction, the magnetic field traveling substantially downward along the sidewall 22 of the rear side of the charging tank 20 can be generated.

Since the arrangement of the electromagnetic coils 261 can be changed suitably, the shape of locus of the traveling magnetic field is not limited to the circle and may be various shapes such as a straight line and an oval.

Figure 9:
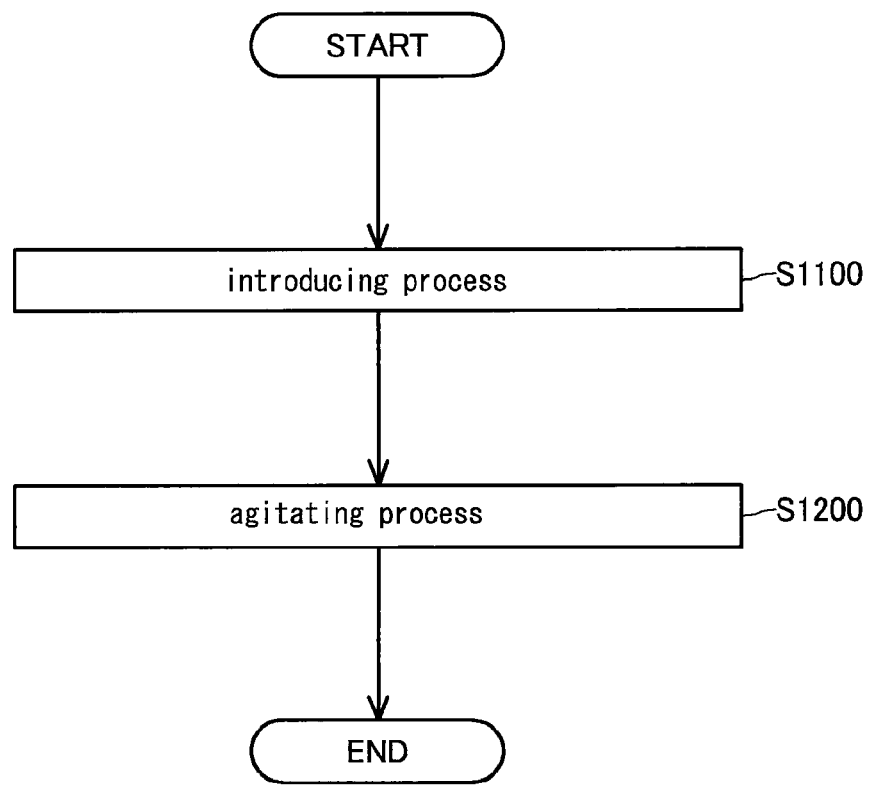
FIG. 9 is a flow chart of an embodiment of a melting method according to the present invention.

Explanation will be given on an embodiment of melting method according to the present invention referring to FIG. 9.

The embodiment of melting method according to the present invention is for melting the aluminum cutting chips 2 with the melting furnace 100 (see FIG. 1) and has an introducing process S1100 and an agitating process S1200.

In the introducing process S1100, the aluminum cutting chips 2 are introduced to the molten metal 3 stored in the charging tank 20.

When the introducing process S1100 is finished, the operation is shifted to the agitating process S1200.

In the agitating process S1200, the magnetic field traveling substantially downward along the sidewall 22 of the rear side of the charging tank 20 is generated in the charging tank 20 so as to agitate the molten metal 3.

In the agitating process S1200, when electric power is supplied to the motor 163, the rotational shaft 163a, the support member 162 fixed to the rotational shaft 163a and the permanent magnets 161 fixed to the support member 162 are integrally rotated. By the rotation of the permanent magnets 161, in the charging tank 20, the magnetic field traveling substantially downward along the sidewall 22 of the rear side and the magnetic field traveling substantially upward along the sidewall 22 of the rear side and separated from the downward traveling magnetic field for a predetermined distance are generated. By acting the magnetic fields on the molten metal 3, the substantially downward flowing of the molten metal 3 is generated. The aluminum cutting chips 2 introduced to the molten metal 3 in the introducing process S1100 are moved on the flowing of the molten metal 3 (molten metal flowing) and dive into the inside of the molten metal 3 (soaked in the molten metal 3), and then melted by the heat of the molten metal 3.

As mentioned above, the embodiment of melting method according to the present invention has the introducing process S1100 in which the aluminum cutting chips 2 are introduced to the molten metal 3 stored in the charging tank 20 and the agitating process S1200 in which the magnetic field traveling downward along the sidewall 22 of the rear side of the charging tank 20 is generated in the charging tank 20 so as to agitate the molten metal 3.

According to the construction, the aluminum cutting chips 2 introduced to the molten metal 3 are moved on the flowing of the molten metal 3 generated by the magnetic field traveling substantially downward along the sidewall 22 (molten metal flowing) and soaked in the molten metal 3, whereby the aluminum cutting chips 2 can be melted efficiently.

In the embodiment of melting method according to the present invention, in the agitating process S1200, in the charging tank 20, the magnetic field is generated which travels substantially upward along the sidewall 22 of the rear side of the charging tank 20 and is separated from the magnetic field traveling substantially downward along the sidewall 22 of the rear side of the charging tank 20 for the predetermined distance.

According to the construction, the molten metal 3 of comparative high temperature can be supplied to the vicinity of the liquid surface of the molten metal 3 to which the aluminum cutting chips 2 is introduced, whereby the aluminum cutting chips 2 can be melted efficiently.

In the embodiment of melting method according to the present invention, in the agitating process S1200, the traveling magnetic field generating unit 160 is employed which has the permanent magnets 161 facing the sidewall 22 of the rear side of the charging tank 20, the support member 162 supporting the permanent magnets 161 and the motor 163 rotatively driving the support member 162 and is arranged outside the charging tank 20, thereby generating the magnetic field traveling downward along the sidewall 22 of the rear side of the charging tank 20.

According to the construction, the magnetic field traveling downward along the sidewall 22 of the charging tank 20 can be generated by the construction which is easy and has small power consumption.

In the melting method according to the present invention, the equipment for generating the magnetic field traveling downward along the sidewall of the charging tank is not limited to the traveling magnetic field generating unit 160 in this embodiment, and such equipment as the traveling magnetic field generating unit 260 shown in FIGS. 7 and 8 may alternatively be employed.

In the embodiment of melting method according to the present invention, in the agitating process S1200, the first molten metal straightening member 170, which has the first molten metal straightening surface 171 perpendicular to the sidewall 22 of the rear side of the charging tank 20 and the horizontal plane, is arranged at the position inside the charging tank 20 and corresponding to the magnetic field traveling downward along the sidewall 22 of the rear side of the charging tank 20.

According to the construction, the downward flowing of the molten metal 3 can be generated more strongly, in its turn the aluminum cutting chips 2 can be melted efficiently.

In the embodiment of melting method according to the present invention, in the agitating process S1200, the center of the first molten metal straightening surface 171 of the first molten metal straightening member 170 arranged inside the charging tank 20 is hollow when viewed in plan.

According to the construction, the flowing of the molten metal 3 in the vicinity of the liquid surface of the molten metal 3 can be changed downward while revising the flowing close to the sidewall 22 of the rear side of the charging tank 20 when viewed in plan, whereby the downward flowing of the molten metal 3 can be generated more strongly.

In the embodiment of melting method according to the present invention, in the agitating process S1200, the second molten metal straightening member 180, which has the second molten metal straightening surface 181 in parallel to the sidewall 22 of the rear side of the charging tank 20, is arranged at the position inside the charging tank 20 and is opposite to the traveling magnetic field generating unit 160 about the sidewall 22 of the rear side of the charging tank 20.

According to the construction, the leftward flow (the flow in parallel to the sidewall 22 of the rear side of the charging tank 20 when viewed in plan) of the molten metal 3 can be generated more strongly, in its turn the downward flowing of the molten metal 3 can be generated more strongly.

In this embodiment, when the introducing process S1100 is finished, the operation is shifted to the agitating process S1200. However, the present invention is not limited thereto.

Namely, the introducing process and the agitating process may alternatively be parallel (may alternatively be performed simultaneously).

Explanation will be given on a melting furnace 300 which is a third embodiment of the melting apparatus according to the present invention referring to FIGS. 11 to 15.

In below explanation, for convenience, the construction of the melting furnace 300 which is fundamentally the same as the construction of the melting furnace 100 shown in FIG. 1 is designated by the same reference numeral and description thereof is omitted.

Figure 11:
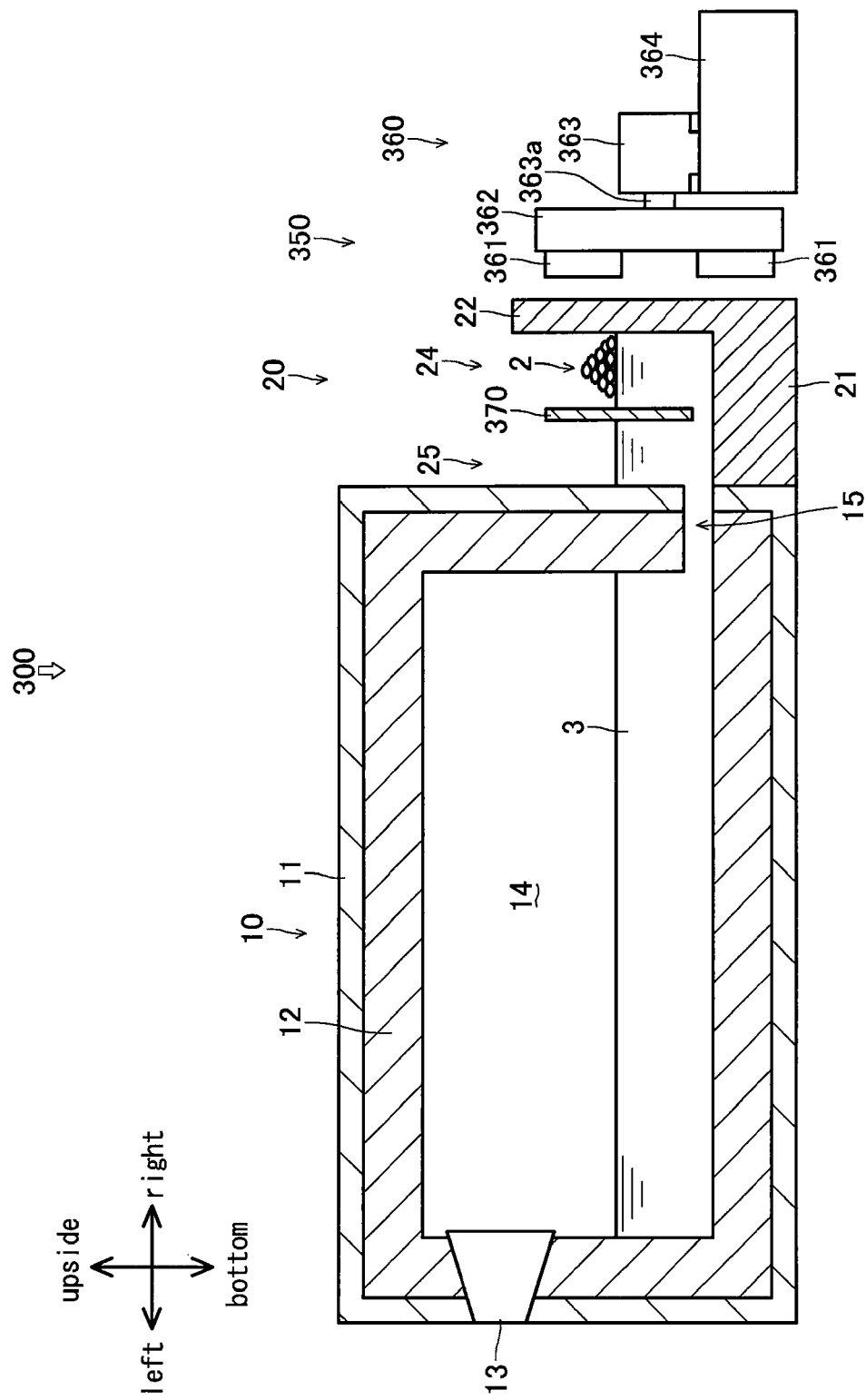
FIG. 11 is a sectional side view of a third embodiment of the melting apparatus and the agitation device according to the present invention.

As shown in FIG. 11, the melting furnace 300 has the main body 10, the charging tank 20 and an agitation device 350.

The agitation device 350 is a third embodiment of the agitation device according to the present invention and agitates the molten metal 3 to which the aluminum cutting chips 2 are introduced (the molten metal 3 stored in the lower half of the charging chamber 23) so as to promote melting of the aluminum cutting chips 2.

As shown in FIG. 11, the agitation device 350 has a traveling magnetic field generating unit 360 and an introduced/suspended matter partition member 370.

The traveling magnetic field generating unit 360 is an embodiment of the traveling magnetic field generating unit according to the present invention and generates (α) a magnetic field traveling downward along the sidewall 22 of the rear side and (β) a magnetic field traveling upward along the sidewall 22 of the rear side in the charging tank 20.

As shown in FIG. 11, the traveling magnetic field generating unit 360 is arranged outside the charging tank 20 (in this embodiment, behind the charging tank 20).

The traveling magnetic field generating unit 360 has two permanent magnets 361, a support member 362, a motor 363 having a rotational shaft 363*a*, and a fixing member 364.

In the members constituting the traveling magnetic field generating unit 360, the permanent magnets 361, the support member 362 and the motor 363 having the rotational shaft 363*a* respectively have fundamentally the same construction as the permanent magnets 161, the support member 162 and the motor 163 having the rotational shaft 163*a* in FIG. 1, therefore description thereof is omitted.

The fixing member 364 fixes the motor 363 to a predetermined position of the charging tank 20.

The fixing member 364 is fixed to a structure or the like (not shown).

Figure 12:
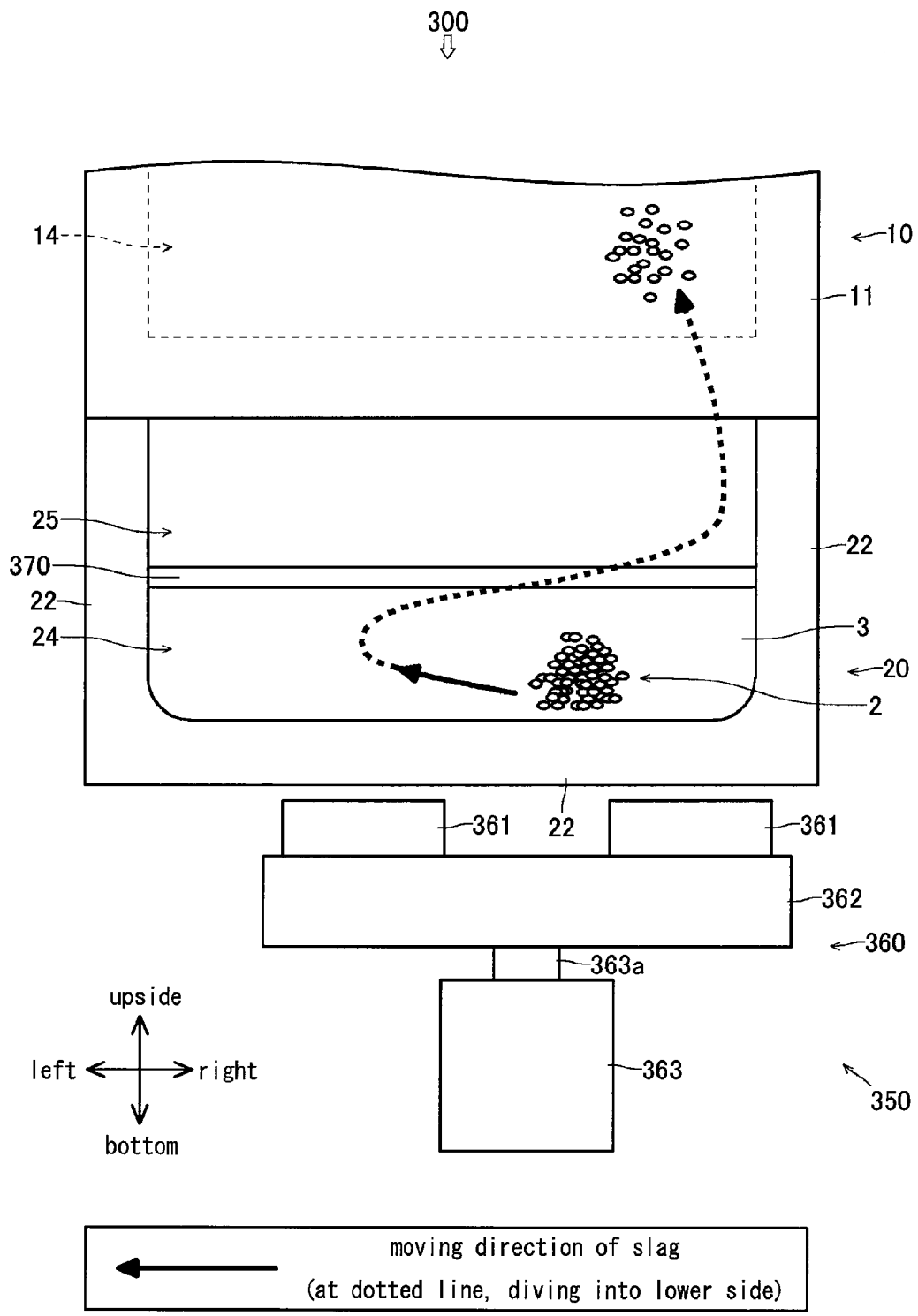
FIG. 12 is a plan view of flowing of melted matters in the third embodiment of the melting apparatus and the agitation device according to the present invention.
Figure 13:
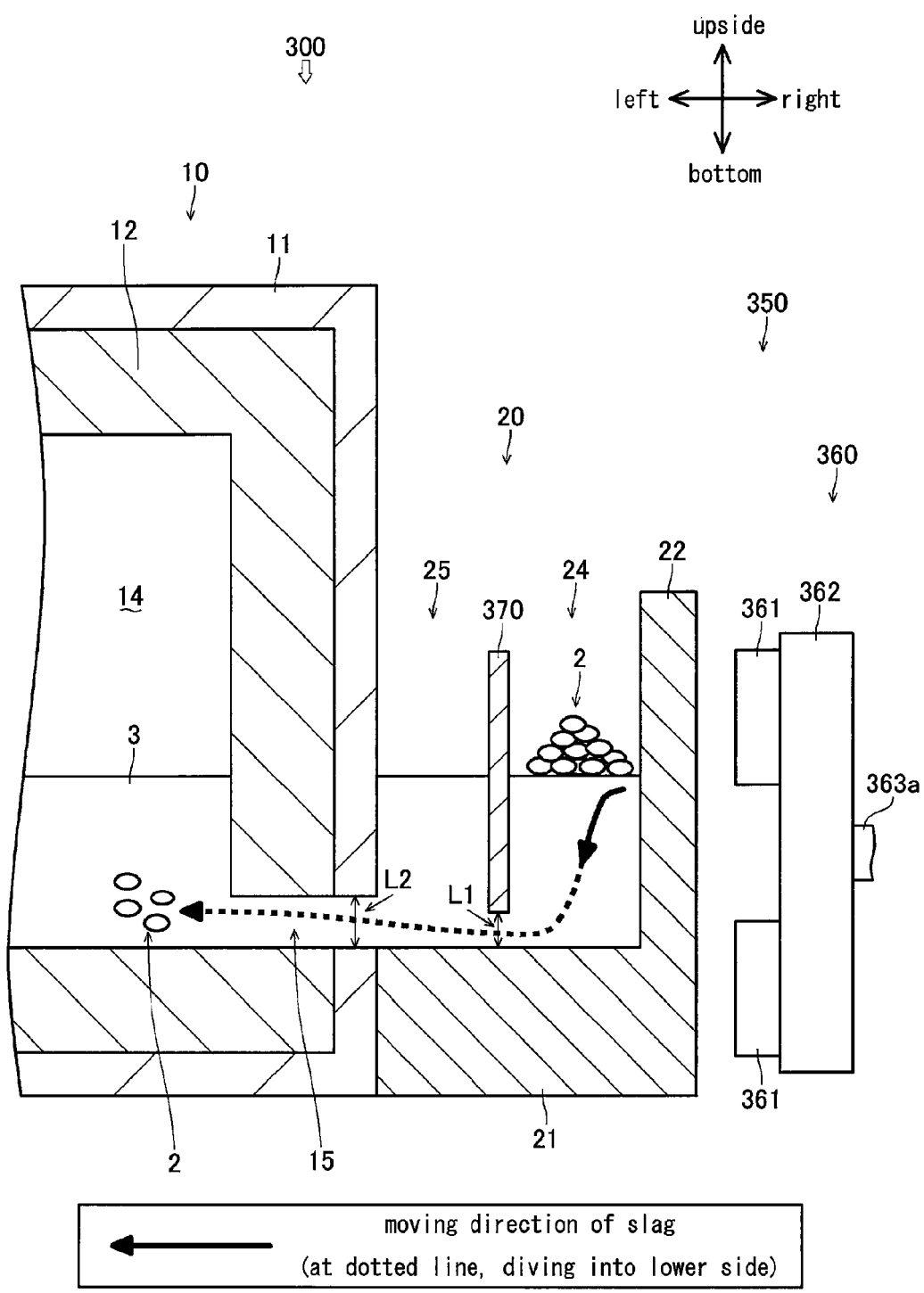
FIG. 13 is a sectional side view of flowing of the melted matters in the third embodiment of the melting apparatus and the agitation device according to the present invention.

The introduced/suspended matter partition member 370 shown in FIGS. 11, 12 and 13 is an embodiment of the introduced/suspended matter partition member according to the present invention.

The introduced/suspended matter partition member 370 is a plate-like member at least the surface thereof is constructed by refractory material such as ceramic. The inside of the introduced/suspended matter partition member 370 may be constructed by heat-resistant material such as metal.

The introduced/suspended matter partition member 370 is arranged inside the charging tank 20 (inside the charging chamber 23). In more detail, the introduced/suspended matter partition member 370 is arranged at the position opposite to the traveling magnetic field generating unit 360 about the sidewall 22 of the rear side of the charging tank 20.

As shown in FIG. 12, the left end of the introduced/suspended matter partition member 370 is fixed to the middle portion in the longitudinal direction of the sidewall 22 of the left side of the charging tank 20, and the right end of the introduced/suspended matter partition member 370 is fixed to the middle portion in the longitudinal direction of the sidewall 22 of the right side of the charging tank 20.

As a result, the introduced/suspended matter partition member 370 divides (partitions) the inner space of the charging tank 20 into two spaces, a charging/melting chamber 24 and a suspended matter recovery chamber 25.

The charging/melting chamber 24 is one of the spaces divided by the introduced/suspended matter partition member 370 closer to the traveling magnetic field generating unit 360.

The charging/melting chamber 24 is a space for introducing the aluminum cutting chips 2 to the molten metal 3. The aluminum cutting chips 2 are introduced to the molten metal 3 through the part of the liquid surface of the molten metal 3 corresponding to the charging/melting chamber 24.

The suspended matter recovery chamber 25 is the other one of the spaces divided by the introduced/suspended matter partition member 370 further from the traveling magnetic field generating unit 360, and is a space provided just at the intermediate between the charging/melting chamber 24 and the holding chamber 14 in the melting tank (intermediate chamber).

The suspended matter recovery chamber 25 is a space for recovering slag 4 (see FIGS. 14 and 15) generated by the melting of the aluminum cutting chips 2 (introduction of the aluminum cutting chips 2 to the molten metal 3 for melting the aluminum cutting chips 2).

The slag 4 is various kinds of contaminants, oxides of adhering matters to the aluminum cutting chips 2 (oil, paints, combustibles and the like), oxides of the surfaces of the aluminum cutting chips 2, non-metallic inclusions, or mixture (aggregate) thereof, and has smaller density (strictly, bulk density) than the molten metal 3 so as to float on the molten metal 3. The slag 4 is an embodiment of the suspended matters according to the present invention.

As shown in FIGS. 11 and 13, the upper end of the introduced/suspended matter partition member 370 is arranged at the position higher than the liquid surface of the molten metal 3.

A gap of predetermined size (L1 in FIG. 13) is formed between the lower end of the introduced/suspended matter partition member 370 and the bottom floor 21 of the charging tank 20, and the charging/melting chamber 24 and the suspended matter recovery chamber 25 are communicated with each other through the lower portion of the space.

The introduced/suspended matter partition member 370 regulates the travel of the molten metal 3 mutually between the charging/melting chamber 24 and the suspended matter recovery chamber 25 in the part near the liquid surface thereof (the part close to the liquid surface of the molten metal 3) (the molten metal 3 cannot travel mutually between the charging/melting chamber 24 and the suspended matter recovery chamber 25 in the part near the liquid surface thereof).

The introduced/suspended matter partition member 370 permits the travel of the molten metal 3 mutually between the charging/melting chamber 24 and the suspended matter recovery chamber 25 (through the gap between the introduced/suspended matter partition member 370 and the bottom floor 21) in the part far from the liquid surface thereof (the part close to the bottom floor 21).

The part forming the rear surface of the structure 11 is arranged inside the melting tank in this embodiment (the combination of the structure 11 and the charging tank 20).

The part forming the rear surface of the structure 11 is arranged at the position further from the traveling magnetic field generating unit 360 than the introduced/suspended matter partition member 370.

The part forming the rear surface of the structure 11 partitions (divides) "the part further from the traveling magnetic field generating unit 360 than the introduced/suspended matter partition member 370 in the inner space of the melting tank in this embodiment" into two spaces, the suspended matter recovery chamber 25 and the holding chamber 14.

The lower portion of the lower end of the part forming the rear surface of the structure 11 (the lower portion of the rear surface of the structure 11) is formed therein with the communication passage 15, and the suspended matter recovery chamber 25 and the holding chamber 14 are communicated with each other through the lower portion of the space.

The suspended matter recovery chamber 25 is one of the two spaces partitioned by the part forming the rear surface of the structure 11 as a border closer to the traveling magnetic field generating unit 360.

In this embodiment, the holding chamber 14 is the other one of the two spaces partitioned by the part forming the rear surface of the structure 11 further from the traveling magnetic field generating unit 360, and the molten metal 3 is taken out (recovered) from the holding chamber 14.

Therefore, the holding chamber 14 corresponds to an embodiment of the molten metal recovery chamber according to the present invention, and the part forming the rear surface of the structure 11 corresponds to an embodiment of the suspended matter/molten metal partition member according to the present invention.

Explanation will be given on the behavior of the aluminum cutting chips 2 in the case that the aluminum cutting chips 2 is introduced to the liquid surface of the molten metal 3 in the charging/melting chamber 24 referring to FIGS. 12 and 13.

By supplying electric power to the motor 363 of the traveling magnetic field generating unit 360, the support member 362 (in its turn, the permanent magnets 361) is rotated counterclockwise when viewed in rear.

Therefore, similarly to the melting furnace 100 shown in FIG. 1, the magnetic field traveling counterclockwise when viewed in rear is generated inside the charging tank 20 (the charging/melting chamber 24 and the suspended matter recovery chamber 25), and "helical flowing which is counterclockwise when viewed in rear" is generated in the molten metal 3 along the magnetic field.

The aluminum cutting chips 2 introduced to the liquid surface of the molten metal 3 in the charging/melting chamber 24 are rolled up into the molten metal 3 along the flowing in the molten metal 3.

The aluminum cutting chips 2 rolled up into the molten metal 3 are moved forward in the molten metal 3 in the charging/melting chamber 24 while rotated counterclockwise when viewed in rear and is melted.

The unmelted aluminum cutting chips 2 are moved from the charging/melting chamber 24 through the gap between the lower end of the introduced/suspended matter partition member 370 and the bottom floor 21 of the charging tank 20 to the suspended matter recovery chamber 25.

The longer the distance from the permanent magnets 361 is, the weaker the magnetic field traveling counterclockwise when viewed in rear in the molten metal 3 is.

The charging/melting chamber 24 and the suspended matter recovery chamber 25 are divided by the introduced/suspended matter partition member 370 at the part near the liquid surface of the molten metal 3 so that "the helical flowing which is counterclockwise when viewed in rear" generated in the molten metal 3 in the charging/melting chamber 24 is intercepted to some extent by the introduced/suspended matter partition member 370.

Accordingly, "the helical flowing which is counterclockwise when viewed in rear" generated in the molten metal 3 in the suspended matter recovery chamber 25 is weaker than "the helical flowing which is counterclockwise when viewed in rear" generated in the molten metal 3 in the charging/melting chamber 24 and is a substantially forward gradual flowing which is helical to some extent.

The density of the unmelted aluminum cutting chips 2 is substantially the same as the density of the molten metal 3, whereby the buoyancy applied to the unmelted aluminum cutting chips 2 by the molten metal 3 substantially balances with the gravity applied to the unmelted aluminum cutting chips 2 (weight).

Therefore, the unmelted aluminum cutting chips 2 moved through the gap between the lower end of the introduced/suspended matter partition member 370 and the bottom floor 21 of the charging tank 20 to the inside of the suspended matter recovery chamber 25 is not raised widely by the buoyancy and is moved forward gradually and is melted.

Then, the unmelted aluminum cutting chips 2 is moved from the suspended matter recovery chamber 25 through the communication passage 15 to the holding chamber 14.

The distance of the holding chamber 14 from the permanent magnets 361 is longer than that of the suspended matter recovery chamber 25, whereby "the helical flowing which is counterclockwise when viewed in rear" is hardly generated in the molten metal 3 in the holding chamber 14.

The part of the aluminum cutting chips 2 introduced to the liquid surface of the molten metal 3 in the charging/melting chamber 24 which are not melted and moved to the holding chamber 14 is heated by the molten metal 3 in the holding chamber 14 so as to melted anyway.

Accordingly, the aluminum cutting chips 2 introduced to the liquid surface of the molten metal 3 in the charging/melting chamber 24 are melted during the movement along "the helical flowing which is counterclockwise when viewed in rear" generated in the molten metal 3 by the traveling magnetic field generating unit 360.

The aluminum cutting chips 2 are moved to the liquid surface of the molten metal 3 in the charging/melting chamber 24, the lower portion of the molten metal 3 in the charging/melting chamber 24, the lower portion of the molten metal 3 in the suspended matter recovery chamber 25, and the holding chamber 14 in this order and not moved to the vicinity of the liquid surface of the molten metal 3 in the suspended matter recovery chamber 25.

Explanation will be given on the behavior of the slag 4 generated by introducing the aluminum cutting chips 2 to the liquid surface of the molten metal 3 in the charging/melting chamber 24 referring to FIGS. 14 and 15.

The slag 4 generated by introducing the aluminum cutting chips 2 to the liquid surface of the molten metal 3 in the charging/melting chamber 24 is rolled up to the inside of the molten metal 3 along the flowing of the molten metal 3.

The slag 4 rolled up to the inside of the molten metal 3 is moved forward in the molten metal 3 in the charging/melting chamber 24 while rotated counterclockwise when viewed in rear.

Then, the slag 4 is moved from the charging/melting chamber 24 through the gap between the lower end of the introduced/suspended matter partition member 370 and the bottom floor 21 of the charging tank 20 to the suspended matter recovery chamber 25.

The slag 4 has smaller density (strictly, bulk density) than the molten metal 3, whereby the buoyancy applied to the slag 4 by the molten metal 3 is larger than the gravity applied to the slag 4 (weight).

Therefore, the slag 4 moved through the gap between the lower end of the introduced/suspended matter partition member 370 and the bottom floor 21 of the charging tank 20 to the suspended matter recovery chamber 25 is separated from the flowing generated in the molten metal 3 in the suspended matter recovery chamber 25 (substantially forward gradual flowing which is helical to some extent) and is raised to the left half of the liquid surface of the molten metal 3 in the suspended matter recovery chamber 25 by the buoyancy.

When the slag 4 is raised to the liquid surface of the molten metal 3, the buoyancy applied to the slag 4 by the molten metal 3 balances with the gravity applied to the slag 4 (weight).

Figure 14:
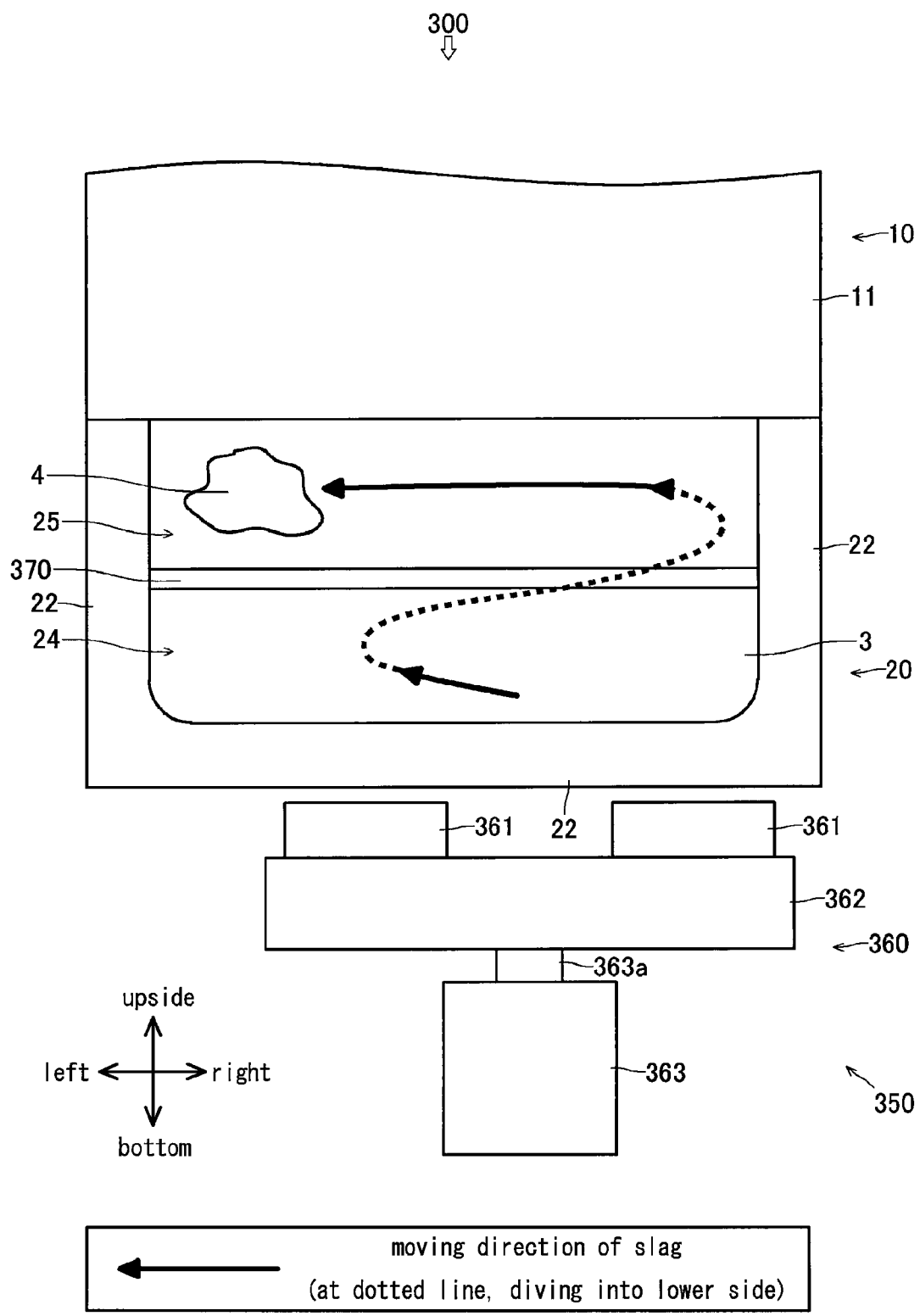
FIG. 14 is a plan view of flowing of suspended matters in the third embodiment of the melting apparatus and the agitation device according to the present invention.
Figure 15:
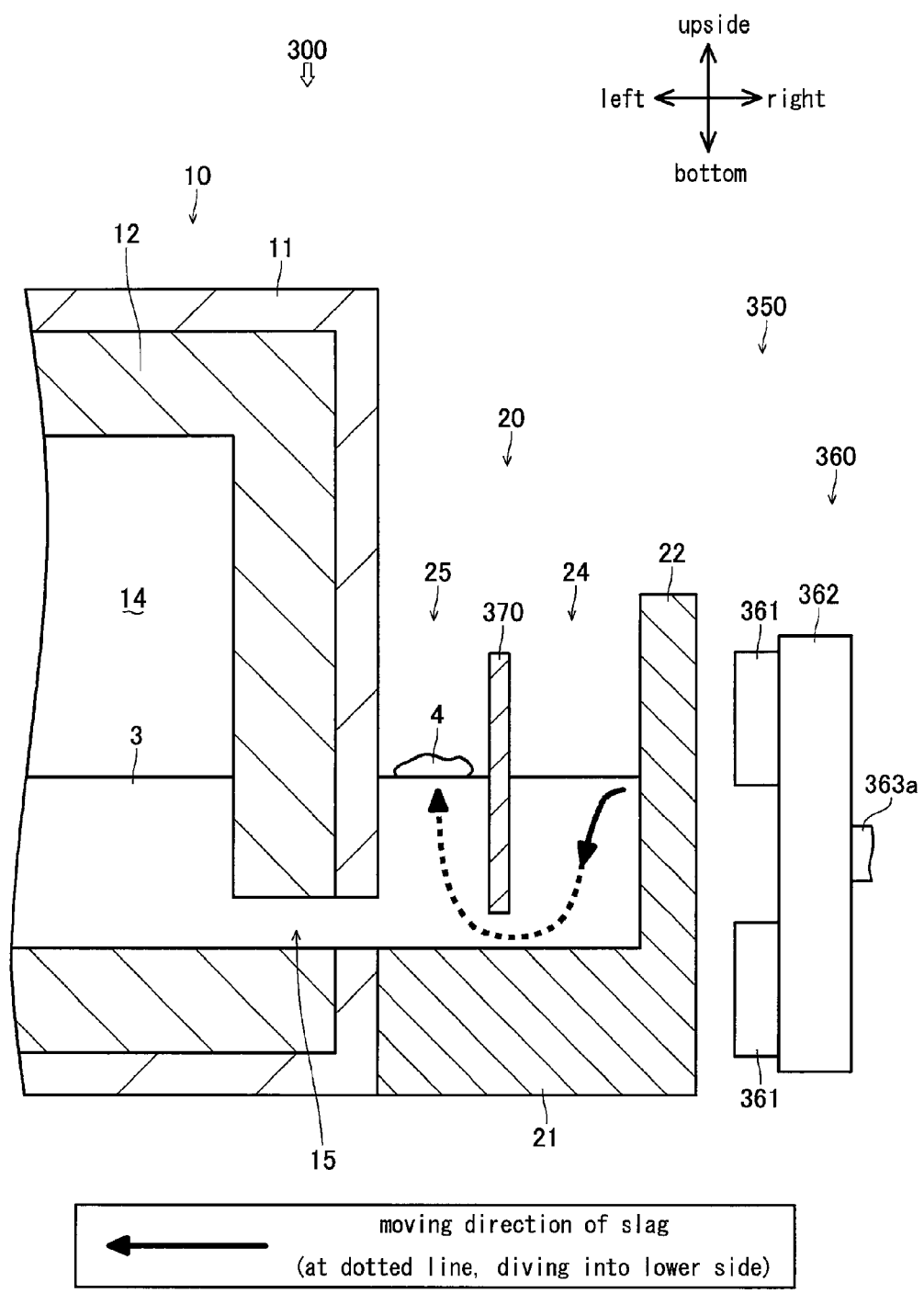
FIG. 15 is a side view of flowing of the suspended matters in the third embodiment of the melting apparatus and the agitation device according to the present invention.

Accordingly, the slag 4 raised to the left half of the liquid surface of the molten metal 3 in the suspended matter recovery chamber 25 is gradually moved to the left end of the liquid surface of the molten metal 3 in the suspended matter recovery chamber 25 along the flowing generated in the molten metal 3 in the suspended matter recovery chamber 25 while floating on the liquid surface of the molten metal 3 and then retained (see FIG. 14).

Accordingly, the slag 4 generated by introducing the aluminum cutting chips 2 to the liquid surface of the molten metal 3 in the charging/melting chamber 24 is separated from the aluminum cutting chips 2 and collected at the specific position in the melting tank (in this embodiment, "the left end of the liquid surface of the molten metal 3 in the suspended matter recovery chamber 25"). The collected slag 4 is recovered (taken out to the outside) manually or automatically.

As a concrete embodiment of the method for recovering manually the slag 4, an operator may scratch off (ladle out) the slag 4 with a tool like a ladle. As a concrete embodiment of the method for recovering automatically the slag 4, a device may be employed which ladle out the slag 4 from the vicinity of the liquid surface of the molten metal 3.

As mentioned above, the agitation device 350, which agitates the molten metal 3 to which the aluminum cutting chips 2 are introduced so as to promote melting of the aluminum cutting chips 2, has the traveling magnetic field generating unit 360 which is arranged outside the melting tank (in this embodiment, outside the charging tank 20) and generates the magnetic field traveling downward along the sidewall of the melting tank (in this embodiment, the sidewall 22 of the rear side in the charging tank 20) inside the melting tank, and the introduced/suspended matter partition member 370 which is arranged inside the melting tank (in this embodiment, inside the charging tank 20) and divides the space inside the melting tank into the two spaces communicated with each other at the lower portions thereof (the charging/melting chamber 24 and the suspended matter recovery chamber 25). One of the two spaces divided by the introduced/suspended matter partition member 370 closer to the traveling magnetic field generating unit 360 (in this embodiment, the rear half space of the charging tank 20) is employed as the charging/melting chamber 24 which is the space for introducing the aluminum cutting chips 2 to the molten metal 3 in the melting tank. The other one of the two spaces divided by the introduced/suspended matter partition member 370 further from the traveling magnetic field generating unit 360 (in this embodiment, the front half space of the charging tank 20) is employed as the suspended matter recovery chamber 25 which is the space for recovering the slag 4 generated by the melting of the aluminum cutting chips 2.

Explanation will be given on the merits of the above-mentioned construction of the agitation device 350 (the melting furnace 300 having the agitation device 350 constructed as the above) in comparison with the conventional arts, the scrap melting promotion device described in the Japanese Patent Laid Open Gazette Hei. 5-255770 (hereinafter, referred to as "conventional art (A)") and the melting processing device described in the Japanese Patent Laid Open Gazette Hei. 6-49553 (hereinafter, referred to as "conventional art (B)").

The device of the conventional art (A) is provided in an open well part of a melting furnace (a part of a melting tank opened upward) and mainly has a rotating blade rotated centering on a vertical shaft, a casing covering the rotating blade, and a chute through which aluminum scrap is introduced to a gap between the rotating blade and the inner peripheral surface of the casing. An opening through which molten metal can be sucked is formed in the lower surface of the casing. An opening through which the molten metal can flow out is formed in the side surface of the casing. The chute is connected to the upper surface of the casing.

The aluminum scrap introduced to the chute falls to the gap between the rotating blade and the inner peripheral surface of the casing, and is agitated by the rotating blade while soaked in the molten metal. As a result, the aluminum scrap is moved through the opening formed in the side surface of the casing to the inside of the melting furnace while melted.

However, in the conventional art (A), the rotating blade generates strong flowing of the molten metal in the melting tank from the open well part to the inside of the main furnace. Therefore, suspended matters are moved on the flowing to the inside of the main furnace, whereby the suspended matters is mixed with the molten metal in the main furnace so that the quality of the molten metal in the main furnace is worsened.

When the state that the suspended matters is mixed with the molten metal in the main furnace is held for a long period, self continuous oxidation reaction is caused by the heat of the suspended matters themselves, whereby surrounding clean molten metal may be oxidized so as to generate electric ashes (new suspended matters).

For solving such a problem, a method is conceivable that a door is provided between the open well part and the main furnace and a cycle of below three processes (a1) to (a3) is repeated.

(a1) The door is closed and the rotating blade is rotated so as to melt the aluminum scrap.

(a2) The suspended matters floating on the liquid surface of the molten metal in the open well part are recovered.

(a3) The door is opened and the molten metal in the open well part is mixed with the molten metal in the inside of the main furnace.

However, in the method, the melting of the aluminum scrap cannot be performed simultaneously with the heating of the molten metal in the main furnace (the processes are performed as batch operation) and the reduction of the molten metal in the open well part caused by introducing the aluminum scrap to the molten metal reduces the melting speed, whereby the productivity (melting amount per unit time) is reduced.

When the door is opened, the heat in the main furnace is emitted to the outside, whereby the energy cost is increased.

In the case that the door is made thick so as to prevent the emission of the heat, the weight of the door is increased, whereby the device is enlarged, the cost of equipment is increased, and energy consumption required for opening and closing of the door is increased.

Furthermore, in the construction of the conventional art (A), the suspended matters are distributed over the whole open well part in the process (a2) so that the recovery of the suspended matters is complicated (time and labor required for the recovery of the suspended matters are increased), whereby the productivity is reduced.

In the conventional art (B), a tip tool (stick member) is soaked to molten metal from an open well part of a melting furnace and the tip tool is moved longitudinally and vertically (moved locomotively), thereby agitating the molten metal.

However, in the conventional art (B), the tip tool (stick member) knocks suspended matters so as to crush them finely while soaking them to the molten metal, whereby fine suspended matters are mixed uniformly with the molten metal and the quality of the molten metal is reduced (the concentration of the suspended matters mixed as foreign matters with the molten metal is increased).

For solving such a problem, the method similar to the method mentioned in the explanation of the conventional art (A) is conceivable. However, in this case, problems similar to that of the conventional art (A) (reduction of the productivity, enlargement of the device, increase of the cost of equipment, increase of the energy consumption required for opening and closing of the door, complexity of the recovery of the suspended matters) are caused.

To the contrarily, in the agitation device 350, the slag 4 can be corrected to the certain position in the suspended matter recovery chamber 25 (the left end of the liquid surface of the molten metal 3 in the charging tank 20) and recovered, whereby the recovery of the slag 4 is easy (it is not necessary to perform the recovery of the slag 4 over the whole liquid surface of the molten metal 3 in the charging tank 20).

In the agitation device 350, the slag 4 can be prevented from being mixed with the molten metal in the holding chamber 14, thereby increasing the quality of the molten metal in the holding chamber 14.

In the agitation device 350, it is not necessary to provide a door partitioning the charging tank 20 (open well part) and the main body 10 (main furnace), whereby the agitation device 350 can be established easily to the existing melting furnace and the cost of equipment at the time of the providing can be suppressed.

In the agitation device 350, the work that the aluminum cutting chips 2 are introduced to the molten metal 3 and melted (the molten metal 3 is agitated), the work that the slag 4 is recovered, and the work that the molten metal in the charging tank 20 is mixed with the molten metal in the main body 10 (the molten metal in the holding chamber 14) are performed respectively at the different positions (the charging/melting chamber 24, the suspended matter recovery chamber 25 and the holding chamber 14). Accordingly, these works can be performed simultaneously in parallel, whereby the continuous operation can be performed so as to improve the productivity.

In this embodiment, the introduced/suspended matter partition member 370 is plate like and the plate surface of the introduced/suspended matter partition member 370 is perpendicular to the axis of the rotational shaft 363a of the motor 363 of the traveling magnetic field generating unit 360, that is, the macro advancing direction of flowing of the molten metal 3 generated by the traveling magnetic field generating unit 360 (the longitudinal direction). However, the present invention is not limited thereto.

Namely, when the slag 4 can be recovered to the suspended matter recovery chamber 25, the plate surface of the suspended matter recovery chamber 25 may be slanted slightly from the perpendicular to the macro advancing direction of flowing of the molten metal 3 generated by the traveling magnetic field generating unit 360.

In this embodiment, the part constituting the rear surface of the structure 11 corresponds to an embodiment of the suspended matter/molten metal partition member according to the present invention. However, the present invention is not limited thereto.

Figure 16:
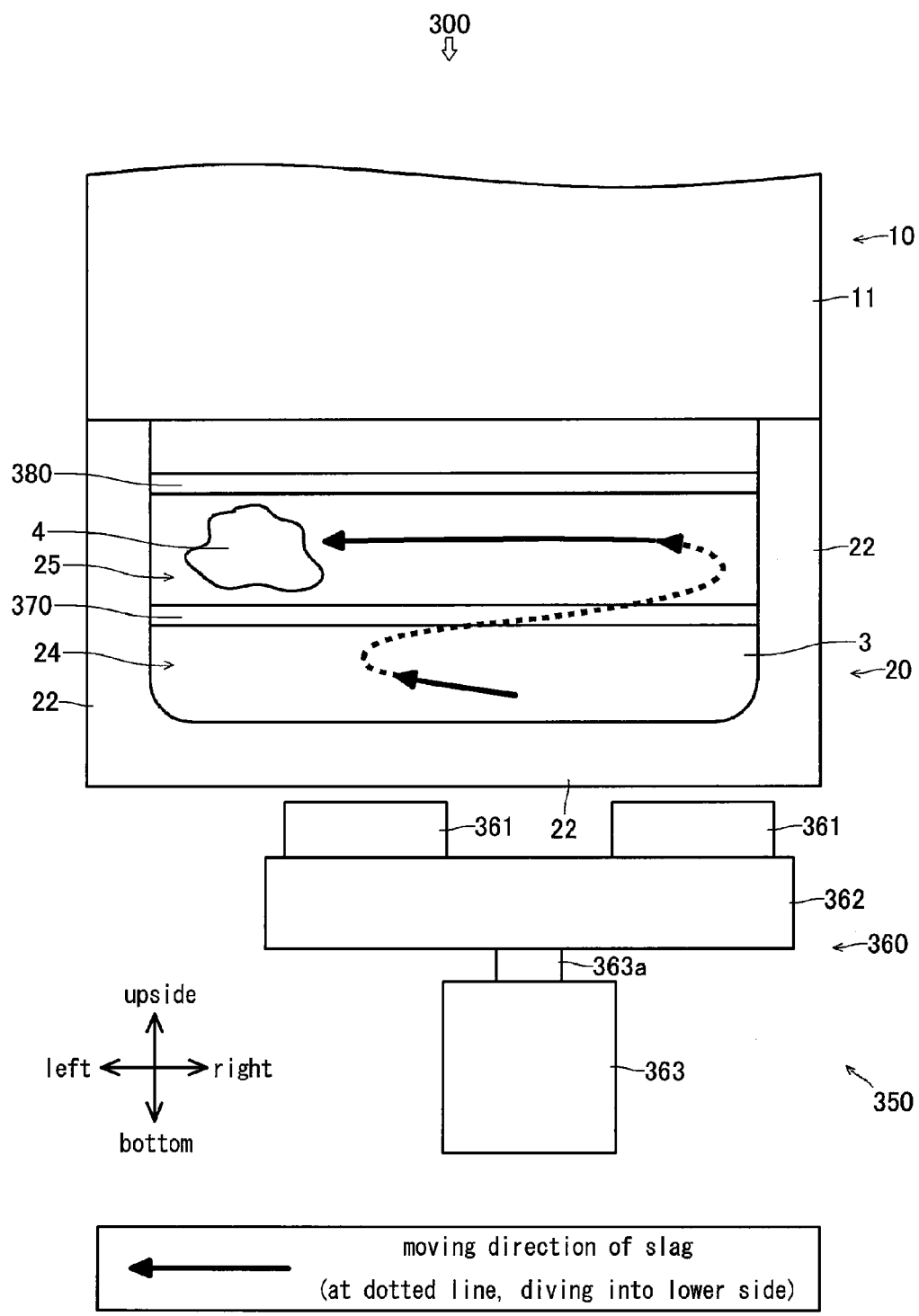
FIG. 16 is a plan view of another mode of the third embodiment of the melting apparatus and the agitation device according to the present invention.
Figure 17:
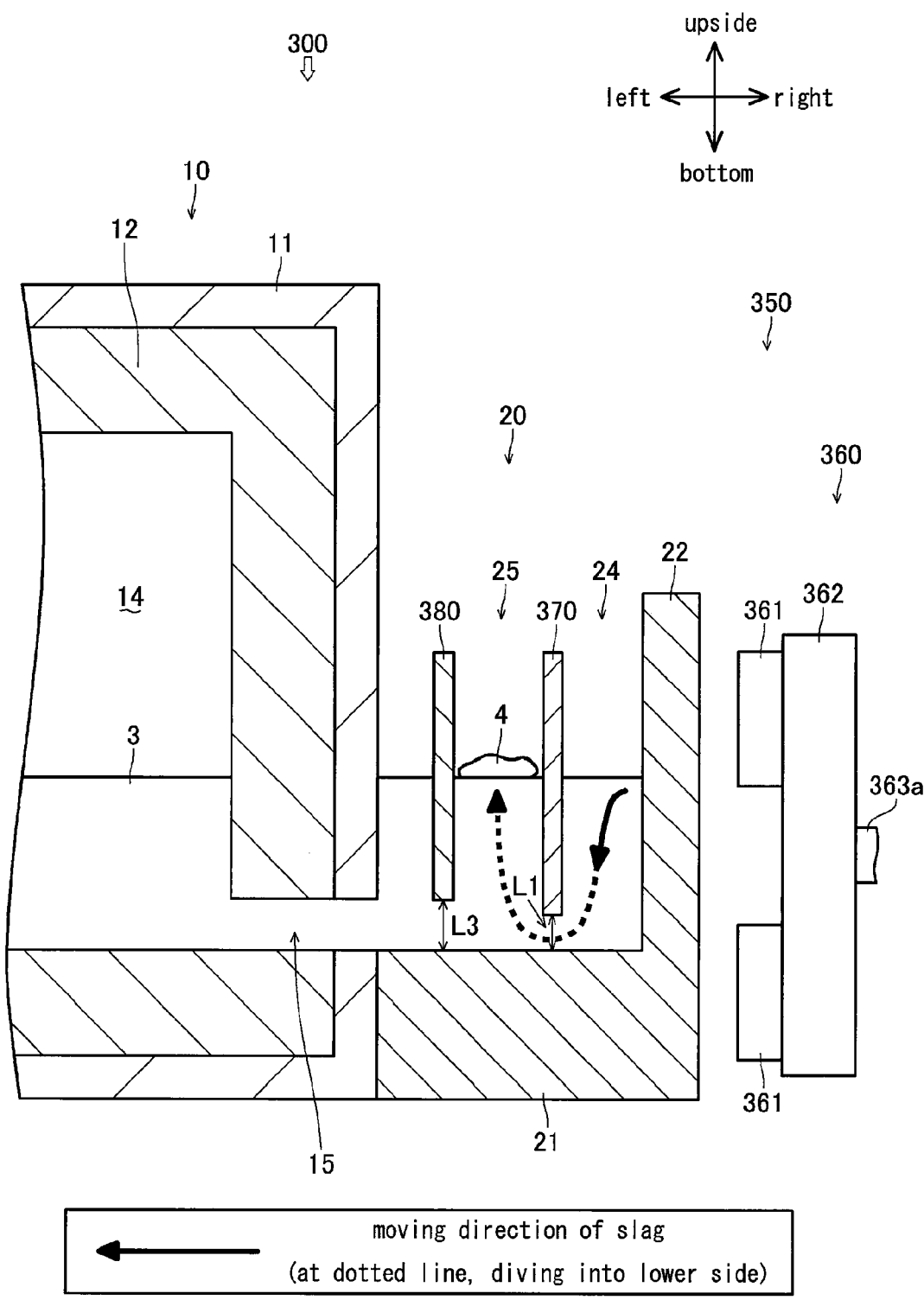
FIG. 17 is a sectional side view of an embodiment of an agitation device having a suspended matter /molten metal partition member.

For example, as shown in FIGS. 16 and 17, a suspended matter/molten metal partition member 380 may alternatively be provided which is arranged inside the melting tank (in FIGS. 16 and 17, inside the charging tank 20) and further from the traveling magnetic field generating unit 360 than the introduced/suspended matter partition member 370.

The suspended matter/molten metal partition member 380 divides the part of the space inside the melting tank further from the traveling magnetic field generating unit 360 than the introduced/suspended matter partition member 370 into two spaces communicated with each other at lower portions thereof.

In the embodiment shown in FIGS. 16 and 17, the suspended matter recovery chamber 25 is one of the two spaces divided by the suspended matter/molten metal partition member 380 closer to the traveling magnetic field generating unit 360.

The holding chamber 14 is the other one of the two spaces divided by the suspended matter/molten metal partition member 380 further from the traveling magnetic field generating unit 360, and serves as a "molten metal recovery chamber" which is a space for recovering the molten metal 3 from the melting tank.

In the embodiment shown in FIGS. 16 and 17, the combination of the part of the inside of the charging tank 20 further from the traveling magnetic field generating unit 360 than the suspended matter/molten metal partition member 380 and the holding chamber 14 corresponds the molten metal recovery chamber.

Similarly to the introduced/suspended matter partition member 370, the suspended matter/molten metal partition member 380 shown in FIGS. 16 and 17 is a plate-like member at least the surface thereof is constructed by refractory material such as ceramic.

Preferably, a gap L1 between the lower end of the introduced/suspended matter partition member 370 and the bottom floor 21 of the charging tank 20 and a height L2 of the communication passage 15 (see FIG. 13), or the gap L1 between the lower end of the introduced/suspended matter partition member 370 and the bottom floor 21 of the charging tank 20 and a gap L3 between the lower end of the suspended matter/molten metal partition member 380 and the bottom floor 21 of the charging tank 20 (see FIG. 17) are set appropriately in synthetic consideration of various elements shown below.

Namely, for preventing the slag 4 from moving into the holding chamber 14 so as to collect efficiently the slag 4 to the suspended matter recovery chamber 25, preferably, the gap L1 and the height L2 (otherwise, the gap L1 and the gap L3) are set as small as possible.

For making the movement of the molten metal 3 between the charging/melting chamber 24 and the suspended matter recovery chamber 25 and between the suspended matter recovery chamber 25 and the holding chamber 14 so as to keep the temperature of the molten metal 3 uniform, or for preventing the unmelted aluminum cutting chips 2 from being caught in the movement passage between the charging/melting chamber 24 and the suspended matter recovery chamber 25 or between the suspended matter recovery chamber 25 and the holding chamber 14, preferably, the gap L1 and the height L2 (otherwise, the gap L1 and the gap L3) are set large.

It may alternatively be constructed that the introduced/suspended matter partition member 370 (and the suspended matter/molten metal partition member 380) is fixed movably vertically about the sidewall 22 of the right and left sides of the charging tank 20 so as to make the gap L1 (and the gap L3) changeable (regulatable).

Figure 18:
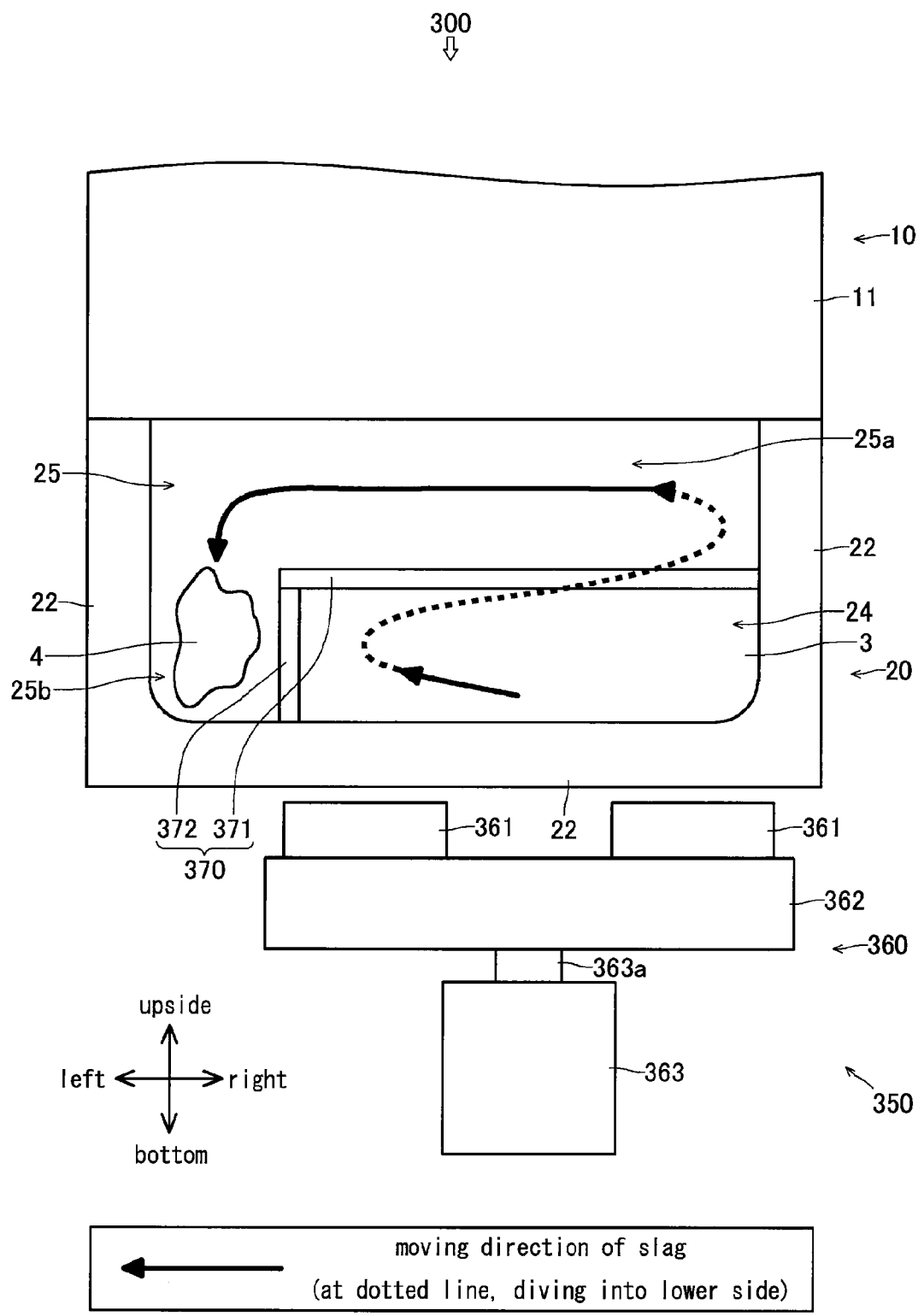
FIG. 18 is a plan view of an embodiment of an agitation device having an introduced/suspended matter partition member.

As shown in FIG. 18, it may alternatively be constructed that the introduced/suspended matter partition member 370 is a (plate-like) member L-like shaped when viewed in plan constructed by a first plate member 371 and a second plate member 372 so that the suspended matter recovery chamber 25 is L-like shaped when viewed in plan constructed by a main chamber 25a and an auxiliary chamber 25b connected to one of ends of the main chamber 25a. Accordingly, the slag 4 floating on the liquid surface of the molten metal 3 in the main chamber 25a of the suspended matter recovery chamber 25 rides on the flowing in the vicinity of the liquid surface of the molten metal 3 and is moved leftward in the main chamber 25a and then collected to the auxiliary chamber 25b after the rearward binding (the flowing of the liquid surface of the molten metal 3 in the main chamber 25a is moved from the other end of the main chamber 25a to the one of ends of the main chamber 25a (the end connected to the auxiliary chamber 25b)).

According to the construction, the suspended matter recovery chamber 25 can set larger, whereby the slag 4 can be collected easily.

The auxiliary chamber 25b to which the slag 4 is collected is arranged further from the holding chamber 14 than the main chamber 25a, whereby the slag 4 can be prevented from being mixed with the molten metal 3 in the holding chamber 14, in its turn the quality of the molten metal 3 in the holding chamber 14 is improved.

Figure 19:
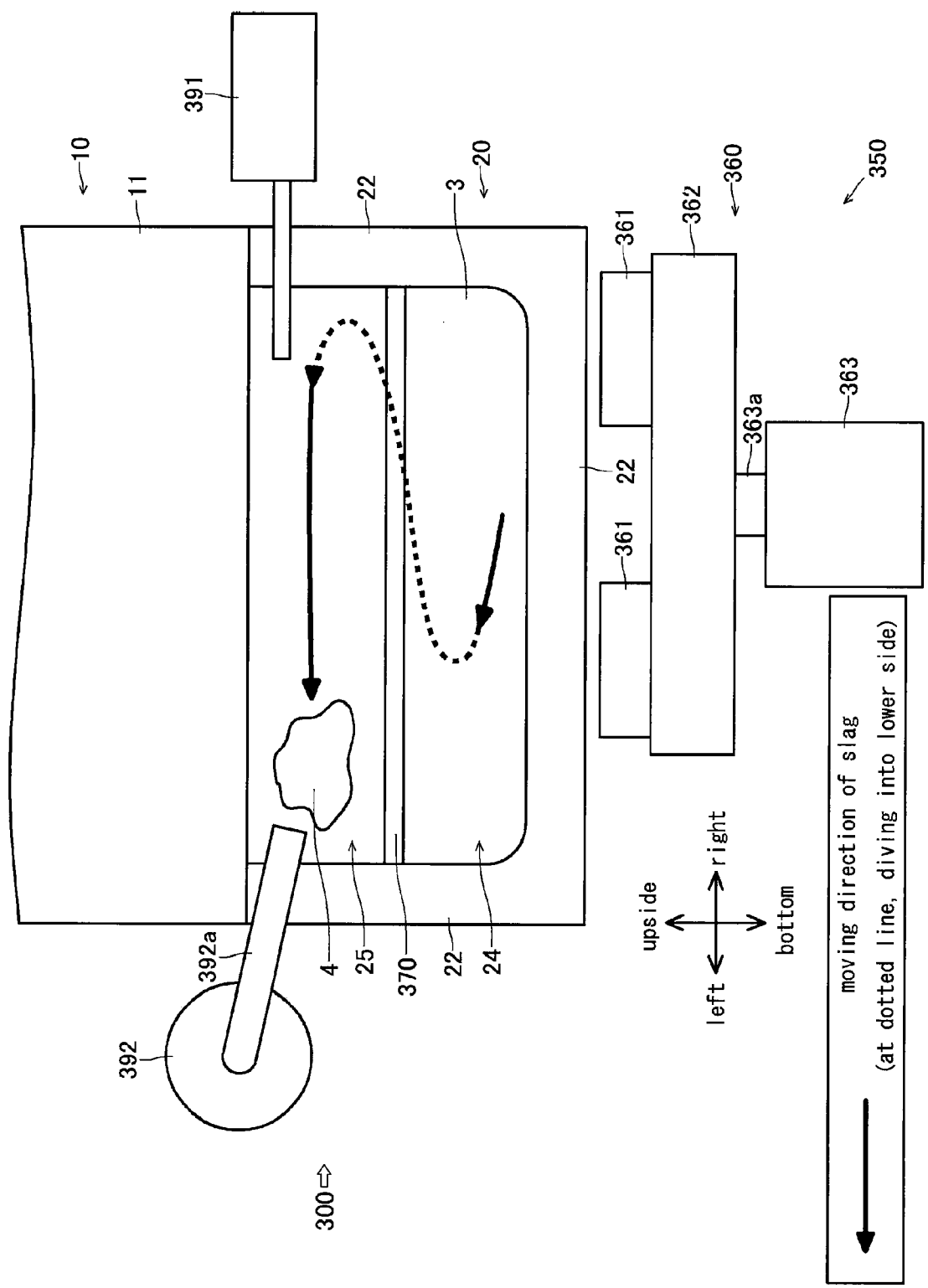
FIG. 19 is a plan view of an embodiment of an agitation device having a flux injection device and a suspended matter recovery device.

As shown in FIG. 19, the agitation device 350 may alternatively have a flux injection device 391 and a suspended matter recovery device 392.

The flux injection device 391 supplies flux to the molten metal 3.

Herein, the "flux" means material which acts on impurities and the like in the molten metal 3 so as to generate the slag 4.

In the embodiment shown in FIG. 19, the flux injection device 391 supplies the flux to the right end of the liquid surface of the molten metal 3 in the suspended matter recovery chamber 25 so as to separate and remove the slag 4 suspended in the molten metal 3 (reduce the mixed concentration of impurities and foreign matters).

The slag 4 can be separated from the aluminum content rolled up in the slag 4, thereby improving melting yield (amount of the aluminum which can be recovered).

The suspended matter recovery device 392 recovers the slag 4 floating on the liquid surface of the molten metal 3.

In the embodiment shown in FIG. 19, the suspended matter recovery device 392 has a jig 392a which ladles the slag 4 and the jig 392a is arranged at the left end of the liquid surface of the molten metal 3 in the suspended matter recovery chamber 25, that is, the position at which the slag 4 is collected finally.

According to the construction, the suspended matter recovery device 392 is not necessary to scan the whole liquid surface of the molten metal 3 in the charging tank 20 so as to recover the slag 4 and can recover the slag 4 only by ladling the slag 4 at the certain position (in the embodiment shown in FIG. 19, the left end of the liquid surface of the molten metal 3 in the suspended matter recovery chamber 25), thereby simplifying the construction of the suspended matter recovery device 392.

At the time of recovery work of the slag 4, the suspended matter recovery device 392 does not interfere with the other units constituting the agitation device 350 or the other members constituting the melting furnace 300, whereby the recovery work of the slag 4 can be performed continuously so as to improve the quality of the molten metal 3 and to reduce labor for the recovery work of the slag 4.

Explanation will be given on a melting furnace 400 which is a fourth embodiment of the melting apparatus according to the present invention and a melting method of the aluminum cutting chips 2 with the melting furnace 400 referring to FIGS. 20 to 34.

Figure 20:
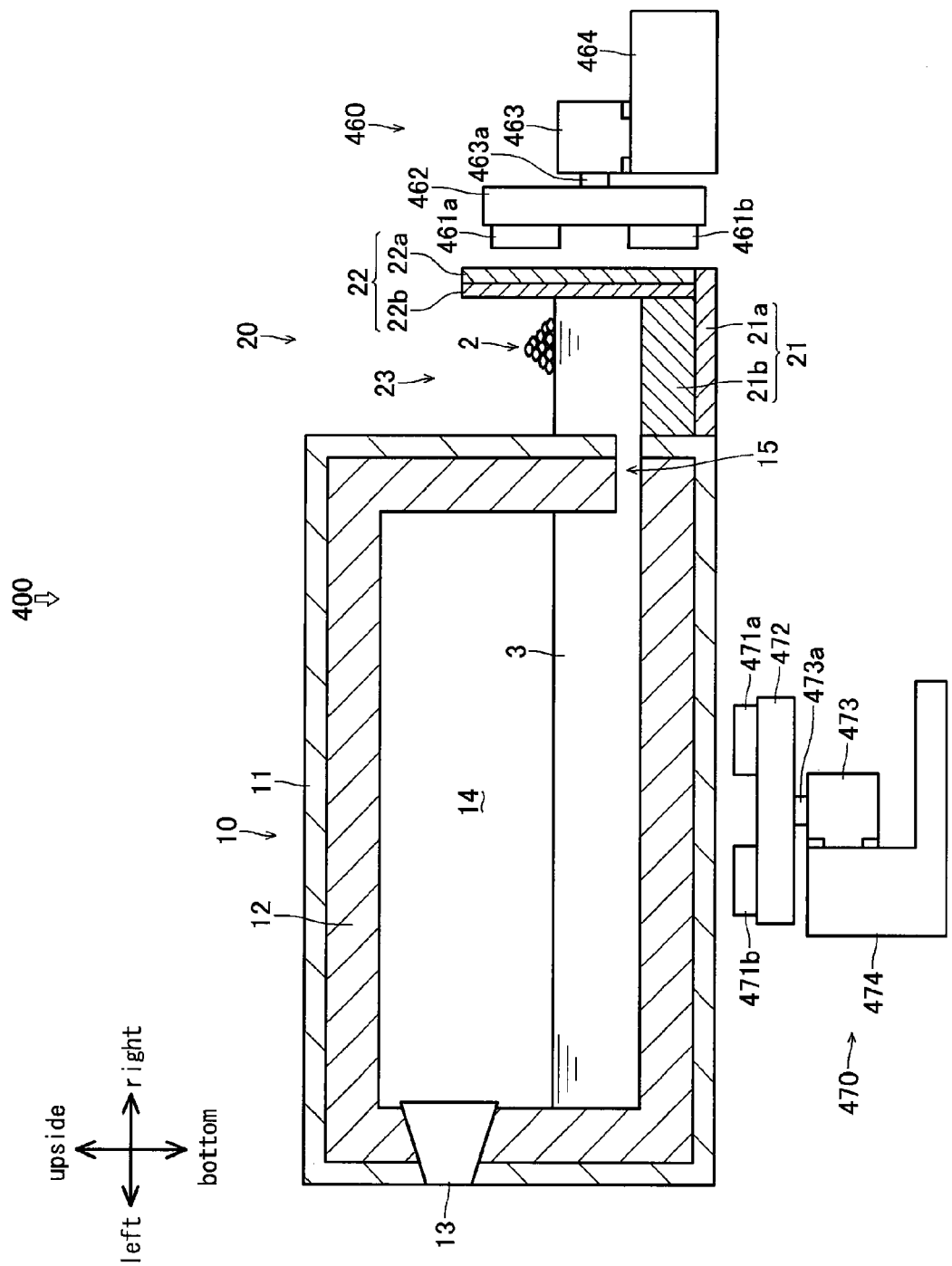
FIG. 20 is a sectional side view of a fourth embodiment of the melting apparatus according to the present invention.

As shown in FIG. 20, the melting furnace 400 generates the molten metal 3 by melting the aluminum cutting chips 2 and has the main body 10, the charging tank 20, a traveling magnetic field generating unit 460 and a traveling magnetic field generating unit 470.

The main body 10 holds the temperature of the molten metal 3 higher than solidifying temperature.

The main body 10 has the structure 11, the fireproof thermal insulating member 12 and the burner 13.

The structure 11 is an embodiment of the outside plate according to the present invention, and is a substantially rectangular box-like member formed by combining plate-like members constructed by metal material (for example, steel plates).

The fireproof thermal insulating member 12 is constructed by ceramics or the like and is fixed to the inner peripheral surface of the structure 11 so as to cover the inner peripheral surface of the structure 11 (the inner plate surfaces of the plate-like members constituting the structure 11).

The holding chamber 14 is formed I side the structure 11 as a space surrounded by the fireproof thermal insulating member 12, and the communication passage 15 is formed in the lower portion of the rear surface of the structure 11. The molten metal 3 is stored in the lower half of the holding chamber 14.

The burner 13 is provided in the upper portion of the inner peripheral surface of the structure 11 and heats air in the holding chamber 14, in its turn the molten metal 3 stored in the lower half of the holding chamber 14 (the molten metal 3 touching the air).

The charging tank 20 is a part of the melting furnace 400 through which the aluminum cutting chips 2 is introduced.

The charging tank 20 is fixed to the rear end of the main body 10. The charging tank 20 has the bottom floor 21 and the sidewall 22.

The bottom floor 21 is a part of the charging tank 20 which is a plate-like part substantially rectangular when viewed in plan and is extended rearward from the rear end of the structure 11.

In this embodiment, the bottom floor 21 has an outside plate 21a and a fireproof member 21b.

The outside plate 21a is an embodiment of the outside plate according to the present invention, and constitutes the outer half (in this embodiment, lower half) of the bottom floor 21. In this embodiment, the outside plate 21a is a plate-like member constructed by metal material (for example, a steel plate).

The fireproof member 21b is constructed by ceramics or the like and is fixed to the inner plate surface (in this embodiment, upper plate surface) of the outside plate 21a so as to cover the inner plate surface of the outside plate 21a.

The sidewall 22 is a part of the charging tank 20 which is a plate-like part and is standingly provided along the left end, rear end and right end of the bottom floor 21. The left and right front ends of the sidewall 22 are respectively extended to the left and right ends of the rear surface of the structure 11.

In this embodiment, the sidewall 22 has an outside plate 22a and a fireproof member 22b.

The outside plate 22a is an embodiment of the outside plate according to the present invention, and constitutes the outer half (in the case of the part of the sidewall 22 standingly provided along the rear end of the bottom floor 21, rear half) of the bottom floor 22. In this embodiment, the outside plate 22a is a plate-like member constructed by metal material (for example, a steel plate).

The fireproof member 22b is constructed by ceramics or the like and is fixed to the inner plate surface (in the case of the part of the sidewall 22 standingly provided along the rear end of the bottom floor 21, front plate surface) of the outside plate 22a so as to cover the inner plate surface of the outside plate 22a.

A charging chamber 23 is formed in the charging tank 20 as a space surrounded by the bottom floor 21, the sidewall 22 and the rear surface of the structure 11. The molten metal 3 is stored in the lower half of the charging chamber 23.

The holding chamber 14 is communicated with the charging chamber 23 through the communication passage 15, and the molten metal 3 can moves between the holding chamber 14 and the charging chamber 23 through the communication passage 15.

The upper surface of the charging tank 20 is opened and the aluminum cutting chips 2 is introduced through the opening into the charging chamber 23. The aluminum cutting chips 2 is introduced into the charging chamber 23 touch the molten metal 3 stored in the lower half of the charging chamber 23 and heated, and then melted when the temperature thereof becomes higher than the melting point.

In this embodiment, the molten metal 3 is stored in the part constructed by combining the rear surface of the structure 11, whose inner peripheral surface is covered by the fireproof thermal insulating member 12, with the charging tank 20. Therefore, each of "the rear surface of the structure 11 whose inner peripheral surface is covered by the fireproof thermal insulating member 12" and "the charging tank 20" is an embodiment of the melting tank according to the present invention.

The traveling magnetic field generating unit 460 is an embodiment of the traveling magnetic field generating unit according to the present invention and generates a magnetic field traveling along the sidewall 22 of the rear side (the outside plate 22a of the rear side) in the charging tank 20 so as to agitate the molten metal 3 to which the aluminum cutting chips 2 are introduced (the molten metal 3 stored in the lower half of the charging chamber 23), in its turn, melting of the aluminum cutting chips 2 is promoted.

As shown in FIG. 20, the traveling magnetic field generating unit 460 is arranged outside the charging tank 20, in mode detail behind the charging tank 20.

The traveling magnetic field generating unit 460 has permanent magnets 461a and 461b, a support member 462, a motor 463 and a fixing member 464.

Figure 21:
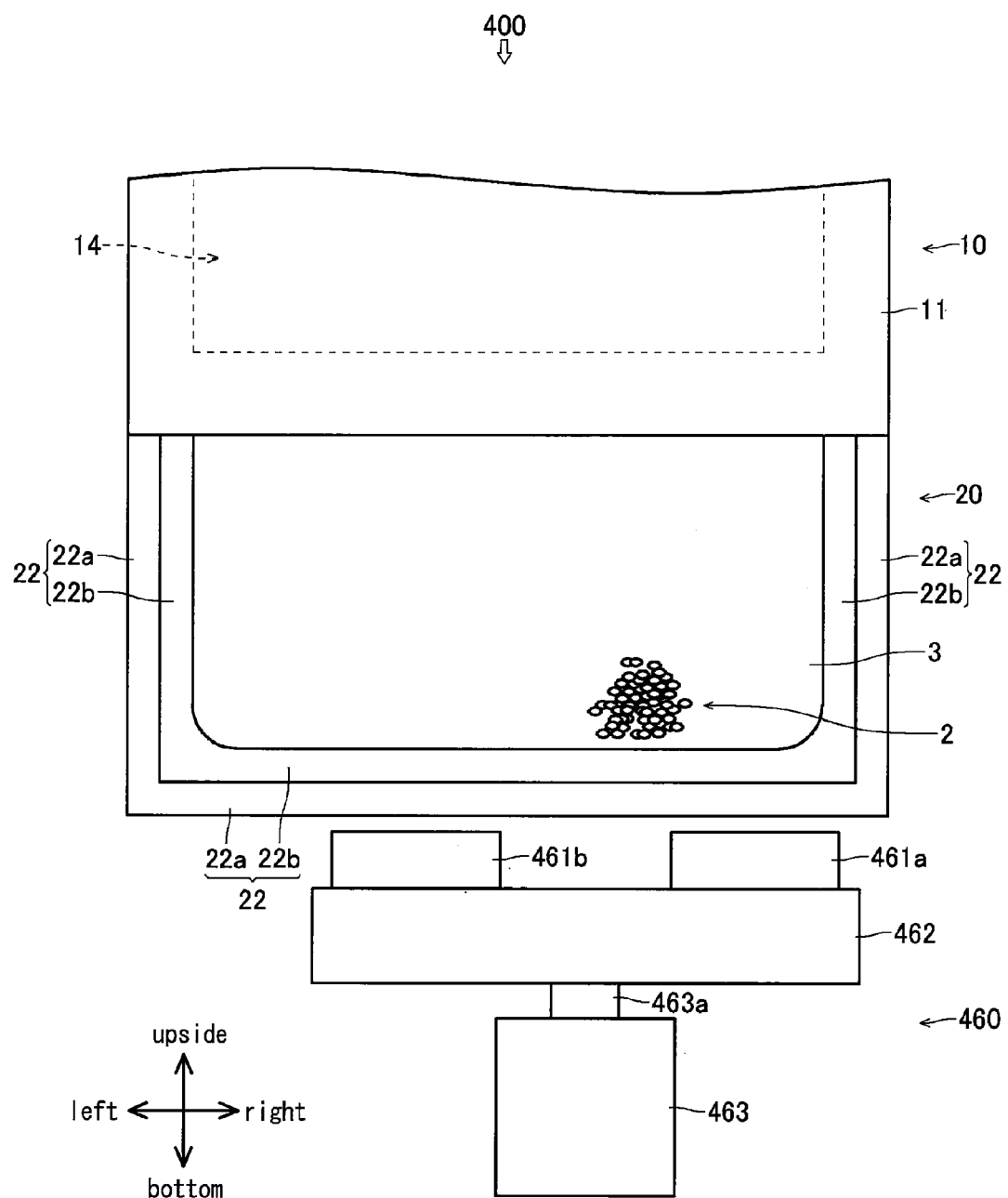
FIG. 21 is a plan view of the fourth embodiment of the melting apparatus according to the present invention.

The permanent magnets 461a and 461b are an embodiment of the permanent magnets according to the present invention and face the sidewall 22 of the rear side (the outer plate surface of the outside plate 22a of the rear side) as shown in FIGS. 20 and 21.

In this embodiment, for generating strong magnetic power, the permanent magnets 461a and 461b are constructed by the neodymium magnet.

In this embodiment, the traveling magnetic field generating unit 460 has the two permanent magnets 461a and 461b. However, the present invention is not limited thereto and the number of the permanent magnets provided in the traveling magnetic field generating unit according to the present invention may be one or the plural.

The support member 462 is an embodiment of the support member according to the present invention and supports the permanent magnets 461a and 461b.

The support member 462 is substantially discoid. The permanent magnets 461a and 461b are fixed to the discoid surface of the support member 462 facing the sidewall 22 of the rear side.

The motor 463 is an embodiment of the motor according to the present invention and rotatively drives the support member 462, in its turn the permanent magnets 461a and 461b fixed to the support member 462.

A rotational shaft 463a of the motor 463 is an embodiment of the rotational shaft according to the present invention and fixed to the support member 462. The axis of the rotational shaft 463a is coaxial to the center line of the support member 462 (the line passing through the centers of the pair of surfaces of the support member 462).

In this embodiment, the motor 463 is an electric motor. However, motor according to the present invention is not limited thereto and may alternatively be a motor rotatively driven by fluid pressure (for example, hydraulic motor or pneumatical motor).

The fixing member 464 fixes the motor 463 to a position behind the charging tank 20. The fixing member 464 is fixed to a structure or the like (not shown).

When the motor 463 is fixed to the fixing member 464, the rotational shaft 463a of the motor 463 is perpendicular to the sidewall 22 of the rear side (the outer plate surface of the outside plate 22a of the rear side). When the motor 463 is fixed to the fixing member 464, the discoid surface of the support member 462 is in parallel to the sidewall 22 of the rear side (the outer plate surface of the outside plate 22a of the rear side).

By supplying electric power to the motor 463, the rotational shaft 463a, the support member 462 fixed to the rotational shaft 463a and the permanent magnets 461a and 461b fixed to the support member 462 are integrally rotated centering on the rotational shaft 463a (in this embodiment, the permanent magnets 461a and 461b are rotated counterclockwise when viewed in rear).

As a result, on the sidewall 22 of the rear side, the magnetic field traveling substantially downward along the sidewall 22 of the rear side is generated in the part facing the left half of the support member 462, and the magnetic field traveling substantially upward along the sidewall 22 of the rear side is generated in the part of the inside of the charging tank 20 corresponding to the part facing the right half of the support member 462 (that is, the position away from the magnetic field traveling downward for a predetermined distance). In other words, the magnetic field traveling counterclockwise when viewed in rear is generated at the part of the inside of the charging tank 20 facing the permanent magnets 461a and 461b.

When the magnetic field traveling substantially downward along the sidewall 22 is generated inside the charging tank 20, in the molten metal 3 stored in the charging tank 20, the substantially downward flowing of the molten metal 3 (molten metal flowing) is generated at the part on which the magnetic field acts.

When the magnetic field traveling substantially upward along the sidewall 22 is generated inside the charging tank 20, in the molten metal 3 stored in the charging tank 20, the substantially upward flowing of the molten metal 3 (molten metal flowing) is generated at the part on which the magnetic field acts.

As a result, in the molten metal 3, flowing of the molten metal 3 (molten metal flowing) is generated which circulates centering on the axis substantially in parallel to the liquid surface of the molten metal 3 (in this embodiment, the rotational shaft 463a of the motor 463).

When the aluminum cutting chips 2 are introduced to the molten metal 3 in which the flowing is generated, the aluminum cutting chips 2 are moved on the flowing of the molten metal 3 (molten metal flowing) and dive into the inside of the molten metal 3 (soaked in the molten metal 3) at the position as which the substantially downward flowing of the molten metal 3 (molten metal flowing) is generated, and then melted by the heat of the molten metal 3.

When the aluminum cutting chips 2 are melted, the temperature of the molten metal 3 in the vicinity of the molten aluminum cutting chips 2 is reduced. However, the molten metal 3 is agitated by the flowing of the molten metal 3 (molten metal flowing) so that the temperature of the molten metal 3 is held substantially equally.

Furthermore, by generating the substantially upward flowing of the molten metal 3 (molten metal flowing), the molten metal 3 with comparative high temperature is moved to the vicinity of the liquid surface of the molten metal 3 to which the aluminum cutting chips 2 are introduced. Accordingly, when a large quantity of the aluminum cutting chips 2 are introduced continuously to the molten metal 3, the aluminum cutting chips 2 can be melted efficiently.

The traveling magnetic field generating unit 470 generates a magnetic field traveling along the plate-like member constituting the lower surface of the structure 11 in the main body 10 so as to agitate the molten metal 3 stored in the lower half of the holding chamber 14, thereby making the temperature of the molten metal 3 uniform.

As shown in FIG. 20, the traveling magnetic field generating unit 470 is arranged outside the main body 10, in more detail below the main body 10.

The traveling magnetic field generating unit 470 has permanent magnets 471a and 471b, a support member 472, a motor 473 and a fixing member 474.

The permanent magnets 471a and 471b face the plate-like member constituting the lower surface of the structure 11.

In this embodiment, for generating strong magnetic power, the permanent magnets 471a and 471b are constructed by the neodymium magnet.

The support member 472 supports the permanent magnets 471a and 471b.

The support member 472 is substantially discoid. The permanent magnets 471a and 471b are fixed to the discoid surface of the support member 472 facing the plate-like member constituting the lower surface of the structure 11.

The motor 473 is rotatively drives the support member 472, in its turn the permanent magnets 471a and 471b fixed to the support member 472.

A rotational shaft 473a of the motor 473 is fixed to the support member 472. The axis of the rotational shaft 473a is coaxial to the center line of the support member 472 (the line passing through the centers of the pair of surfaces of the support member 472).

The fixing member 474 fixes the motor 473 to a position below the plate-like member constituting the lower surface of the structure 11. The fixing member 474 is fixed to a structure or the like (not shown).

When the motor 473 is fixed to the fixing member 474, the rotational shaft 473a of the motor 473 is perpendicular to the lower surface of the plate-like member constituting the lower surface of the structure 11. When the motor 473 is fixed to the fixing member 474, the discoid surface of the support member 472 is in parallel to the lower surface of the plate-like member constituting the lower surface of the structure 11.

By supplying electric power to the motor 473, the rotational shaft 473a, the support member 472 fixed to the rotational shaft 473a and the permanent magnets 471a and 471b fixed to the support member 472 are integrally rotated centering on the rotational shaft 473a (in this embodiment, the permanent magnets 471a and 471b are rotated counterclockwise when viewed in rear).

As a result, the magnetic field traveling counterclockwise when viewed in rear is generated at the part of the inside of the main body 10 facing the permanent magnets 471a and 471b. In the molten metal 3, flowing of the molten metal 3 (molten metal flowing) is generated which circulates centering on the axis substantially in parallel to the liquid surface of the molten metal 3 (in this embodiment, the rotational shaft 473a of the motor 473).

Therefore, the molten metal 3 is agitated in the main body 10 (the holding chamber 14) and the part of the molten metal 3 heated by the burner 13 is mixed with the other part thereof, thereby making the temperature of the molten metal 3 uniform.

Explanation will be given on the arrangement of the permanent magnets 461a and 461b fixed to the support member 462, the polarity of the permanent magnets 461a and 461b, and an induced current C caused on the outside plate 22a of the rear side by the rotation of the permanent magnets 461a and 461b referring to FIGS. 20 to 22.

Figure 22:
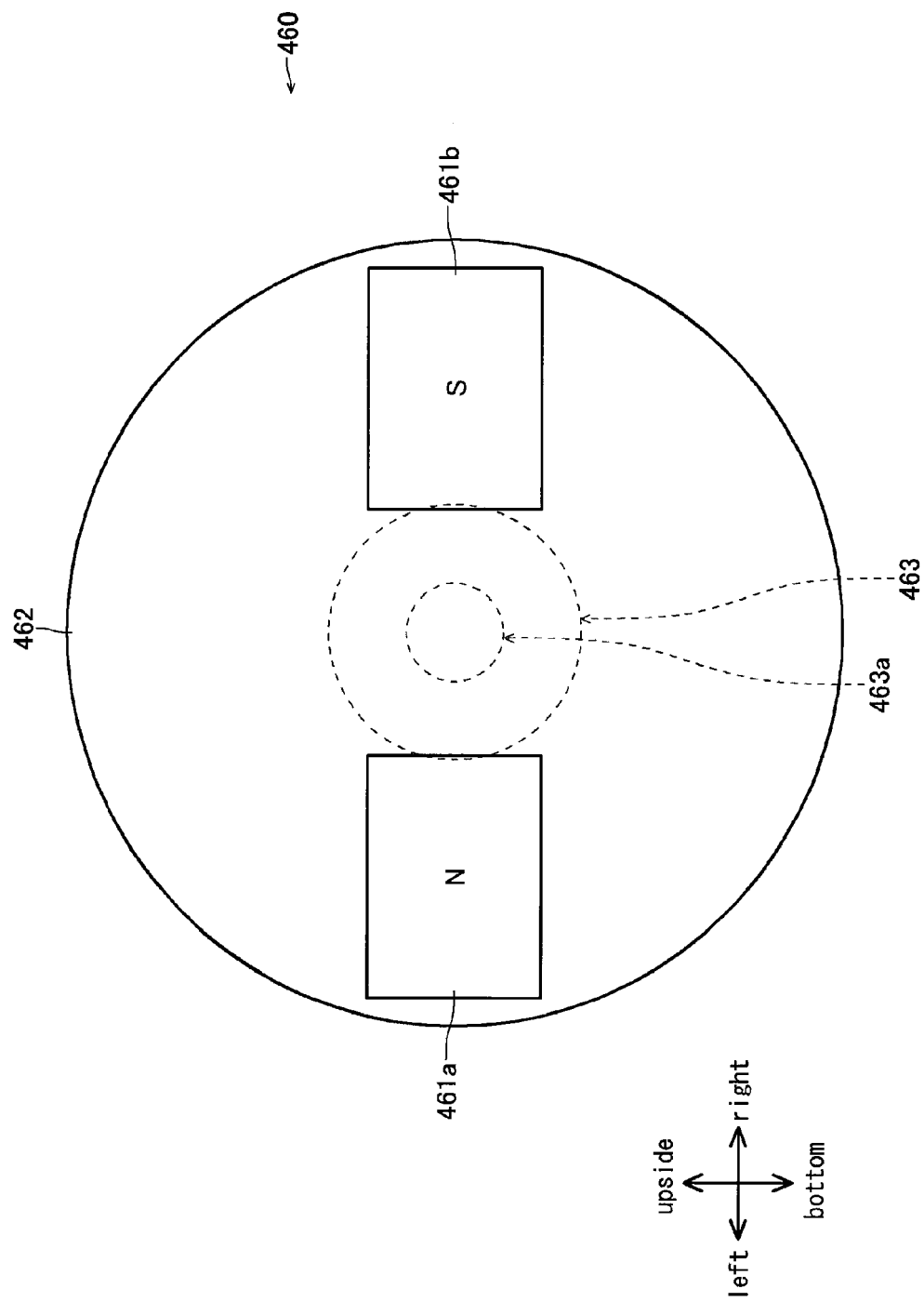
FIG. 22 is a front view of arrangement of permanent magnets in the fourth embodiment of the melting apparatus according to the present invention.

As shown in FIGS. 20 to 22, the permanent magnets 461a and 461b are arranged on the discoid surface of the support member 462 facing the sidewall 22 of the rear side (the outer plate surface of the outside plate 22a of the rear side) at the positions equidistant from the center of the discoid surface.

As shown in FIG. 22, the front surface of the permanent magnet 461a (the surface facing the outer plate surface of the outside plate 22a) is magnetized as the north pole, and the rear surface of the permanent magnet 461a (the surface touching the discoid surface of the support member 462) is magnetized as the south pole.

The front surface of the permanent magnet 461b (the surface facing the outer plate surface of the outside plate 22a) is magnetized as the south pole, and the rear surface of the permanent magnet 461b (the surface touching the discoid surface of the support member 462) is magnetized as the north pole.

Therefore, the north pole of the permanent magnet 461a and the south pole of the permanent magnet 461b are arranged at the positions whose phases are shifted mutually for 180° centering on the rotational shaft 463a when viewed from the axial direction of the rotational shaft 463a (in this embodiment, the longitudinal direction).

Figure 23:
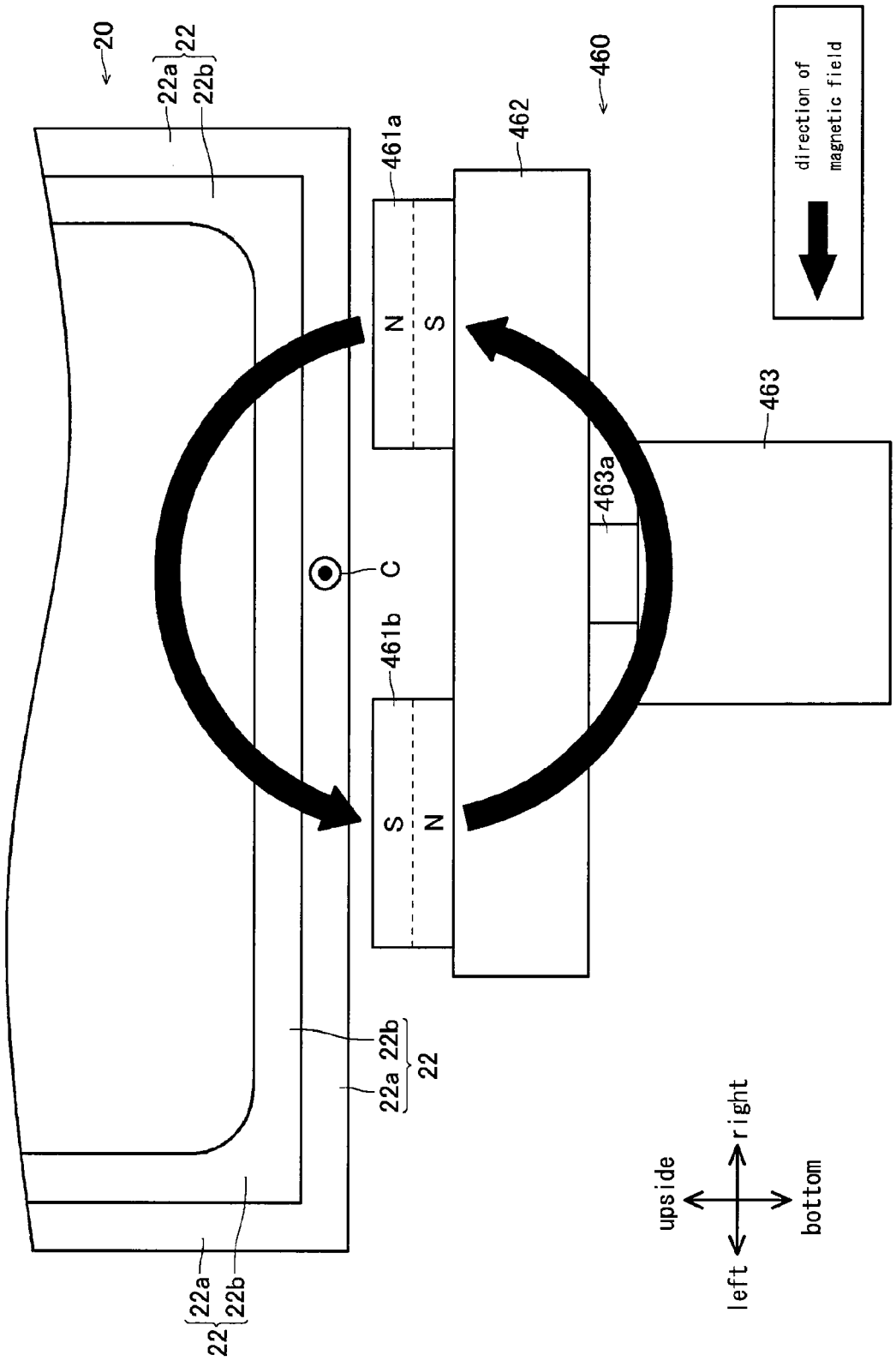
FIG. 23 is a plan view of a magnetic field and an induced current in the fourth embodiment of the melting apparatus according to the present invention.

As shown in FIG. 23, around the permanent magnets 461a and 461b, a magnetic field traveling from the north pole of the front surface of the permanent magnet 461a to the south pole of the front surface of the permanent magnet 461b and a magnetic field traveling from the north pole of the rear surface of the permanent magnet 461b to the south pole of the rear surface of the permanent magnet 461a are formed (see black arrows in FIG. 23).

Therefore, when the support member 462 in which the permanent magnets 461a and 461b are arranged is rotated, on the basis of the right-handed screw rule, the induced current C is caused on the outside plate 22a of the rear side which is metal material arranged in a space surrounded by the permanent magnets 461a and 461b.

Figure 34:
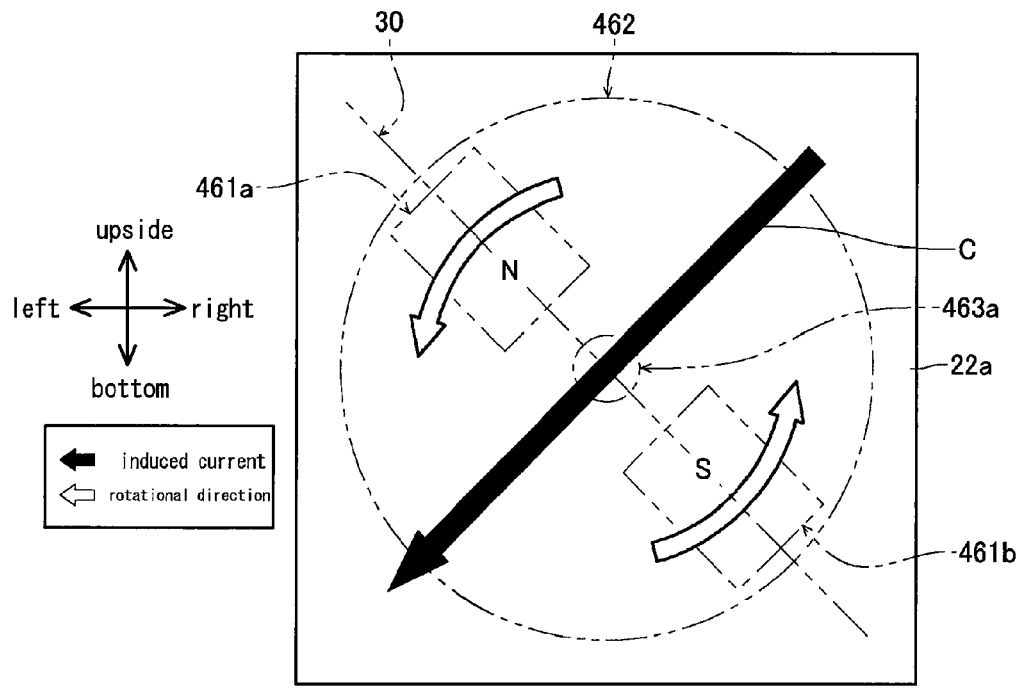
FIG. 34 is a drawing of flowing of the induced current induced on an outside plate in which any resistance slot and auxiliary resistance slot are not formed.
Figure 34:
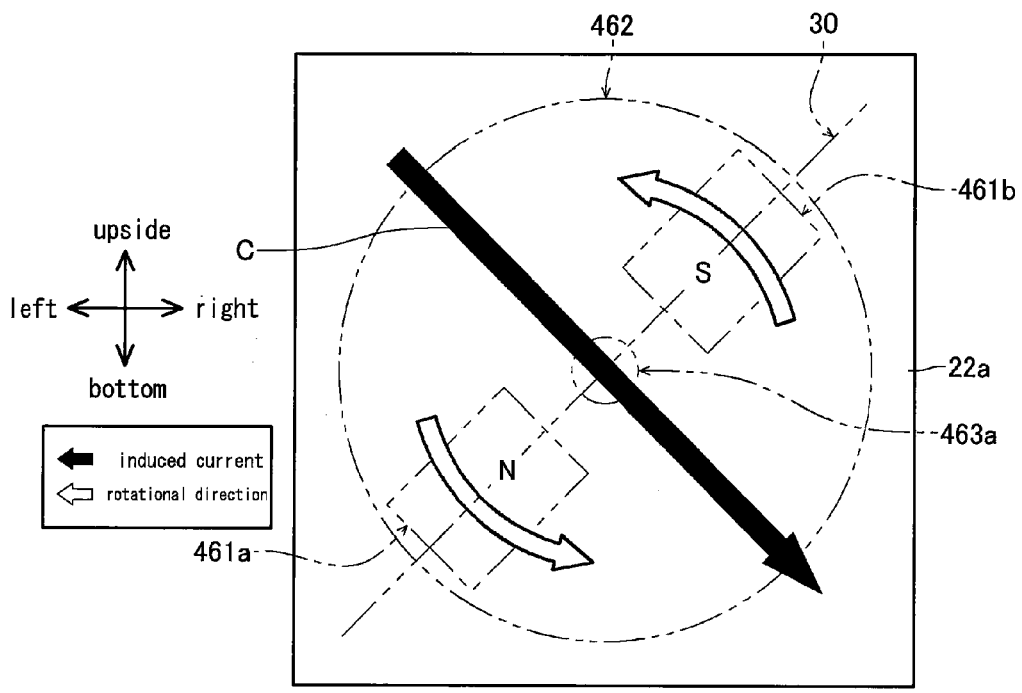

As shown in FIG. 34, in the case that the outside plate 22a of the rear side is a plate-like member formed by simple metal material, when the support member 462 in which the permanent magnets 461a and 461b are arranged is rotated, the induced current C flows in the outside plate 22a of the rear side along the direction in parallel to the plate surface of the outside plate 22a and perpendicular to a line 30 linking the permanent magnets 461a and 461b with each other, whereby the outside plate 22a is heated by the electric resistance of the outside plate 22a and the temperature of the outside plate 22a is raised.

As shown in FIG. 34(a) and (b), the flowing direction of the induced current C is changed following the rotation of the support member 462 in which the permanent magnets 461a and 461b are arranged. However, at the position in the outside plate 22a of the rear side between the permanent magnets 461a and 461b, that is, the position facing the rotational center of the support member 462 (the rotational shaft 463a) (hereinafter, referred to as "center position of the outside plate 22a"), the induced current C always flow.

Therefore, the calorific value at the center position of the outside plate 22a is higher than that of the circumference, and the temperature at the center position of the outside plate 22a is higher than that of the circumference.

Figure 24:
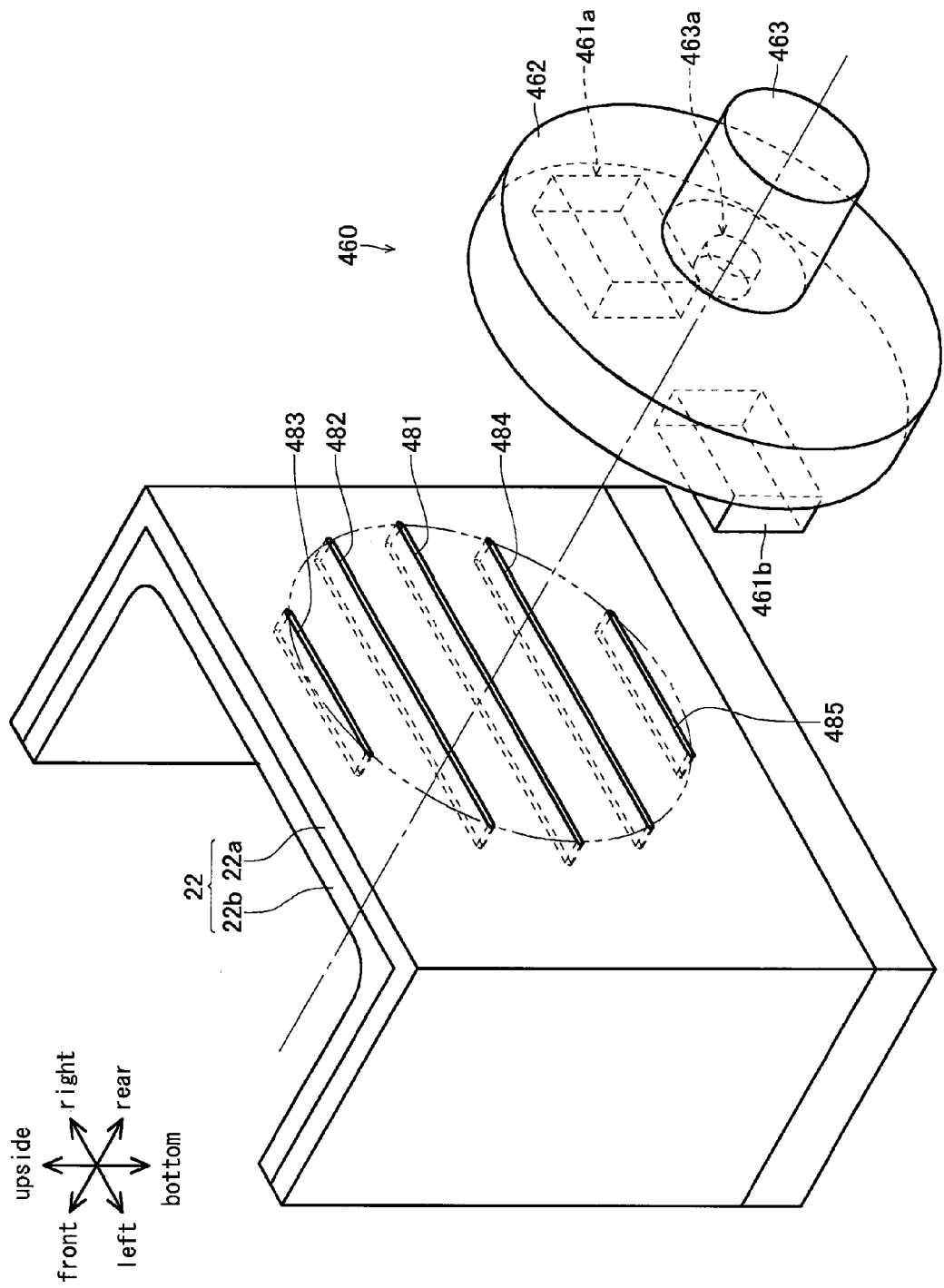
FIG. 24 is a perspective view of a charging tank and a traveling magnetic field generating unit in the fourth embodiment of the melting apparatus according to the present invention.
Figure 25:
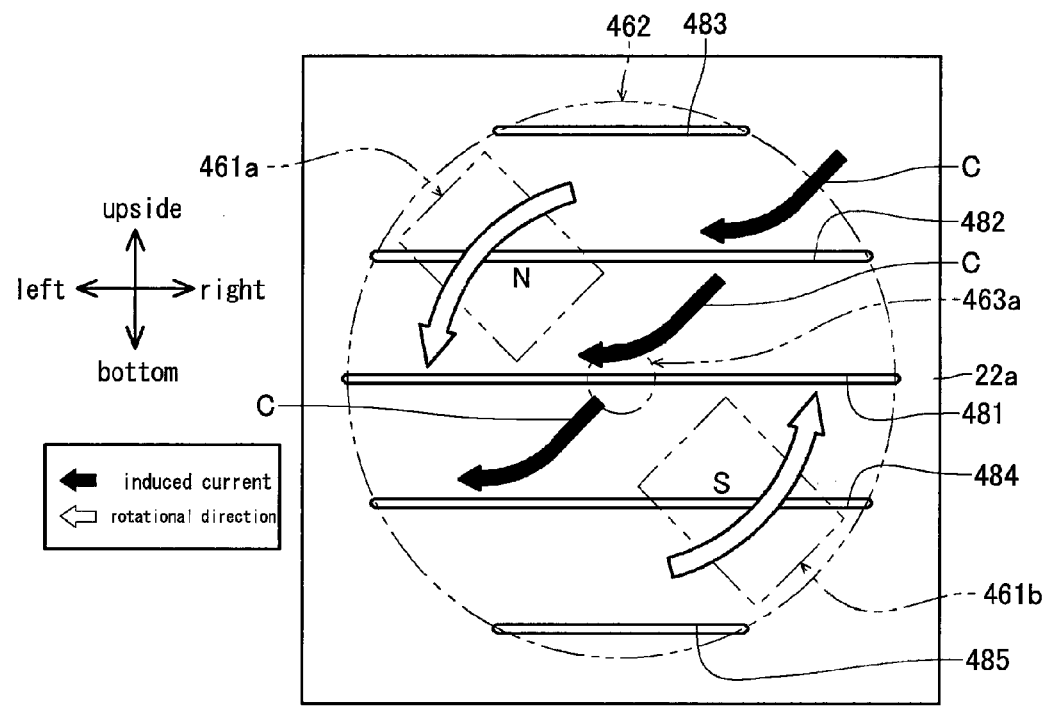
FIG. 25 is a rear view of flowing of the induced current in the fourth embodiment of the melting apparatus according to the present invention.
Figure 25:
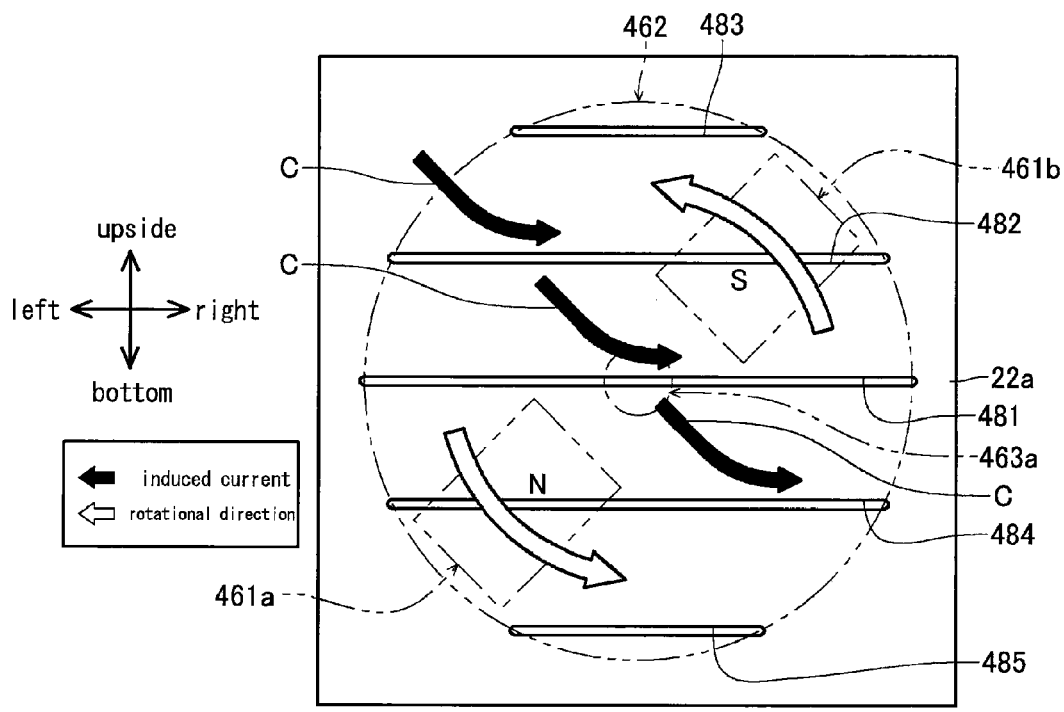

As shown in FIGS. 24 and 25, in this embodiment, a resistance slot 481 and auxiliary resistance slots 482, 483, 484 and 485 are formed in the part facing the permanent magnets 461a and 461b in the outer plate surface of the outside plate 22a of the rear side (more strictly, the part in the outer plate surface of the outside plate 22a of the rear side surrounded by the rotational locus of the permanent magnets 461*a* and 461*b* when viewed along the axial direction of the rotational shaft 463*a* which corresponds to the part surrounded by an alternate long and two short dashes line in FIG. 25). Accordingly, "calorification of the outside plate 22*a* of the rear side caused by the induced current C always flowing (being concentrated) at the center of the outside plate 22*a* (abnormal overheat)" is reduced.

Explanation will be given on the detailed construction of the resistance slot 481 and the auxiliary resistance slots 482, 483, 484 and 485 referring to FIGS. 24 and 25.

The resistance slot 481 is an embodiment of the resistance band according to the present invention.

In this embodiment, the resistance slot 481 penetrates the outside plate 22*a* of the rear side from the inner plate surface (front plate surface) to the outer plate surface (rear plate surface).

The part of the outside plate 22*a* at which the resistance slot 481 is formed is substantially hollow and the resistance slot 481 is normally filled with air.

Therefore, the electric resistance of the resistance slot 481 (more strictly, the part of the outside plate 22*a* at which the resistance slot 481 is formed) is larger than the electric resistance of the other part of the outside plate 22*a* (the part of the outside plate 22*a* at which the resistance slot 481 and the auxiliary resistance slots 482, 483, 484 and 485 are not formed) constructed by metal material.

As shown in FIG. 25, the middle part of the resistance slot 481 (in this embodiment, the center of the resistance slot 481) is arranged at the center of the outside plate 22*a*.

Both of the ends of the resistance slot 481 are arranged at the positions far from the center of the outside plate 22*a* (in this embodiment, the left and right ends of the part of the outer plate surface of the outside plate 22*a* of the rear side surrounded by the rotational locus of the permanent magnets 461*a* and 461*b* when viewed along the axial direction of the rotational shaft 463*a*).

Therefore, in this embodiment, the resistance slot 481 is extended laterally while passing through the center of the outside plate 22*a*.

As shown in FIG. 25, the resistance slot 481 has no break in the middle, that is, the resistance slot 481 is continuous from the left end via the center to the right end.

The auxiliary resistance slots 482, 483, 484 and 485 are an embodiment of the resistance band according to the present invention.

In this embodiment, each of the auxiliary resistance slots 482, 483, 484 and 485 penetrates the outside plate 22*a* of the rear side from the inner plate surface (front plate surface) to the outer plate surface (rear plate surface).

The part of the outside plate 22*a* at which the resistance slot 481 is formed is substantially hollow and the auxiliary resistance slots 482, 483, 484 and 485 are normally filled with air.

Therefore, the electric resistance of each of the auxiliary resistance slots 482, 483, 484 and 485 (more strictly, the part of the outside plate 22*a* at which each of the auxiliary resistance slots 482, 483, 484 and 485 is formed) is larger than the electric resistance of the other part of the outside plate 22*a* (the part of the outside plate 22*a* at which the resistance slot 481 and the auxiliary resistance slots 482, 483, 484 and 485 are not formed) constructed by metal material.

As shown in FIG. 25, the auxiliary resistance slot 482 is formed at the position upper than the auxiliary resistance slot 482 for a predetermined distance in the part of the outside plate 22*a* of the rear side facing the permanent magnets 461*a* and 461*b*.

The auxiliary resistance slot 483 is formed at the position upper than the resistance slot 481 for a predetermined distance in the part of the outside plate 22*a* of the rear side facing the permanent magnets 461*a* and 461*b*.

The auxiliary resistance slot 484 is formed at the position lower than the resistance slot 481 for a predetermined distance in the part of the outside plate 22*a* of the rear side facing the permanent magnets 461*a* and 461*b*.

The auxiliary resistance slot 485 is formed at the position lower than the auxiliary resistance slot 484 for a predetermined distance in the part of the outside plate 22*a* of the rear side facing the permanent magnets 461*a* and 461*b*.

In this embodiment, each of the auxiliary resistance slots 482, 483, 484 and 485 is extended laterally and separated from the resistance slot 481 (the auxiliary resistance slots 482, 483, 484 and 485 are not connected to each other).

Explanation will be given on the principle of reducing calorification of the outside plate 22*a* of the rear side (abnormal overheat) by the resistance slot 481 and the auxiliary resistance slots 482, 483, 484 and 485 referring to FIG. 25.

The part of the outside plate 22*a* of the rear side facing the permanent magnets 461*a* and 461*b* is divided by the resistance slot 481 and the auxiliary resistance slots 482, 483, 484 and 485 into six parts, "the part above the auxiliary resistance slot 483", "the part between the auxiliary resistance slot 483 and the auxiliary resistance slot 482", "the part between the auxiliary resistance slot 482 and the resistance slot 481", "the part between the resistance slot 481 and the auxiliary resistance slot 484", "the part between the auxiliary resistance slot 484 and the auxiliary resistance slot 485", and "the part below the auxiliary resistance slot 485".

The resistance slot 481 and the auxiliary resistance slots 482, 483, 484 and 485 have larger electric resistance than the metal material constituting the outside plate 22*a* of the rear side, whereby the flowing of current across the six adjacent parts is obstructed (otherwise, the current value across the adjacent parts is reduced).

Therefore, when the support member 462 in which the permanent magnets 461*a* and 461*b* are arranged is rotated while facing the outside plate 22*a* of the rear side in which the resistance slot 481 and the auxiliary resistance slots 482, 483, 484 and 485 are formed as shown in FIG. 25, the induced current C is caused at each of the parts divided by the resistance slot 481 and the auxiliary resistance slots 482, 483, 484 and 485. Accordingly, the current value of each induced current C is smaller than that of the case that the induced current C flows continuously in the part surrounded by the rotational locus of the permanent magnets 461*a* and 461*b* from one of ends to the other end via the center of the outside plate 22*a* (see FIG. 34).

The resistance slot 481 and the auxiliary resistance slots 482, 483, 484 and 485 obstruct the current flowing across the adjacent parts, whereby the induced current C caused in each of the part divided by the resistance slot 481 and the auxiliary resistance slots 482, 483, 484 and 485 and flowing toward the center of the outside plate 22*a* changes its direction at the time of reaching the vicinity of the resistance slot 481 and the auxiliary resistance slots 482, 483, 484 and 485, and then flows along the lengthwise direction of the resistance slot 481 and the auxiliary resistance slots 482, 483, 484 and 485 (in this embodiment, the lateral direction).

Accordingly, the induced current C is prevented from being concentrated at the center of the outside plate 22*a*, whereby the calorification at the center of the outside plate 22*a* is reduced.

Explanation will be given on results of experiment showing the fact that the calorification of the outside plate 22*a* of the rear side (abnormal overheat) is reduced by the resistance slot 481 and the auxiliary resistance slots 482, 483, 484 and 485 referring to FIGS. 26 to 30.

Figure 26:
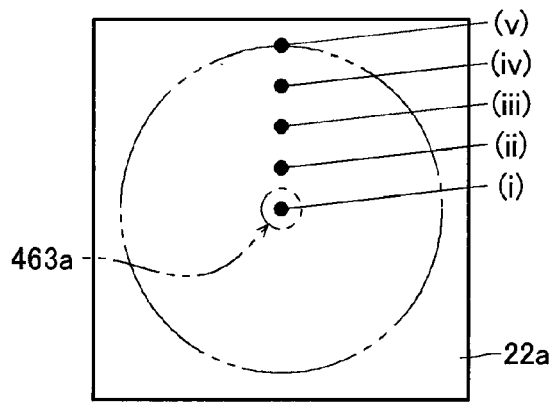
FIG. 26 is a rear view of arrangement of slots formed in an outside plate according to comparing example and the present invention.
Figure 26:
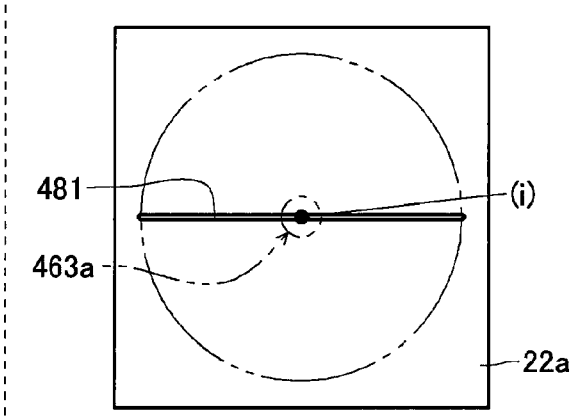
Figure 26:
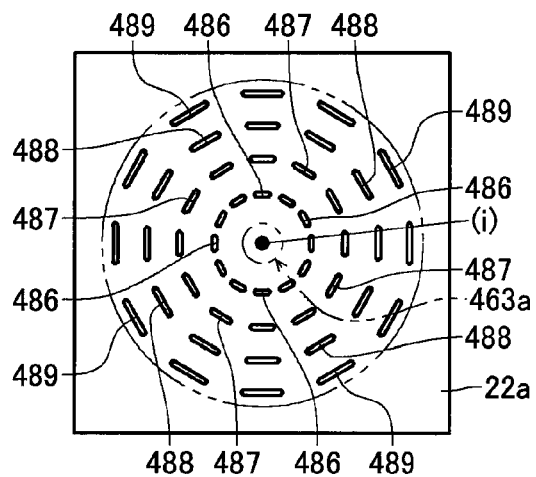
Figure 26:
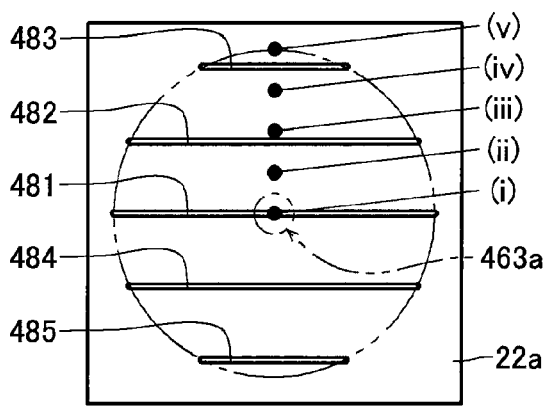
Figure 26:
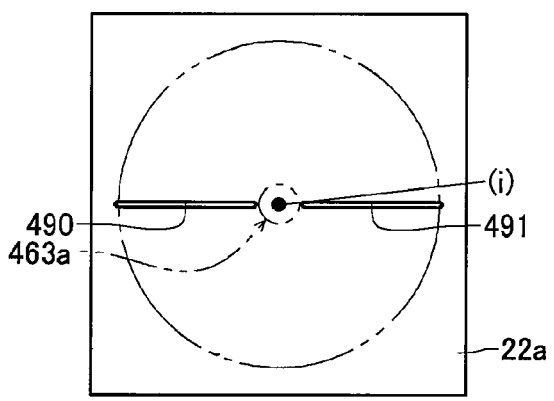

As shown in FIG. 26(*a*) to (*e*), at the time of performing the experiment, five kinds of the outside plates 22*a* which are different in the mode of the slots (number, length, arrangement and the like of the slots) are prepared.

In the outside plate surface of the outside plate 22*a* shown in FIG. 26(*a*), any slot is not formed in the part facing the permanent magnets 461*a* and 461*b* (the part surrounded by an alternate long and two short dashes line in FIG. 26(*a*)).

In the outside plate surface of the outside plate 22*a* shown in FIG. 26(*b*), a plurality of slots 486, a plurality of slots 487, a plurality of slots 488 and a plurality of slots 489 are formed in the part facing the permanent magnets 461*a* and 461*b* (the part surrounded by an alternate long and two short dashes line in FIG. 26(*b*)).

The slots 486 are arranged on a circle centering on the center of the outside plate 22*a* at predetermined intervals. Each of the slots 486 is independent (the adjacent slots 486 are not connected to each other).

The slots 487 are arranged on a circle, centering on the center of the outside plate 22*a* and having larger diameter than the circle corresponding to the slots 486, at predetermined intervals. Each of the slots 487 is independent.

The slots 488 are arranged on a circle, centering on the center of the outside plate 22*a* and having larger diameter than the circle corresponding to the slots 487, at predetermined intervals. Each of the slots 488 is independent.

The slots 489 are arranged on a circle, centering on the center of the outside plate 22*a* and having larger diameter than the circle corresponding to the slots 488, at predetermined intervals. Each of the slots 489 is independent.

In the outside plate surface of the outside plate 22*a* shown in FIG. 26(*c*), two slots 490 and 491 are formed in the part facing the permanent magnets 461*a* and 461*b* (the part surrounded by an alternate long and two short dashes line in FIG. 26(*c*)).

The slots 490 and 491 are extended laterally and are arranged for a predetermined interval about the center of the outside plate 22*a*.

In the outside plate surface of the outside plate 22*a* shown in FIG. 26(*d*), the resistance slot 481 is formed in the part facing the permanent magnets 461*a* and 461*b* (the part surrounded by an alternate long and two short dashes line in FIG. 26(*d*)).

In the outside plate surface of the outside plate 22*a* shown in FIG. 26(*e*), the resistance slot 481 and the auxiliary resistance slots 482, 483, 484 and 485 are formed in the part facing the permanent magnets 461*a* and 461*b* (the part surrounded by an alternate long and two short dashes line in FIG. 26(*e*)).

The resistance slot 481 and the auxiliary resistance slots 482, 483, 484 and 485 shown in FIG. 26(*e*) correspond to the melting furnace 400 shown in FIGS. 20 to 25 (the fourth embodiment of the melting apparatus according to the present invention).

(a), (b) and (c) of FIG. 26 correspond to "comparative embodiments (embodiments which are not modes for carrying out the present invention)". (d) and (e) of FIG. 26 correspond to "modes for carrying out the present invention".

The outside plate 22*a* of the inside of the charging tank 20 of the melting furnace 400 shown in FIGS. 20 to 25 is exchanged with the outside plates 22*a* shown in FIG. 26(*a*) to (*e*) in order, and the temperature of each of the outside plates 22*a* at the time of melting the aluminum cutting chips 2 is measured.

In more detail, temperature sensors (thermocouples) are arranged at five positions between the center of each of the outside plates 22*a* shown in (a) and (e) of FIG. 26 and the upper end of the part facing the permanent magnets 461*a* and 461*b* (see (i) to (v) in (a) and (e) of FIG. 26) so as to measure the temperature of each of the outside plates 22*a*.

A temperature sensor (thermocouple) is arranged at the center of each of the outside plates 22*a* shown in (b), (c) and (d) of FIG. 26 (see (i) in (b), (c) and (d) of FIG. 26) so as to measure the temperature of each of the outside plates 22*a*.

Figure 27:
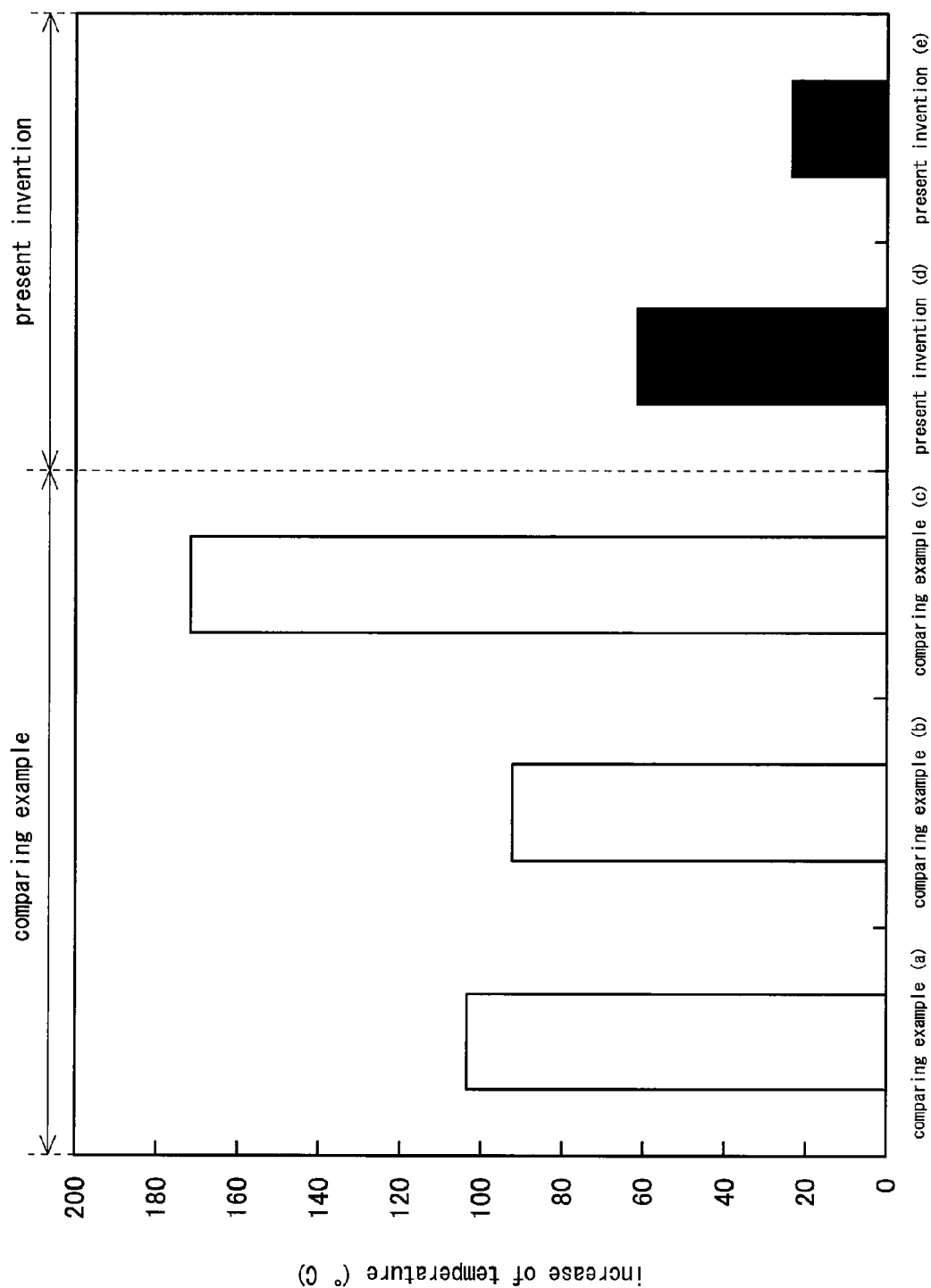
FIG. 27 is a diagram of increase of temperature at the center of the outside plate according to the comparing example and the present invention.

FIG. 27 shows the temperature rise of the center of the outside plates 22*a* shown in FIG. 26(*a*) to (*e*). Herein, "the temperature rise of the center of the outside plate 22*a*" is the reminder of the measured value of the temperature of the center of the outside plate 22*a* at the time of starting the measurement (at the time at which the rotation of the support member 462 in which the permanent magnets 461*a* and 461*b* are arranged is started) (T1) and the measured value of the temperature of the center of the outside plate 22*a* at the time of temperature saturation (at the time at which the temperature of the outside plate 22*a* becomes uniform) (T2)(=T2−T1).

As shown in FIG. 27, the temperature rise of the center of each of the outside plates 22*a* in FIGS. 26(*d*) and (*e*) which corresponds to the mode for carrying out the present invention is smaller than the temperature rise of the center of each of the outside plates 22*a* in FIGS. 26(*a*), (*b*) and (*c*) which corresponds to the comparative embodiment.

Accordingly, each of the resistance slot 481 and the combination of the resistance slot 481 and the auxiliary resistance slots 482, 483, 484 and 485 reduces the temperature rise of the center of the outside plate 22*a*.

As shown in FIG. 27, the temperature rise of the center of the outside plate 22*a* in FIG. 26(*b*) is slightly smaller than the temperature rise of the center of the outside plate 22*a* in FIG. 26(*a*).

Accordingly, the slot (resistance slot) different from the resistance slot 481 can reduce slightly the temperature rise of the center of the outside plate 22*a*.

However, the temperature rise of the center of the outside plate 22*a* in FIG. 26(*c*) is considerably larger than the temperature rise of the center of the outside plate 22*a* in FIG. 26(*a*).

The slots 490 and 491 substantially correspond to the resistance slot 481 in which the slot at the part corresponding to the center of the outside plate 22*a* is omitted (the resistance slot 481 divided into two at the middle part).

In the case of the slots 490 and 491, in addition to the induced current flowing toward the center of the outside plate 22*a* straight, the induced current flowing at the position far from said induced current changes its direction so as to reach the center of the outside plate 22*a* and flows through the part between the slots 490 and 491 to the other side of the two parts divided by the slots 490 and 491, whereby the induced current (the current value of the induced current) flowing at the center of the outside plate 22*a* is increased contrary.

By comparing the temperature rise of the center of each of the outside plate 22*a* in (a), (c) and (d) in FIG. 26, it is found that the construction of arranging the middle part of the resistance slot 481 at the center of the outside plate 22*a* and of forming the resistance slot 481 continuously (not dividing the resistance slot 481) is effective for reducing the temperature rise of the center of the outside plate 22*a*.

As shown in FIG. 27, the temperature rise of the center of the outside plate 22*a* in FIG. 26(*e*) is further smaller than the temperature rise of the center of the outside plate 22*a* in FIG. 26(*d*).

Accordingly, the combination of the resistance slot 481 and the auxiliary resistance slots 482, 483, 484 and 485 is effective for reducing the temperature rise of the center of the outside plate 22a.

Figure 28:
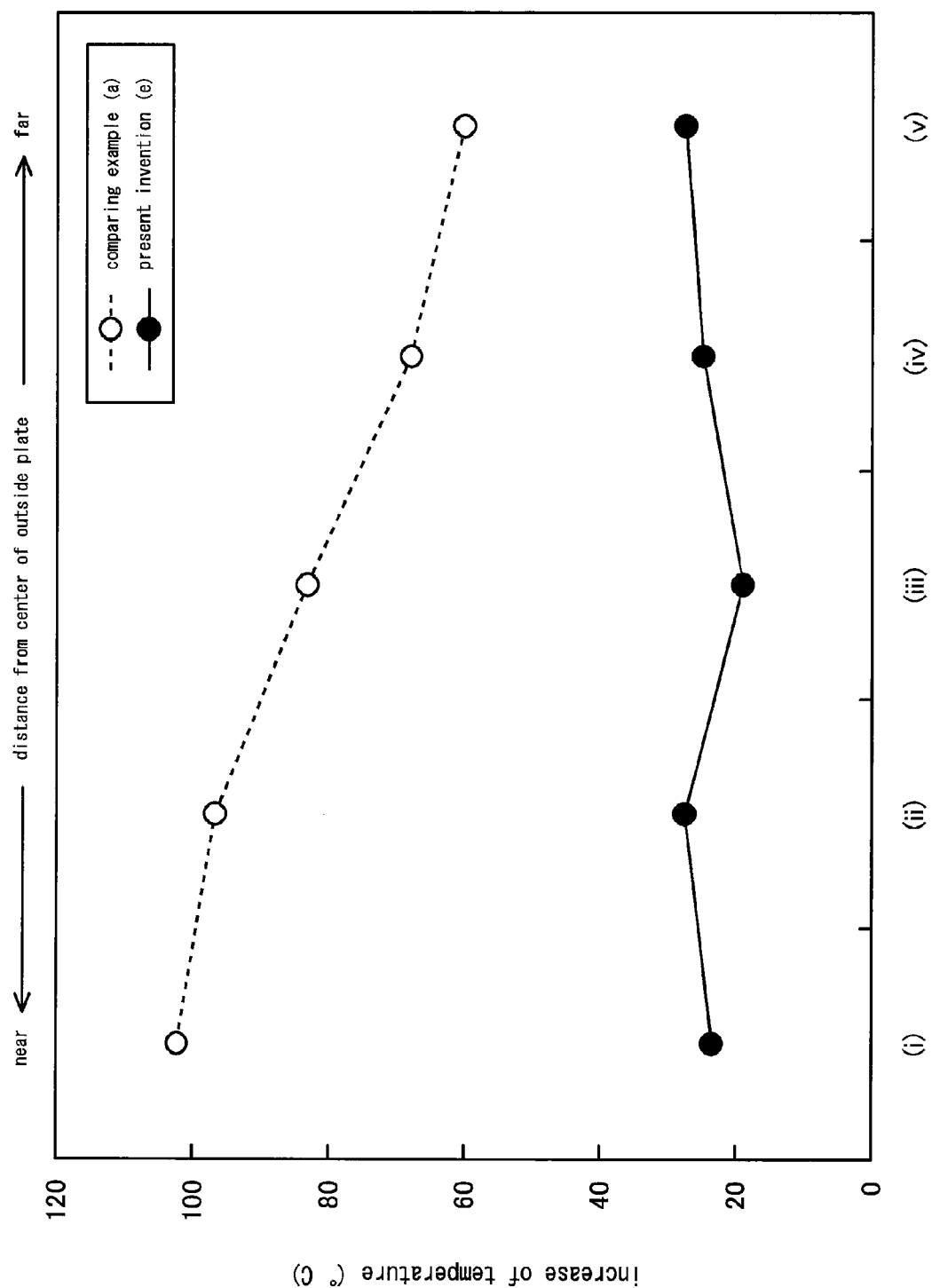
FIG. 28 is a diagram of relation between distance from the center of the outside plate and increase of temperature according to the comparing example and the present invention.

FIG. 28 shows the temperature rise of the center of the outside plate 22a at the positions (i) to (v) in each of (a) to (e) in FIG. 26.

As shown in FIG. 28, in the case of the outside plate 22a corresponding to FIG. 26(*a*), the temperature rise at the center (i) of the outside plate 22a is large, and the temperature rise becomes smaller with distance from the center (i) of the outside plate 22a.

On the other hand, in the case of the outside plate 22a corresponding to FIG. 26(*e*), the temperature rise at each of the positions (i) to (v) is substantially uniform.

Accordingly, by combining the resistance slot 481 with the auxiliary resistance slots 482, 483, 484 and 485, the induced current is prevented from concentrating at the center of the outside plate 22a, in its turn the temperature rise at the center of the outside plate 22a is suppressed.

As shown in FIG. 28, the temperature rise of the center of the outside plate 22a in FIG. 26(*e*) is entirely smaller than the temperature rise of the center of the outside plate 22a in FIG. 26(*a*).

Accordingly, by combining the resistance slot 481 with the auxiliary resistance slots 482, 483, 484 and 485, the induced current is caused in each of the part divided by the resistance slot 481 and the auxiliary resistance slots 482, 483, 484 and 485, whereby each induced current (the current value of each induced current) is small.

FIG. 28 shows the rise amplitude of the temperature at the positions (i) of the outside plates 22a of (a) and (e) in FIG. 26.

Herein, "the rise amplitude of the temperature of the outside plate 22a" is the reminder of the temperature of the center of the outside plate 22a at the time of starting the measurement (T3) and the temperature of the center of the outside plate 22a at the elapsed time (T4)(=T4−T3).

Figure 29:
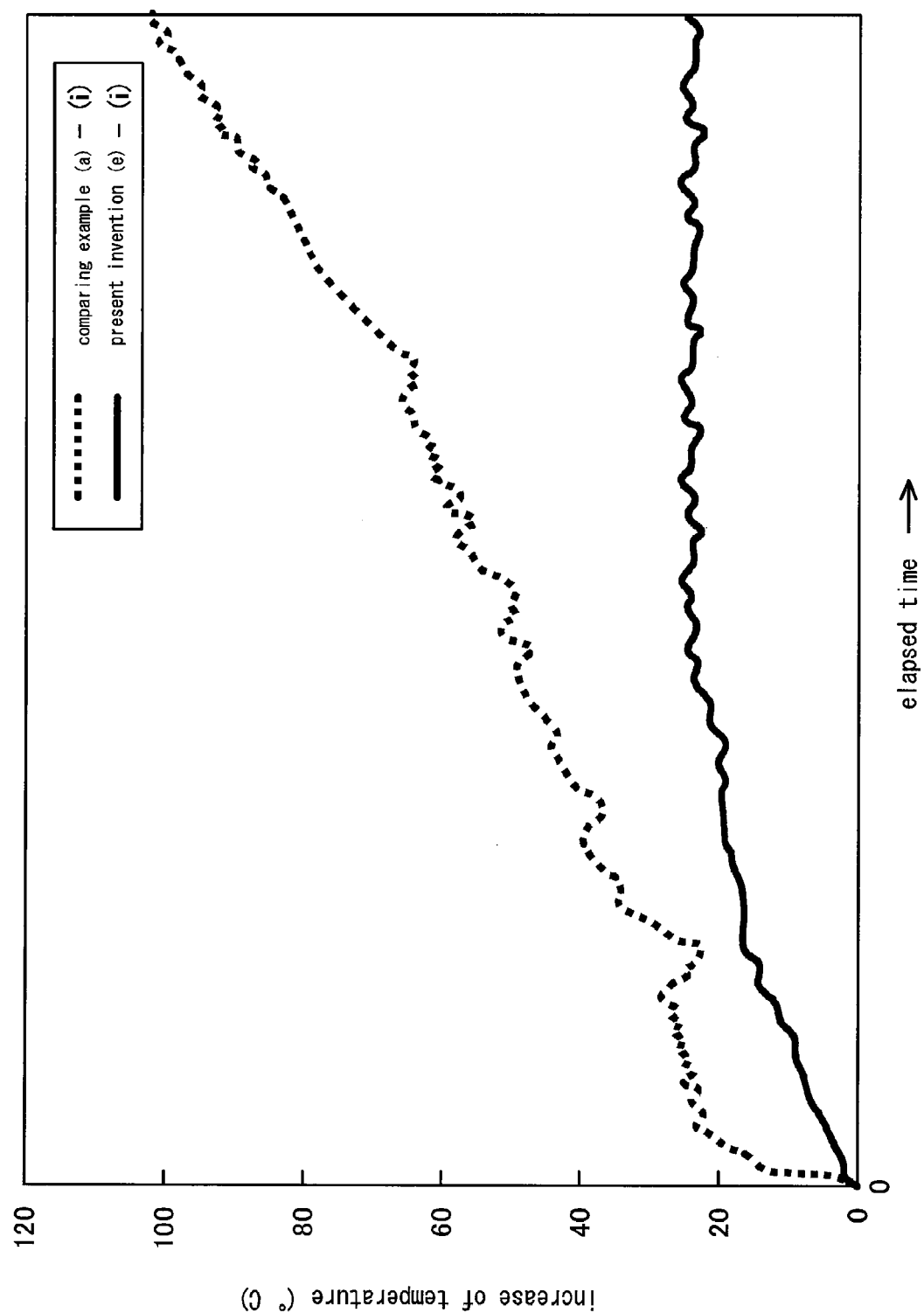
FIG. 29 is a diagram of relation between the increase of temperature at the center and elapsed time of the outside plate of temperature according to the comparing example and the present invention.

As shown in FIG. 29, the rise amplitude of the temperature at the position (i) of the outside plate 22a of (e) is smaller than the rise amplitude of the temperature at the position (i) of the outside plate 22a of (a).

The time required for making uniform the rise amplitude of the temperature at the position (i) of the outside plate 22a of (e) is shorter than the time required for making uniform the rise amplitude of the temperature at the position (i) of the outside plate 22a of (a).

Figure 30:
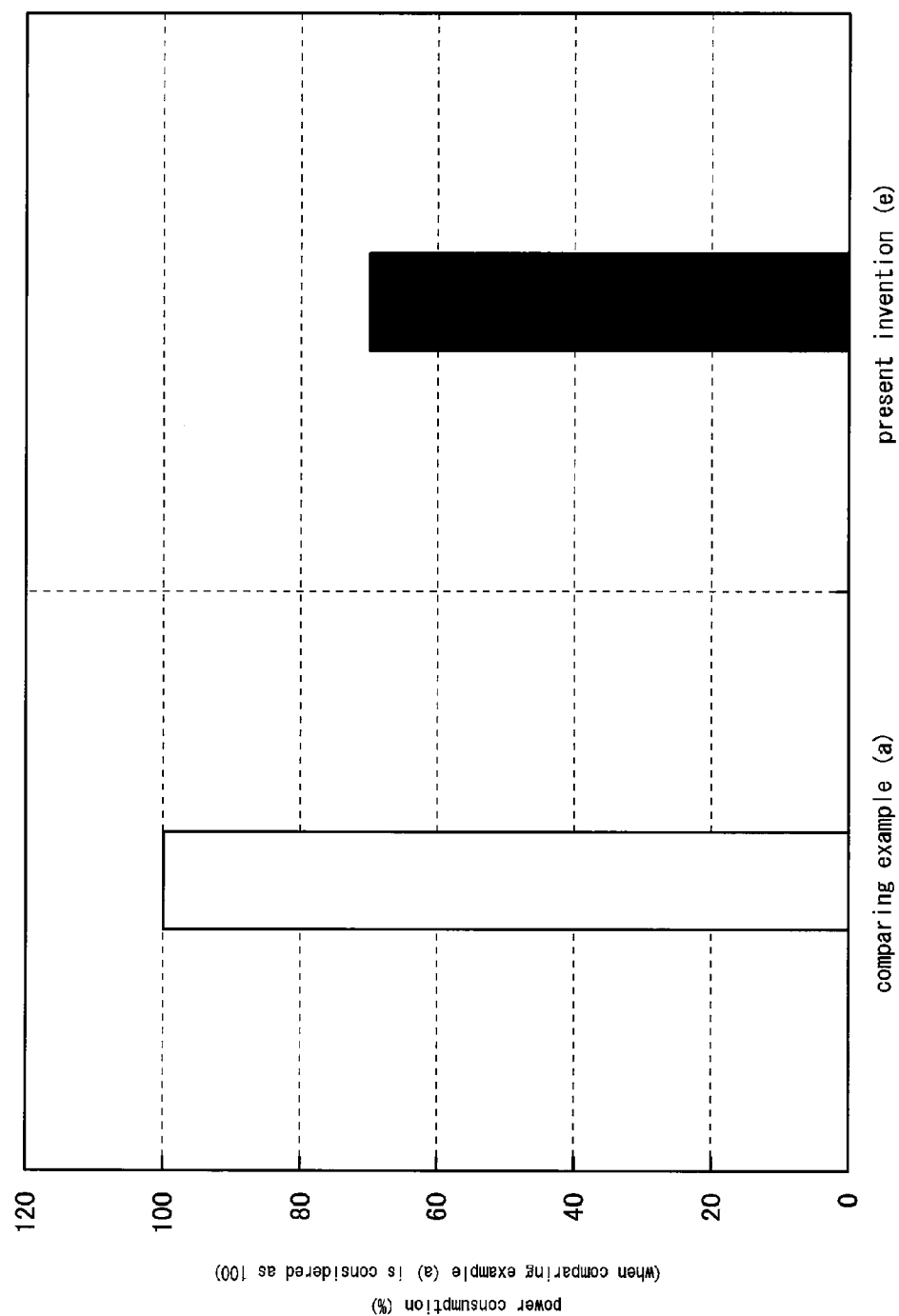
FIG. 30 is a diagram of power consumption of a motor rotatively driving the permanent magnets according to the comparing example and the present invention.

FIG. 30 shows the comparison of the power consumption for rotatively driving the motor 463 of the melting furnace 400 having the outside plate 22a corresponding to FIG. 26(*a*) with the power consumption for rotatively driving the motor 463 of the melting furnace 400 having the outside plate 22a corresponding to FIG. 26(*e*).

The rotational speed of the motor 463 the melting furnace 400 having the outside plate 22a corresponding to FIG. 26(*a*) is the same as the rotational speed of the motor 463 the melting furnace 400 having the outside plate 22a corresponding to FIG. 26(*e*).

As shown in FIG. 30, the power consumption for rotatively driving the motor 463 of the melting furnace 400 having the outside plate 22a corresponding to FIG. 26(*e*) is smaller about 30 percent than the power consumption for rotatively driving the motor 463 of the melting furnace 400 having the outside plate 22a corresponding to FIG. 26(*a*).

A part of the power consumption for rotatively driving the motor 463 is employed for causing the induced current in the outside plate 22a. Accordingly, when the induced current (the current value of each induced current) caused in the outside plate 22a of FIG. 26(*e*) becomes smaller than the induced current (the current value of each induced current) caused in the outside plate 22a of FIG. 26(*a*), the power consumption for rotatively driving the motor 463 of the melting furnace 400 having the outside plate 22a corresponding to FIG. 26(*e*) is supposable to become small.

As mentioned above, the melting furnace 400 has the charging tank 20 which has the outside plate 22a constructed by metal material and the fireproof member 22b covering the outside plate 22a, and the traveling magnetic field generating unit 460 which is arranged outside the outside plate 22a of the charging tank 20 and generates the magnetic field traveling along the outside plate 22a so as to agitate the molten metal 3 stored in the charging tank 20. The aluminum cutting chips 2 are introduced to the molten metal 3 stored in the charging tank 20 so as to melt the aluminum cutting chips 2. The traveling magnetic field generating unit 460 has the permanent magnets 461a and 461b facing the outside plate 22a of the charging tank 20, the rotation of the support member 462 supporting the permanent magnets 461a and 461b, and the motor 463 rotatively driving the rotation of the support member 462 centering on the rotational shaft 463a perpendicular to the outer plate surface of the outside plate 22a. The resistance slot 481 which has larger electric resistance than the metal material constructing the outside plate 22a of the charging tank 20 is formed at the part of the outside plate 22a of the charging tank 20 facing the permanent magnets 461a and 461b. The middle part of the resistance slot 481 is arranged at the position in the outside plate 22a of the charging tank 20 facing the rotational shaft 463a. Both ends of the resistance slot 481 is arranged at the positions far from the position in the outside plate 22a of the charging tank 20 facing the rotational shaft 463a (in this embodiment, the left and right ends of the part of the outside plate 22a of the charging tank 20 facing the permanent magnets 461a and 461b).

The north pole of the permanent magnet 461a and the south pole of the permanent magnet 461b are arranged at the positions whose phases are shifted mutually for 180° centering on the rotational shaft 463a when viewed from the axial direction of the rotational shaft 463a.

According to the construction, the induced current C caused in the outside plate 22a can be prevented from being concentrated at the position in the outside plate 22a of the charging tank 20 facing the rotational shaft 463a, in its turn the temperature rise at the position in the outside plate 22a of the charging tank 20 facing the rotational shaft 463a can be reduced.

The rotational speed of the motor 463 can be increased by the suppression of the temperature rise at the position in the outside plate 22a of the charging tank 20 facing the rotational shaft 463a, in its turn the melting efficiency of the aluminum cutting chips 2 (the weight of the aluminum cutting chips 2 which can be melted per unit time) can be increased.

Furthermore, by reducing the temperature rise at the position in the outside plate 22a of the charging tank 20 facing the rotational shaft 463a, deformation of the outside plate 22a can be prevented and any cooling equipment or the like for preventing the deformation of the outside plate 22a is not necessary to be provided (see the Japanese Patent Laid Open Gazette 2008-164249).

Moreover, the induced current C caused in the outside plate 22a can be made small, in its turn the energy required for agitating the molten metal 3 (in this embodiment, the power consumption of the motor 463) can be made small. By making the energy small, the cost for melting the aluminum cutting chips 2 can be reduced.

In the melting furnace 400, the resistance slot 481 which is a slot formed in the outside plate 22a of the charging tank 20 is employed as a resistance band.

The construction brings below merits.

Namely, the resistance slot 481 can be formed easily by cutting the outside plate 22a of the charging tank 20, thereby being adoptable easily to an existing melting apparatus and the like.

The inside of the resistance slot 481 is substantially hollow so that the resistance slot 481 can buff the distortion caused by the expansion of the outside plate 22a by temperature rise, whereby deformation of the outside plate 22a can be prevented.

The auxiliary resistance slots 482, 483, 484 and 485 which have larger electric resistance than the metal material constructing the outside plate 22a of the charging tank 20 and are arranged separately from the resistance slot 481 are formed at the part in the outside plate 22a of the inside of the charging tank 20 of the melting furnace 400 facing the permanent magnets 461a and 461b.

According to the construction, the induced current C caused in the outside plate 22a can be made further small and can be prevented from being concentrated at the position in the outside plate 22a of the charging tank 20 facing the rotational shaft 463a.

In the melting furnace 400, the auxiliary resistance slots 482, 483, 484 and 485 which are slots formed in the outside plate 22a of the charging tank 20 are employed as auxiliary resistance bands.

The construction brings below merits.

Namely, the auxiliary resistance slots 482, 483, 484 and 485 can be formed easily by cutting the outside plate 22a of the charging tank 20, thereby being adoptable easily to an existing melting apparatus and the like.

The inside of each of the auxiliary resistance slots 482, 483, 484 and 485 is substantially hollow so that the auxiliary resistance slots 482, 483, 484 and 485 can buff the distortion caused by the expansion of the outside plate 22a by temperature rise, whereby deformation of the outside plate 22a can be prevented.

As mentioned above, the melting method of the aluminum cutting chips 2 with the melting furnace 400 employs the melting furnace 400 which has the charging tank 20 which has the outside plate 22a constructed by metal material and the fireproof member 22b covering the outside plate 22a, and the traveling magnetic field generating unit 460 which is arranged outside the outside plate 22a of the charging tank 20 and generates the magnetic field traveling along the outside plate 22a so as to agitate the molten metal 3 stored in the charging tank 20, and in which the aluminum cutting chips 2 are introduced to the molten metal 3 stored in the charging tank 20 so as to melt the aluminum cutting chips 2. The traveling magnetic field generating unit 460 has the permanent magnets 461a and 461b facing the outside plate 22a of the charging tank 20, the rotation of the support member 462 supporting the permanent magnets 461a and 461b, and the motor 463 rotatively driving the rotation of the support member 462 centering on the rotational shaft 463a perpendicular to the outer plate surface of the outside plate 22a. The resistance slot 481 which has larger electric resistance than the metal material constructing the outside plate 22a of the charging tank 20 is formed at the part of the outside plate 22a of the charging tank 20 facing the permanent magnets 461a and 461b. The middle part of the resistance slot 481 is arranged at the position in the outside plate 22a of the charging tank 20 facing the rotational shaft 463a. Both ends of the resistance slot 481 is arranged at the positions far from the position in the outside plate 22a of the charging tank 20 facing the rotational shaft 463a (in this embodiment, the left and right ends of the part of the outside plate 22a of the charging tank 20 facing the permanent magnets 461a and 461b). The north pole of the permanent magnet 461a and the south pole of the permanent magnet 461b are arranged at the positions whose phases are shifted mutually for 180° centering on the rotational shaft 463a when viewed from the axial direction of the rotational shaft 463a.

According to the construction, the induced current C caused in the outside plate 22a can be prevented from being concentrated at the position in the outside plate 22a of the charging tank 20 facing the rotational shaft 463a, in its turn the temperature rise at the position in the outside plate 22a of the charging tank 20 facing the rotational shaft 463a can be reduced.

The rotational speed of the motor 463 can be increased by the suppression of the temperature rise at the position in the outside plate 22a of the charging tank 20 facing the rotational shaft 463a, in its turn the melting efficiency of the aluminum cutting chips 2 (the weight of the aluminum cutting chips 2 which can be melted per unit time) can be increased.

Furthermore, by reducing the temperature rise at the position in the outside plate 22a of the charging tank 20 facing the rotational shaft 463a, deformation of the outside plate 22a can be prevented and any cooling equipment or the like for preventing the deformation of the outside plate 22a is not necessary to be provided (see the Japanese Patent Laid Open Gazette 2008-164249).

Moreover, the induced current C caused in the outside plate 22a can be made small, in its turn the energy required for agitating the molten metal 3 (in this embodiment, the power consumption of the motor 463) can be made small. By making the energy small, the cost for melting the aluminum cutting chips 2 can be reduced.

In the melting method of the aluminum cutting chips 2 with the melting furnace 400, the resistance slot 481 which is a slot formed in the outside plate 22a of the charging tank 20 is employed as a resistance band.

The construction brings below merits.

Namely, the resistance slot 481 can be formed easily by cutting the outside plate 22a of the charging tank 20, thereby being adoptable easily to an existing melting apparatus and the like.

The inside of the resistance slot 481 is substantially hollow so that the resistance slot 481 can buff the distortion caused by the expansion of the outside plate 22a by temperature rise, whereby deformation of the outside plate 22a can be prevented.

The auxiliary resistance slots 482, 483, 484 and 485 which have larger electric resistance than the metal material constructing the outside plate 22a of the charging tank 20 and are arranged separately from the resistance slot 481 are formed at the part in the outside plate 22a of the inside of the charging tank 20 of the melting furnace 400 facing the permanent magnets 461a and 461b.

According to the construction, the induced current C caused in the outside plate 22a can be made further small and can be prevented from being concentrated at the position in the outside plate 22a of the charging tank 20 facing the rotational shaft 463a.

In the melting method of the aluminum cutting chips 2 with the melting furnace 400, the auxiliary resistance slots 482, 483, 484 and 485 which are slots formed in the outside plate 22a of the charging tank 20 are employed as auxiliary resistance bands.

The construction brings below merits.

Namely, the auxiliary resistance slots 482, 483, 484 and 485 can be formed easily by cutting the outside plate 22a of the charging tank 20, thereby being adoptable easily to an existing melting apparatus and the like.

The inside of each of the auxiliary resistance slots 482, 483, 484 and 485 is substantially hollow so that the auxiliary resistance slots 482, 483, 484 and 485 can buff the distortion caused by the expansion of the outside plate 22a by temperature rise, whereby deformation of the outside plate 22a can be prevented.

In this embodiment, the resistance slot 481 and the auxiliary resistance slots 482, 483, 484 and 485 are formed as the resistance band and auxiliary resistance bands. The width, length, number and the like of these slots can be changed suitably in consideration of (1) intensity of the outside plate 22a as a structure, (2) processability (easiness of forming) of these slots, (3) agitating ability (permeability of the magnetic field to the inside of the outside plate 22a of the charging tank 20) and the like.

In this embodiment, the resistance slot 481 and the auxiliary resistance slots 482, 483, 484 and 485 are formed as the resistance band and auxiliary resistance bands. However, the resistance band and auxiliary resistance bands according to the present invention are not limited thereto.

As another embodiment of the resistance band and auxiliary resistance bands according to the present invention, there are given the case that heat procession (for example, welding) or surface treatment (for example, shot peening) is performed at a predetermined part of the outside plate and the structure as the metal material (grain size of crystal, distribution of deposited object, dislocation density and the like) so as to make the electric resistance of the processed part larger than that of the part around it, the case that material of difference kind (including metal and nonmetal) with larger electric resistance than that of the metal material constructing the outside plate is implanted at a predetermined part of the outside plate, the case that the thickness of the outside plate is changed at every part so as to change the electric resistance at every part, and the like.

In this embodiment, the resistance slot 481 is extended laterally while passing through the center of the outside plate 22a. However, the resistance band according to the present invention is not limited thereto.

Figure 31:
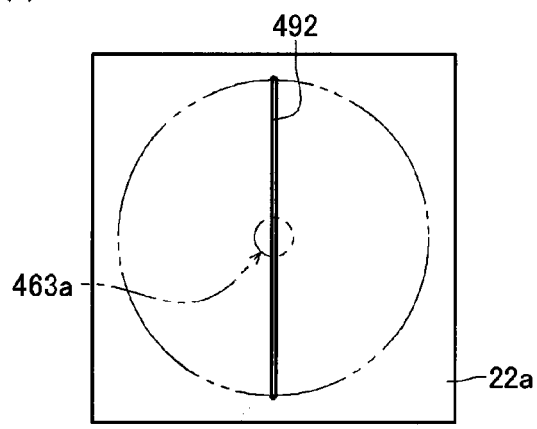
FIG. 31 is a drawing of another embodiment of a resistance band according to the present invention.
Figure 31:
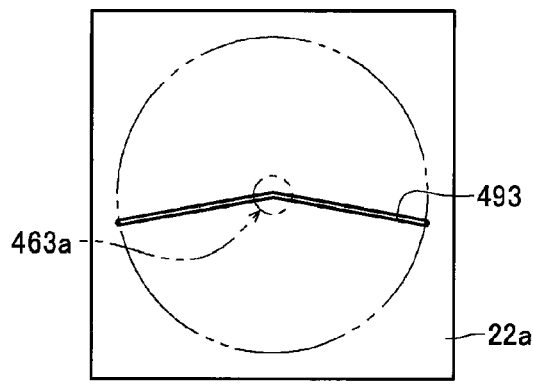
Figure 31:
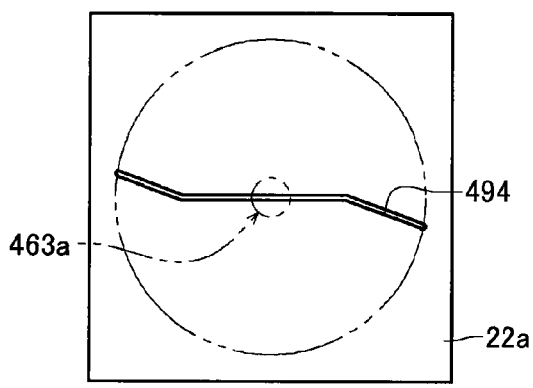
Figure 31:
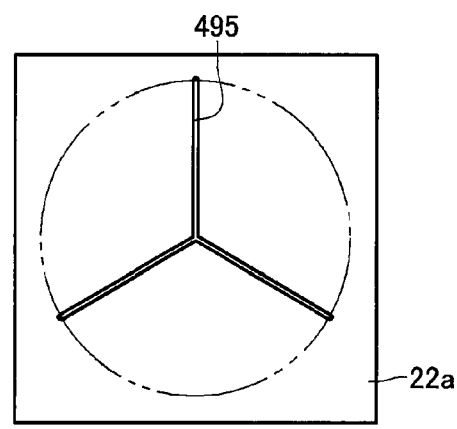
Figure 31:
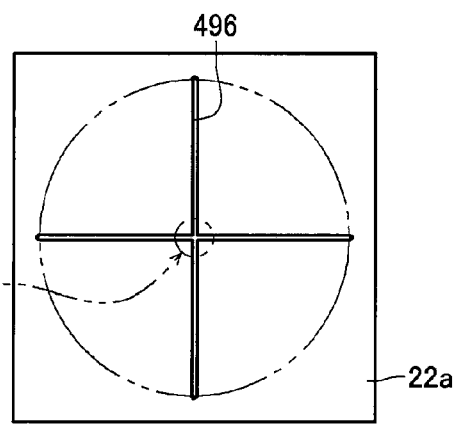
Figure 31:
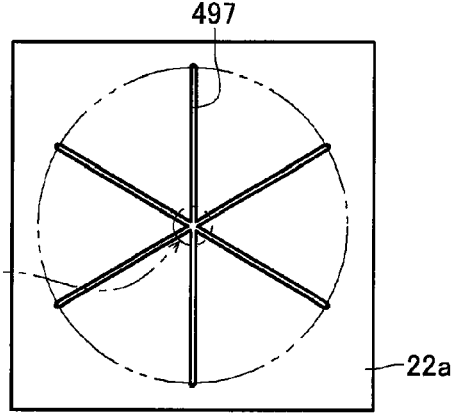

For example, as a resistance slot 492 shown in FIG. 31(*a*), the resistance slot may alternatively be extended vertically while passing through the center of the outside plate 22a (the position facing the rotational center of the support member 462 (the rotational shaft 463a)).

As a resistance slot 493 shown in FIG. 31(*b*), the resistance slot may alternatively be bent at the center of the outside plate 22a.

As a resistance slot 494 shown in FIG. 31(*c*), the resistance slot may alternatively pass through the center of the outside plate 22a and is bent at the position other than the center of the outside plate 22a.

As a resistance slot 495 shown in FIG. 31(*d*), the resistance slot may alternatively be extended to three different directions from the center of the outside plate 22a.

As a resistance slot 496 shown in FIG. 31(*e*), the resistance slot may alternatively be extended to four different directions from the center of the outside plate 22a (otherwise, two slots crosses at the center of the outside plate 22a).

As a resistance slot 497 shown in FIG. 31(*f*), the resistance slot may alternatively be extended to six different directions from the center of the outside plate 22a (otherwise, three slots crosses at the center of the outside plate 22a).

Each of the slots shown in FIG. 31(*a*) to (*f*) (the resistance slots 492, 493, 494, 495, 496 and 497) satisfies the conditions that the middle part of the slot is arranged at the position in the outside plate 22a of the charging tank 20 facing the rotational shaft 463a and that both ends of the slot is arranged at the positions far from the position in the outside plate 22a of the charging tank 20 facing the rotational shaft 463a.

Figure 32:
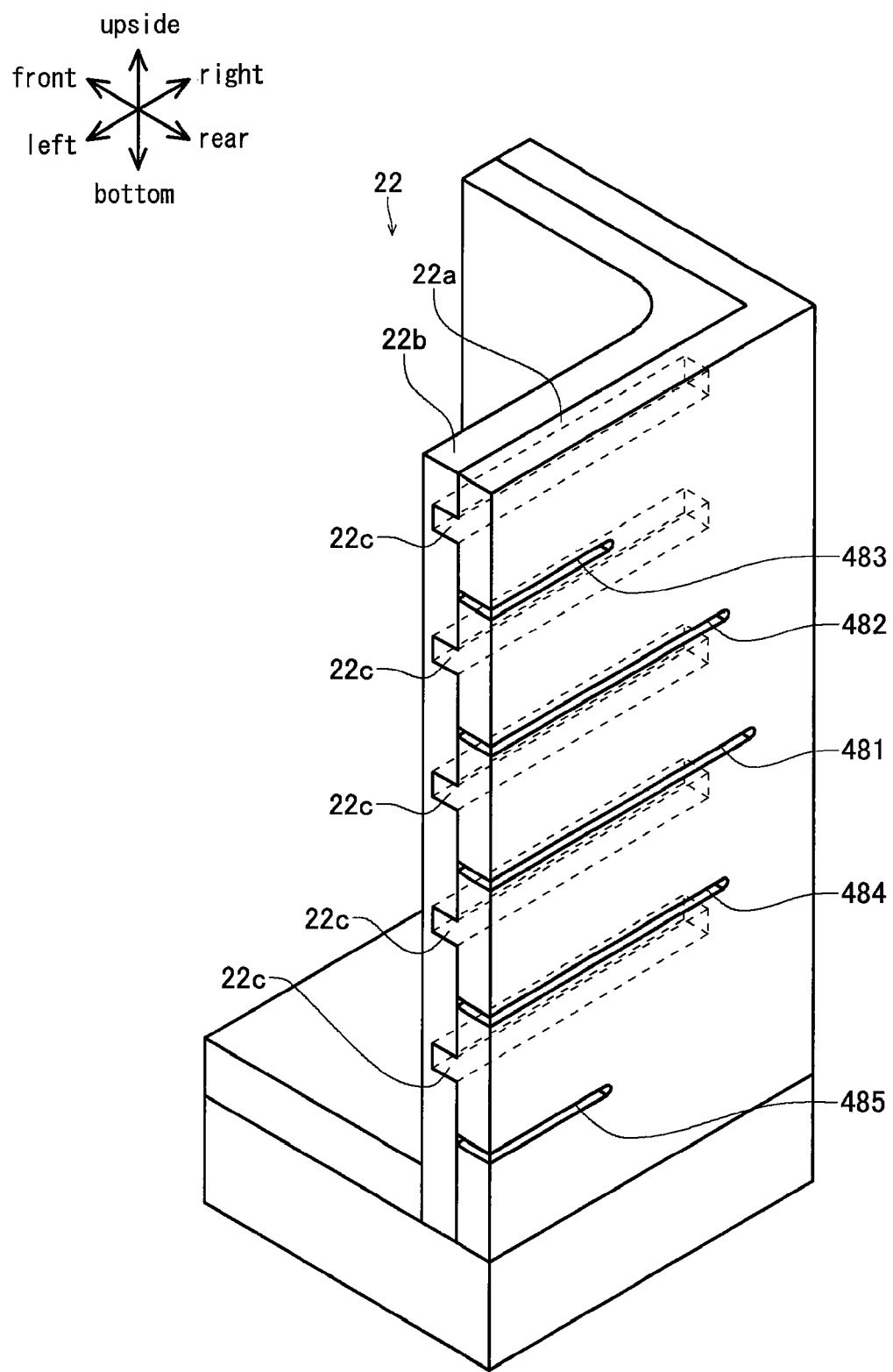
FIG. 32 is a sectional perspective view of the outside plate in which reinforcing ribs are formed.

As shown in FIG. 32, the outside plate 22a may alternatively be formed therein with reinforcing ribs 22c.

According to the construction, in the case that the resistance slot 481 and the auxiliary resistance slots 482, 483, 484 and 485 are formed in the outside plate 22a, the intensity of the outside plate 22a can be held.

In this embodiment, the two permanent magnets 461a and 461b are supported by the support member 462. However, the number and arrangement of the permanent magnet according to the present invention is not limited thereto.

Figure 33:
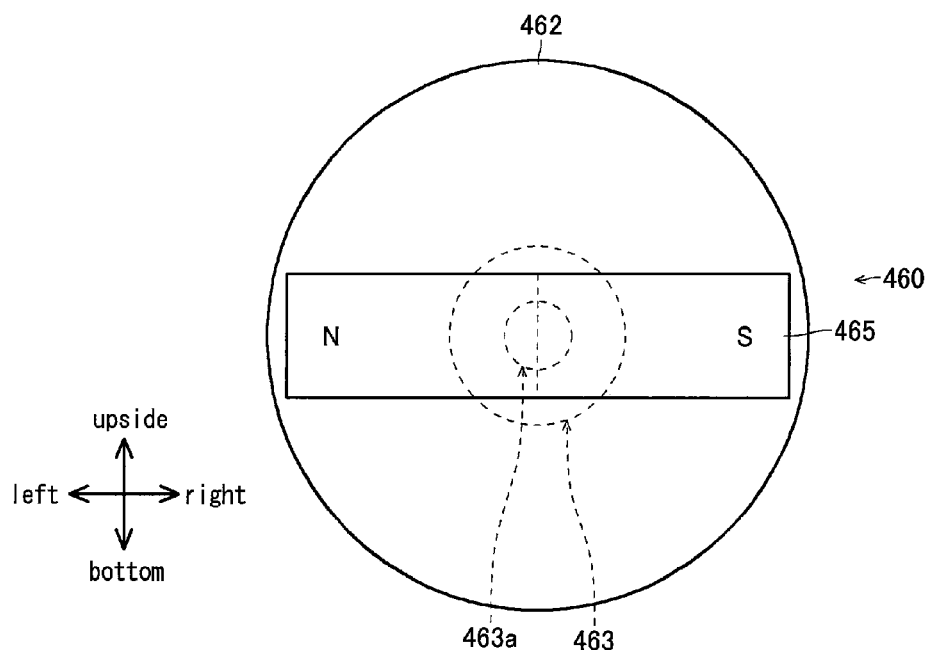
FIG. 33 is a drawing of another embodiment of arrangement of the permanent magnets.
Figure 33:
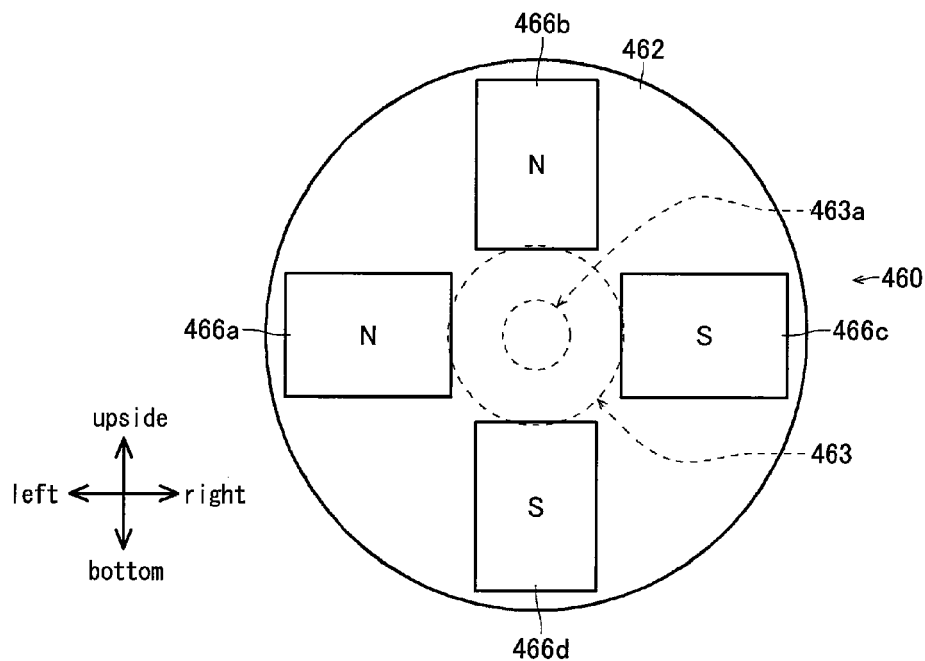

For example, as shown in FIG. 33(*a*), it may alternatively be constructed that one permanent magnet 465 in which one of ends thereof is magnetized as the north pole and the other end thereof is magnetized as the south pole is fixed to the support member 462 so that the rotational center of the support member 462 (the position corresponding to the rotational shaft 463a) is arranged between the one of ends (north pole) and the other end (south pole) when viewed along the axial direction of the rotational shaft 463a.

In this case, the north pole of the permanent magnet 465 and the south pole of the permanent magnet 465 are arranged at the positions whose phases are shifted mutually for 180° centering on the rotational shaft 463a when viewed from the axial direction of the rotational shaft 463a (in this embodiment, along the longitudinal direction).

As shown in FIG. 33(*b*), it may alternatively be constructed that permanent magnets 466a, 466b, 466c and 466d are fixed to the positions whose distance from the center of the discoid surface of the support member 462 facing the outside plate 22a is uniform and whose phases are shifted mutually for 90°.

In this case, the front surface of the permanent magnet 466a is magnetized as the north pole and the rear surface of the permanent magnet 466a is magnetized as the south pole. The front surface of the permanent magnet 466b is magnetized as the north pole and the rear surface of the permanent magnet 466a is magnetized as the south pole. The front surface of the permanent magnet 466c is magnetized as the south pole and the rear surface of the permanent magnet 466a is magnetized as the north pole. The front surface of the permanent magnet 466d is magnetized as the south pole and the rear surface of the permanent magnet 466a is magnetized as the notch pole.

Accordingly, the north pole of the permanent magnet 466a and the south pole of the permanent magnet 466c are arranged at the positions whose phases are shifted mutually for 180° centering on the rotational shaft 463a when viewed from the axial direction of the rotational shaft 463a.

The north pole of the permanent magnet 466b and the south pole of the permanent magnet 466d are arranged at the positions whose phases are shifted mutually for 180° centering on the rotational shaft 463a when viewed from the axial direction of the rotational shaft 463a.

In the case shown in FIGS. 33(*a*) and (*b*), on the basis of the right-handed screw rule, the induced current passing through the center of the outside plate 22a is caused on the outside plate 22a facing the support member 462.

In this embodiment, the resistance slot 481 and the auxiliary resistance slots 482, 483, 484 and 485 are formed in the outside plate 22a o the rear side facing the traveling magnetic field generating unit 460. However, similar resistance slot (resistance band) and auxiliary resistance slots (auxiliary resistance bands) may alternatively be formed in the plate member constituting the lower surface of the structure 11 facing the traveling magnetic field generating unit 470.

In this case, the induced current caused in the plate member constituting the lower surface of the structure 11 by the rotation of the permanent magnets 471*a* and 471*b* of the traveling magnetic field generating unit 470 is prevented from concentrating at the position facing the rotational shaft 473*a*, in its turn the temperature rise at the position facing the rotational shaft 473*a* in the plate member constituting the lower surface of the structure 11 is suppressed.

The traveling magnetic field generating units 460 and 470 in this embodiment generate the traveling magnetic field with the permanent magnets. However, in an electromagnetic traveling magnetic field generating unit, in the case that a magnetic field travels circularly centering on a predetermined center point and reversed polarity appears about the center point, by forming a resistance slot and auxiliary resistance slots similar to the embodiment in an outside plate facing the electromagnetic traveling magnetic field generating unit, an induced current caused in the outside plate can be prevented from concentrating at a position in the outside plate facing the center point.

In each of the Japanese Patent Laid Open Gazette Hei. 7-126766 and the Japanese Patent Laid Open Gazette Hei. 7-28957, a unit is disclosed in which a melted matter housed in a metal crucible is melted by flowing an alternating current with high frequency in a high-frequency induction coil wound on the outer peripheral surface of the crucible, and the effect is disclosed that an eddy current generated in the crucible is suppressed by forming a plurality of vertical slits in the crucible. However, this disclosure is widely different from the present invention.

The purpose of the present invention is to suppress the induced current caused by the magnetic field traveling and rotating centering on the axis perpendicular to the outside plate and is different from the disclosure at all in the shape of the object in which the induced current is caused and the mode of generation of the magnetic field, in its turn the behavior of the caused induced current (the flow direction and the change of the mode).

In the Japanese Patent Laid Open Gazette Hei. 6-176916, the effect is disclosed that a layer having high electric resistance is formed on a surface of a magnetic adjusting plate so as to suppress an eddy current generated in the surface of the magnetic adjusting plate. However, this disclosure is widely different from the present invention.

In the present invention, parts having high electric resistance (resistance band and auxiliary resistance bands) and parts having low electric resistance (the other parts) are formed in the outside plate in which the induced current is caused and the direction of flowing of the induced current is changed with the parts having high electric resistance so as to prevent the induced current from concentrating at the local position (the center of the outside plate), and the mechanism and the purpose thereof is different from the disclosure.

Reference Signs List 2 aluminum cutting chip (melted matter)
3 molten metal
10 main body (a part of melting tank)
20 charging tank (a part of melting tank)
22 sidewall
150 agitation device (first embodiment)
160 traveling magnetic field generating unit (first embodiment)

The invention claimed is:

1. A melting apparatus comprising:
a melting tank having an outside plate constructed by metal material and a fireproof member covering the outside plate; and
a traveling magnetic field generating unit arranged outside the outside plate of the melting tank, generating a magnetic field traveling along the outside plate in the melting tank so as to agitate a molten metal stored in the melting tank,
wherein a melted matter is introduced to the molten metal stored in a melting chamber for melting the melted matter,
wherein the traveling magnetic field generating unit comprises:
a permanent magnet facing the sidewall of the melting tank;
a support member supporting the permanent magnet; and
a motor rotatively driving the support member centering on a rotational shaft perpendicular to an outer plate surface of the outside plate,
wherein a resistance band having larger electric resistance than the metal material constructing the outside plate is formed at a part of the outside plate of the melting tank facing the permanent magnet,
wherein the middle part of the resistance band is arranged at a position in the outside plate of the melting tank facing the rotational shaft, and
wherein an end of the resistance band is arranged at a position far from the position in the outside plate of the melting tank facing the rotational shaft.

2. The melting apparatus according to claim 1, wherein a north pole and a south pole of the permanent magnet are arranged at positions whose phases are shifted mutually for 180° centering on the rotational shaft when viewed from the axial direction of the rotational shaft.

3. The melting apparatus according to claim 1, wherein the resistance band is a slot formed in the outside plate of the melting tank.

4. The melting apparatus according to claim 1, wherein an auxiliary resistance band having larger electric resistance than the metal material constructing the outside plate of the melting tank and arranged separately from the resistance band is formed at a part of the outside plate of the melting tank facing the permanent magnet.

5. The melting apparatus according to claim 4, wherein the auxiliary resistance band is a slot formed in the outside plate of the melting tank.

6. A melting method using a melting apparatus introducing a melted matter to a molten metal stored in a melting chamber for melting the melted matter, the melting apparatus comprising a melting tank having an outside plate constructed by metal material and a fireproof member covering the outside plate, and a traveling magnetic field generating unit arranged outside the outside plate of the melting tank and generating a magnetic field traveling along the outside plate in the melting tank for agitating the molten metal stored in the melting tank,
wherein the traveling magnetic field generating unit comprises:
a permanent magnet facing the sidewall of the melting tank;
a support member supporting the permanent magnet; and a motor rotatively driving the support member centering on a rotational shaft perpendicular to an outer plate surface of the outside plate, wherein a resistance band having larger electric resistance than the metal material constructing the outside plate is formed at a part of the outside plate of the melting tank facing the permanent magnet, wherein the middle part of the resistance band is arranged at a position in the outside plate of the melting tank facing the rotational shaft, and wherein an end of the resistance band is arranged at a position far from the position in the outside plate of the melting tank facing the rotational shaft.

7. The melting method according to claim 6, wherein a north pole and a south pole of the permanent magnet are arranged at positions whose phases are shifted mutually for 180° centering on the rotational shaft when viewed from the axial direction of the rotational shaft.

8. The melting method according to claim 6, wherein the resistance band is a slot formed in the outside plate of the melting tank.

9. The melting method according to claim 6, wherein an auxiliary resistance band having larger electric resistance than the metal material constructing the outside plate of the melting tank, arranged separately from the resistance band is formed at a part of the outside plate of the melting tank facing the permanent magnet.

10. The melting method according to claim 9, wherein the auxiliary resistance band is a slot formed in the outside plate of the melting tank.

\* \* \* \* \*